(12) United States Patent
Kawamura

(10) Patent No.: US 9,612,451 B2
(45) Date of Patent: Apr. 4, 2017

(54) ZOOM LENS AND IMAGING APPARATUS

(71) Applicant: FUJIFILM Corporation, Tokyo (JP)

(72) Inventor: Daiki Kawamura, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/818,818

(22) Filed: Aug. 5, 2015

(65) Prior Publication Data

US 2016/0062135 A1    Mar. 3, 2016

(30) Foreign Application Priority Data

Aug. 28, 2014  (JP) ................ 2014-174108

(51) Int. Cl.
*G02B 27/64*   (2006.01)
*G02B 15/173*  (2006.01)

(52) U.S. Cl.
CPC ......... *G02B 27/646* (2013.01); *G02B 15/173* (2013.01)

(58) Field of Classification Search
CPC .......... G02B 27/64; G02B 27/646; G02B 15/14–15/16; G02B 15/163; G02B 15/173; G02B 15/20; G02B 13/004; G02B 13/0045; G02B 13/02; G02B 9/34; G02B 9/60; G02B 9/62; G02B 9/64; H04N 5/23264; H04N 5/2328; H04N 5/23287; G03B 2205/0007;
(Continued)

(56) References Cited

U.S. PATENT DOCUMENTS 4,468,099 A  *  8/1984  Ikemori ................ G02B 13/02
                                                        359/745
8,659,832 B2    2/2014  Takemoto et al.
(Continued)

FOREIGN PATENT DOCUMENTS

JP   2011-099964   5/2011
JP   2011-158599   8/2011
JP   2012-027217   2/2012

OTHER PUBLICATIONS

JP2012027217, English Language Machine Translation, created Aug. 5, 2016.*
(Continued)

*Primary Examiner* — Stephone B Allen
*Assistant Examiner* — Adam W Booher
(74) *Attorney, Agent, or Firm* — Youn & Thompson

(57) ABSTRACT

A zoom lens consists of four or five lens groups, consisting of, in order from the object side, a positive first group a negative second group, one or two middle groups including a positive mp group, and a positive rearmost group at the most image-side position of the entire system. Zooming is effected by changing all distances between the adjacent groups. The rearmost group consists of, in order from the object side, a positive front group, a negative middle group, and a positive rear group. Air spaces between the front and middle groups, and between the middle and rear groups are constant during zooming and focusing. The front group includes two positive lenses and one negative lens. Image stabilization is effected by shifting the middle group perpendicularly to the optical axis. The rear group includes one positive lens and two negative lenses. The zoom lens satisfies a given condition expression.

22 Claims, 45 Drawing Sheets

(58) Field of Classification Search
CPC .... G03B 2205/0015; G03B 2205/0023; G03B 2205/0046
See application file for complete search history.

(56) References Cited

U.S. PATENT DOCUMENTS

2009/0135498 A1* 5/2009 Take .................... G02B 27/646
359/684
2009/0208195 A1* 8/2009 Hatakeyama ........ G02B 15/173
396/55
2013/0155527 A1* 6/2013 Yoneyama ............. G02B 13/02
359/745

OTHER PUBLICATIONS

JP2011099964, English Language Machine Translation, created Aug. 5, 2016.*
German Search Report dated Jul. 27, 2016 in corresponding German Patent Application No. 10 2015 113 657.0 with English translation of German Search Report.

* cited by examiner

FIG.1
EXAMPLE 1
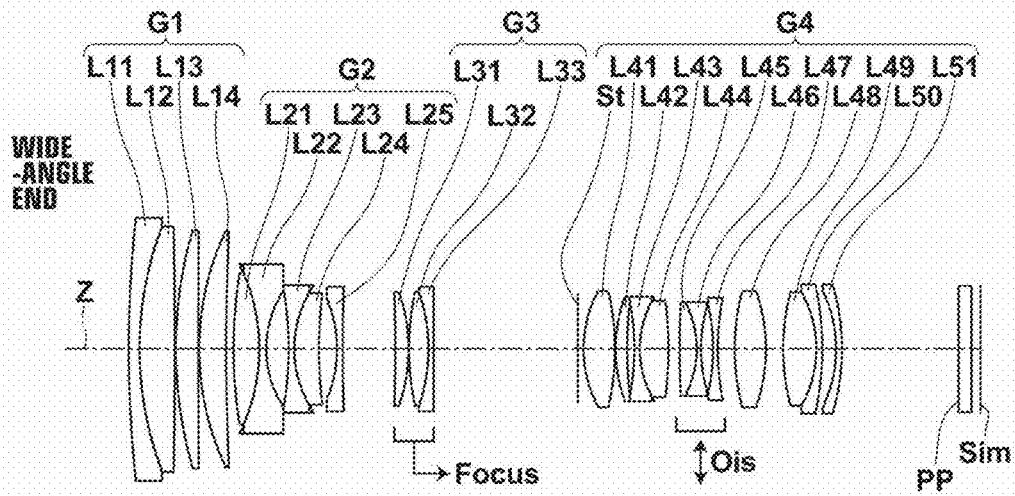
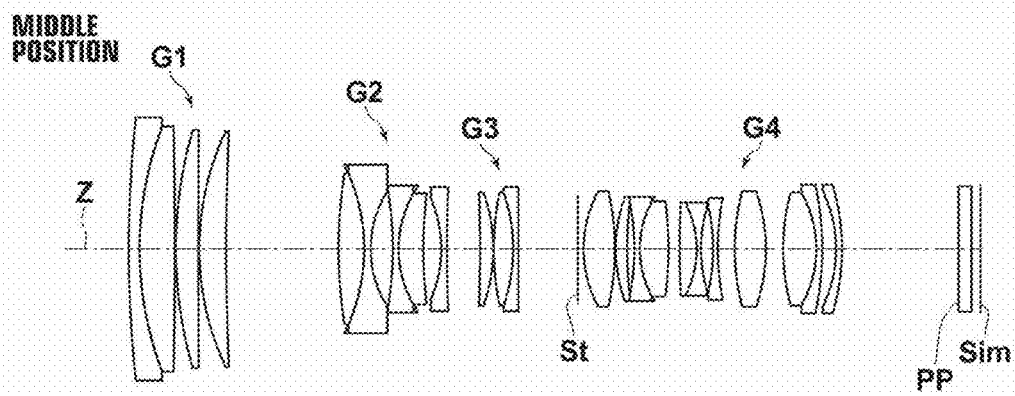
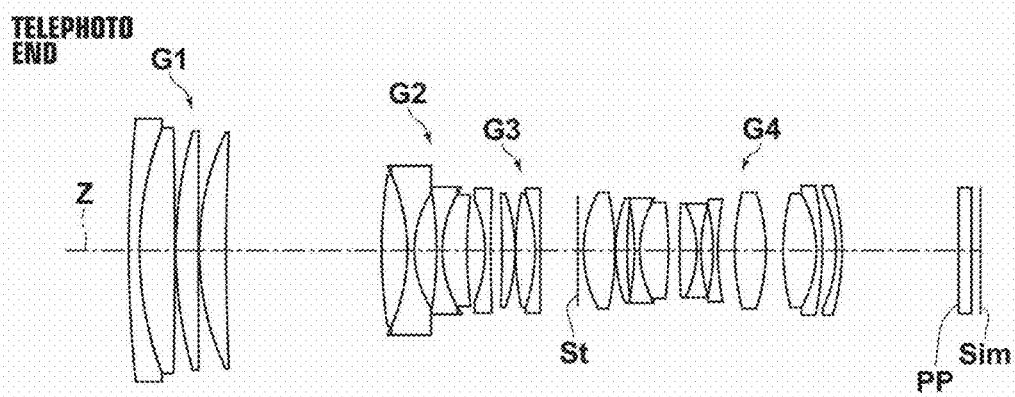

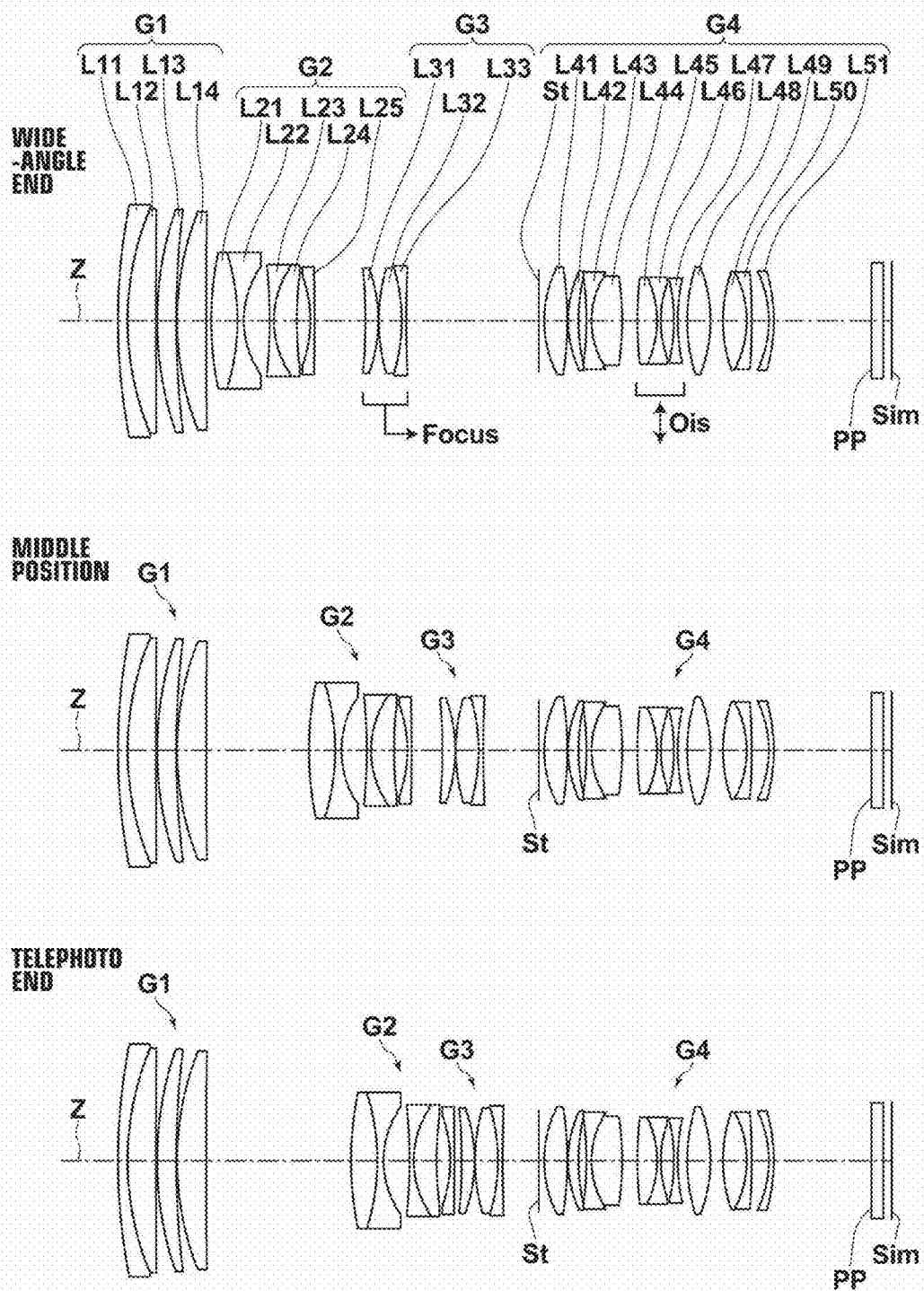

FIG.3    EXAMPLE 3
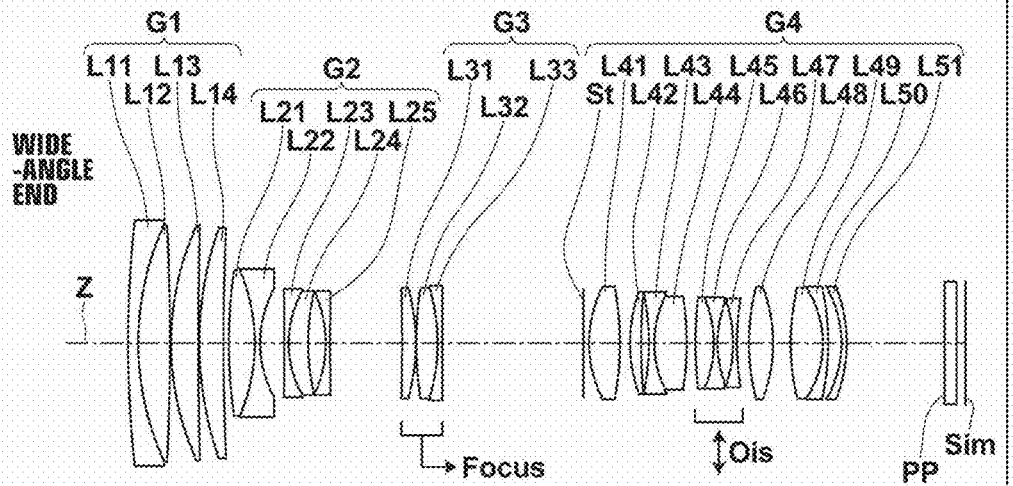
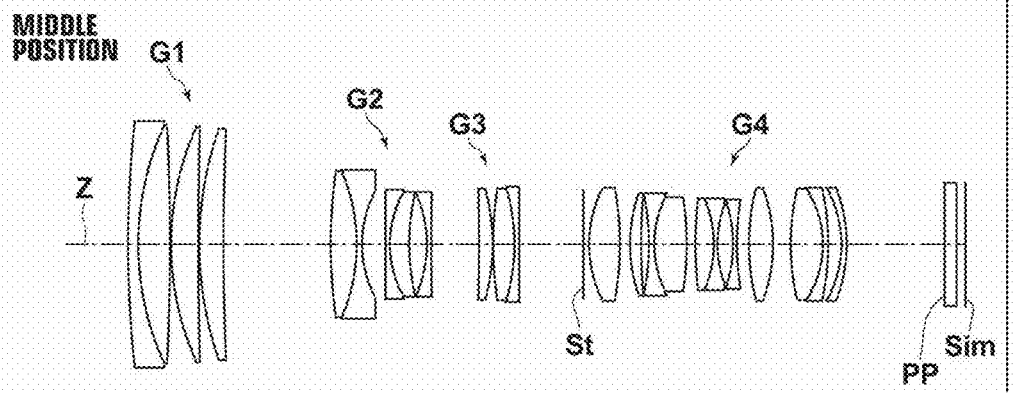
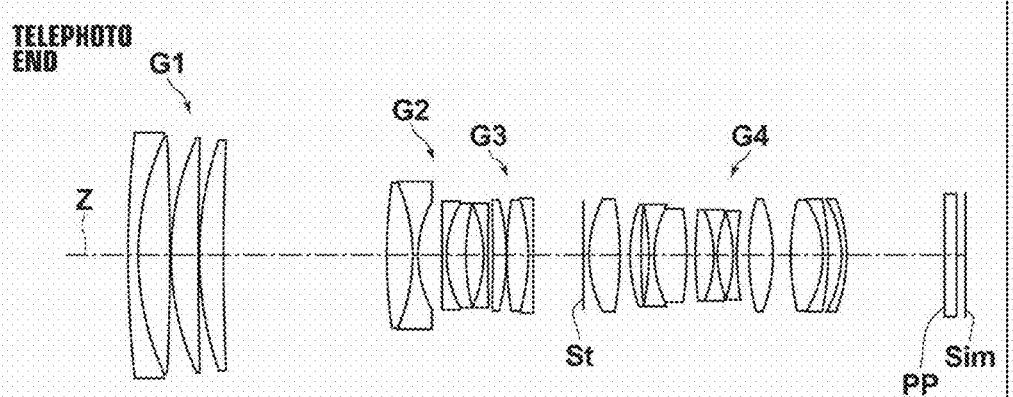

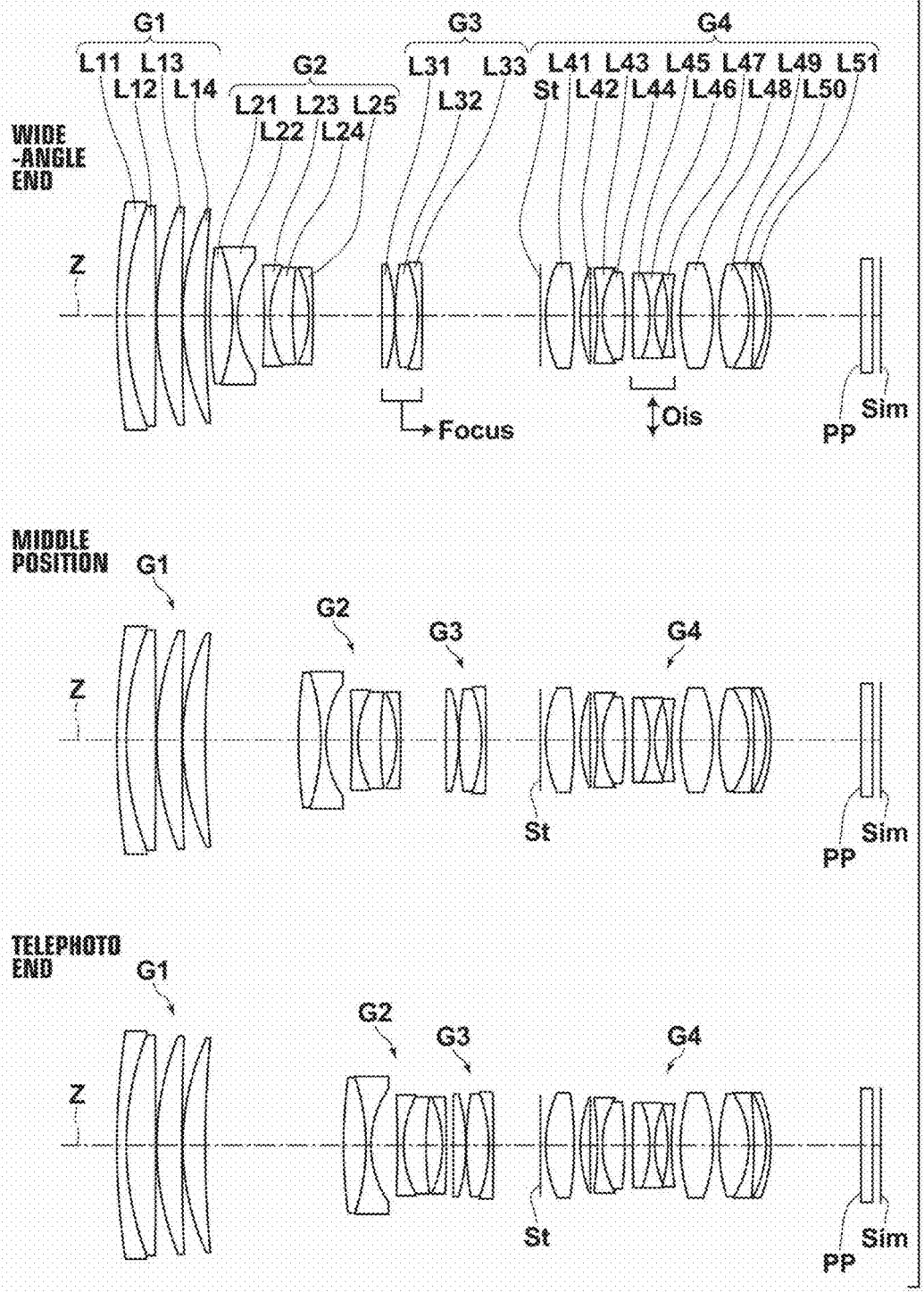

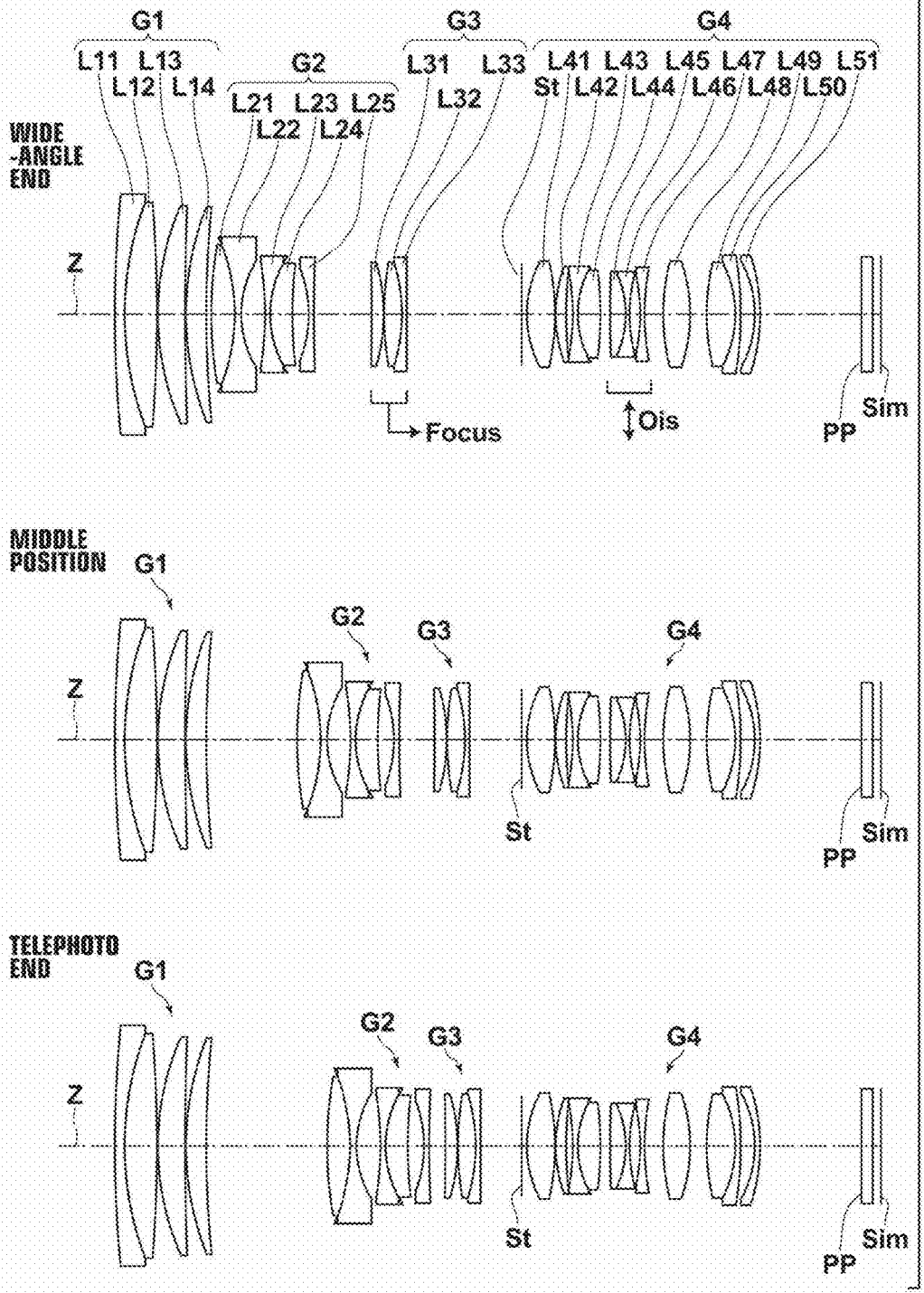

FIG.6 EXAMPLE 6
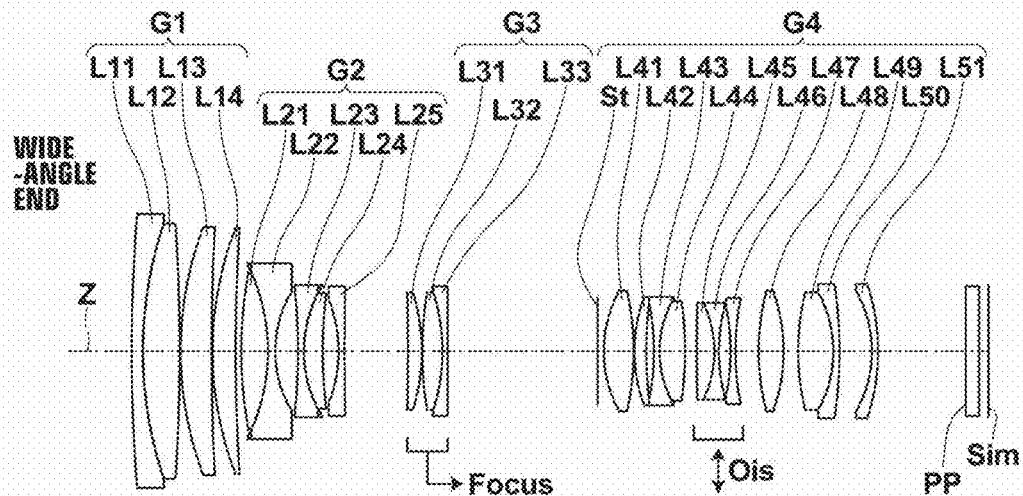
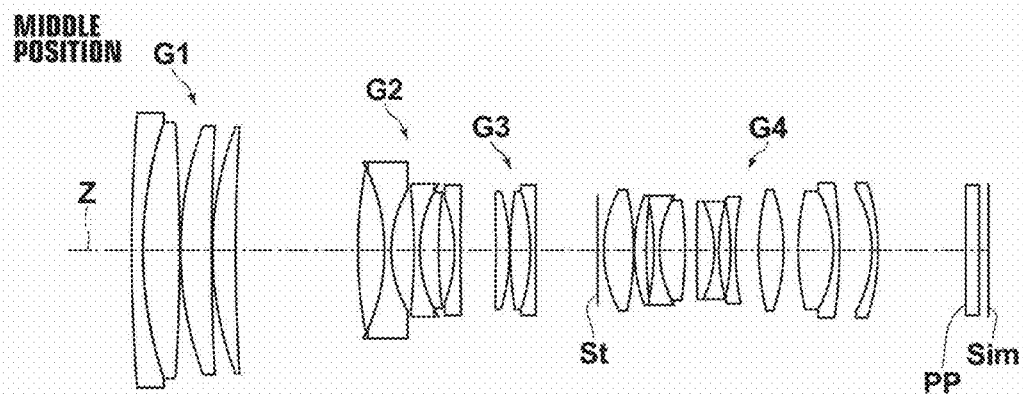
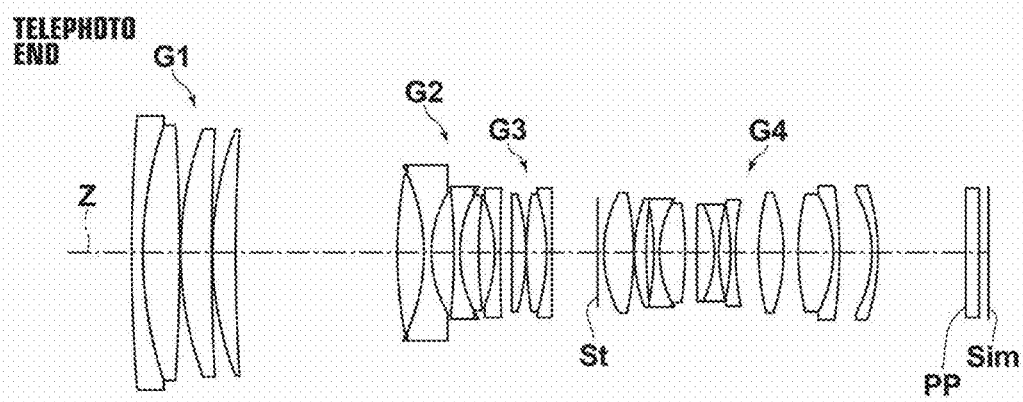

FIG.7
EXAMPLE 7
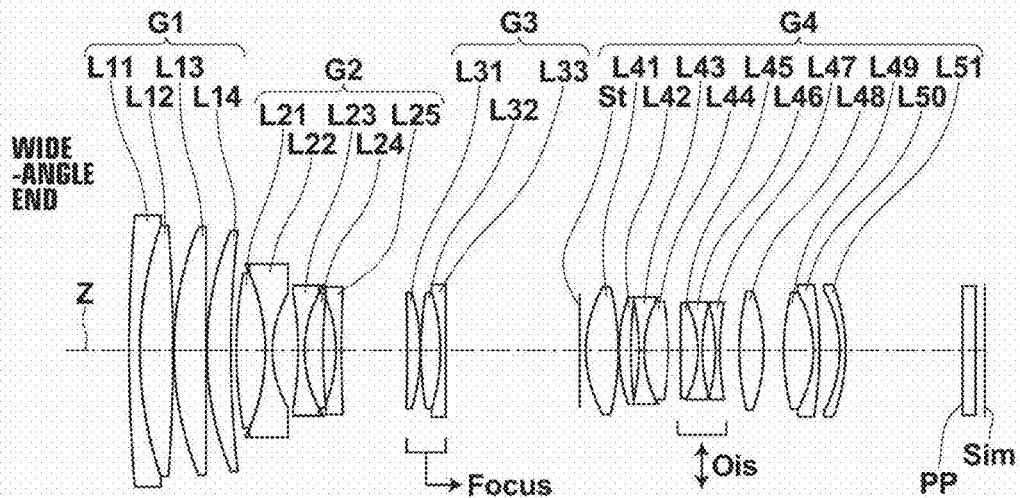
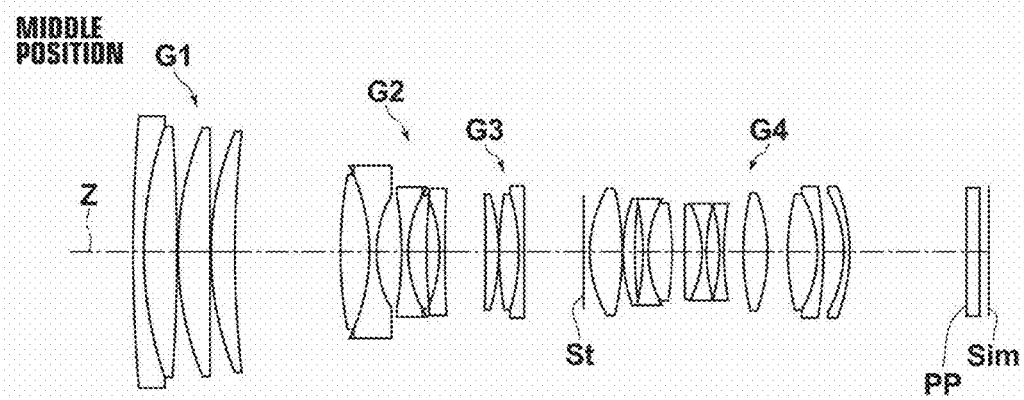
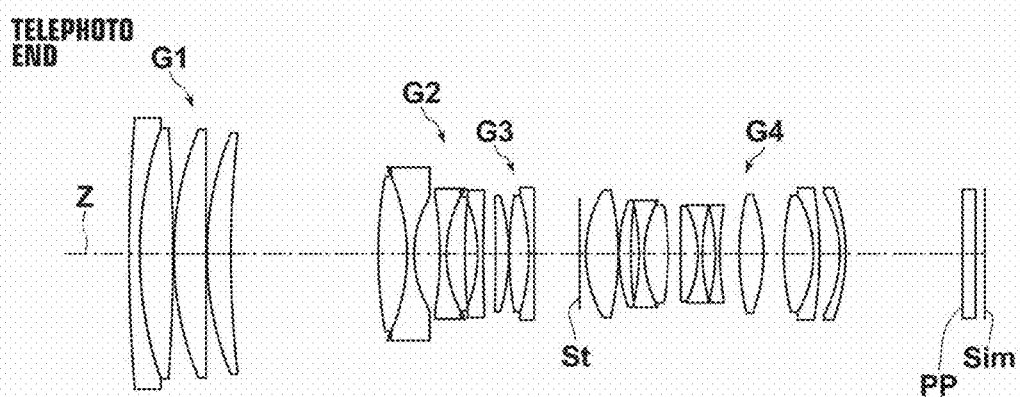

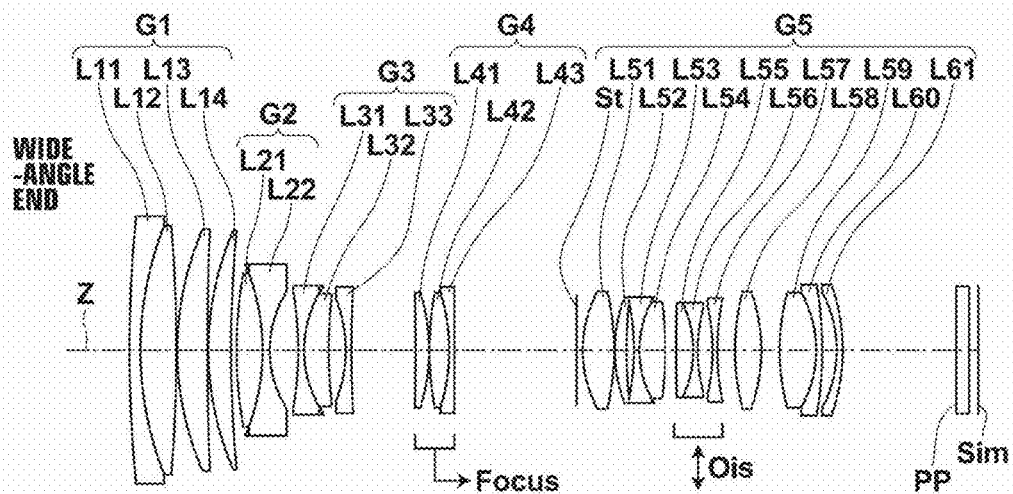
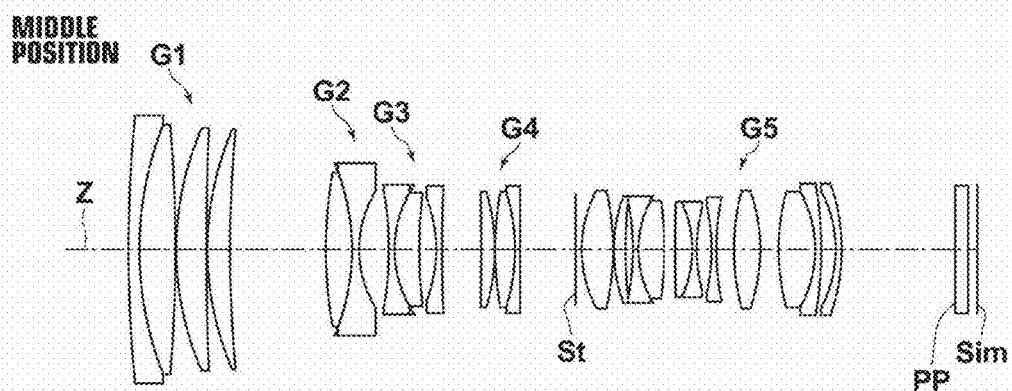
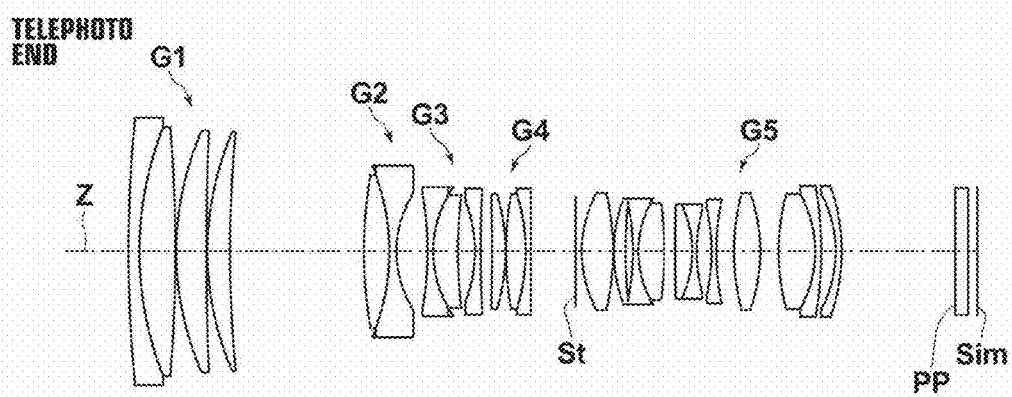

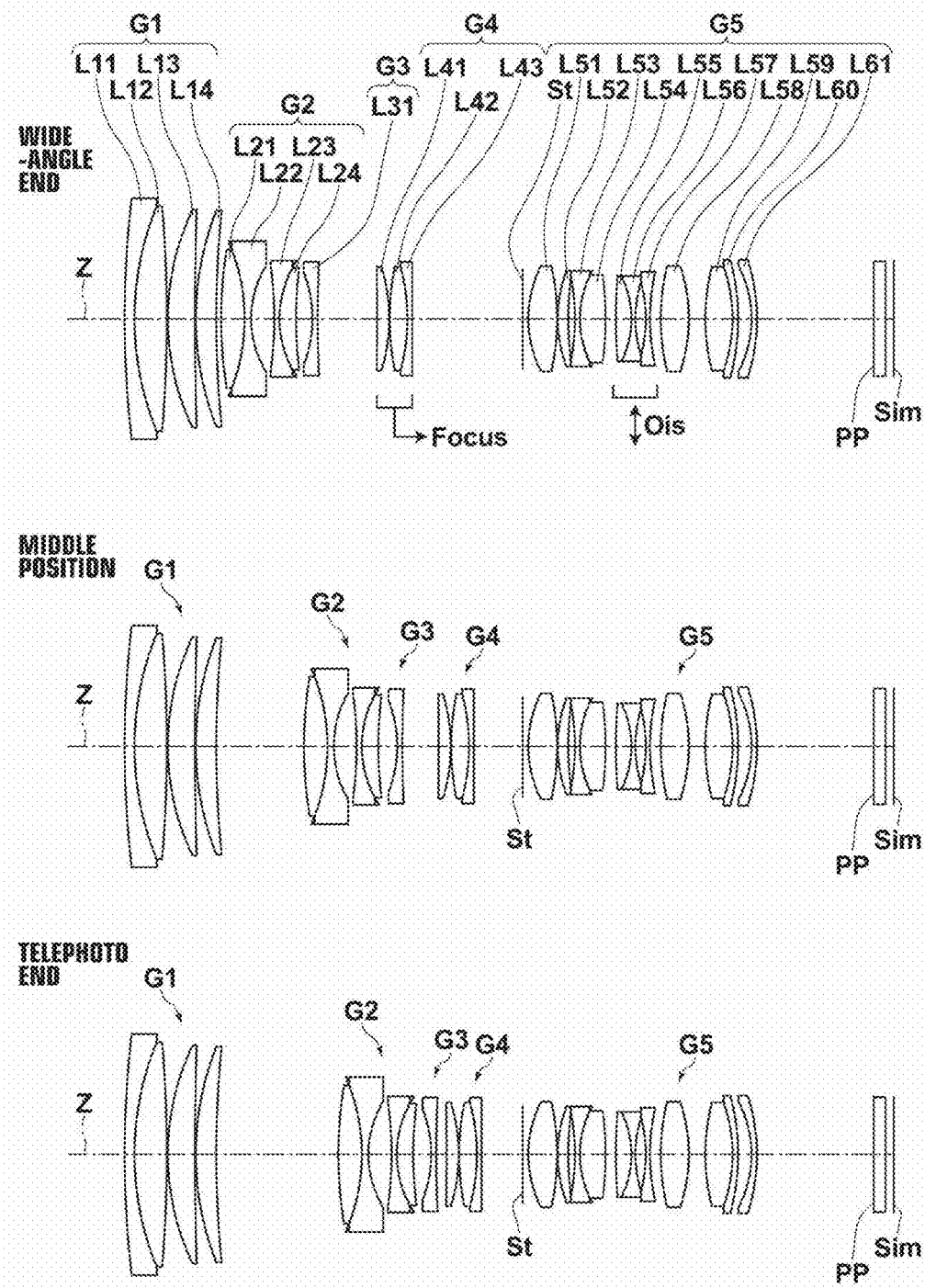

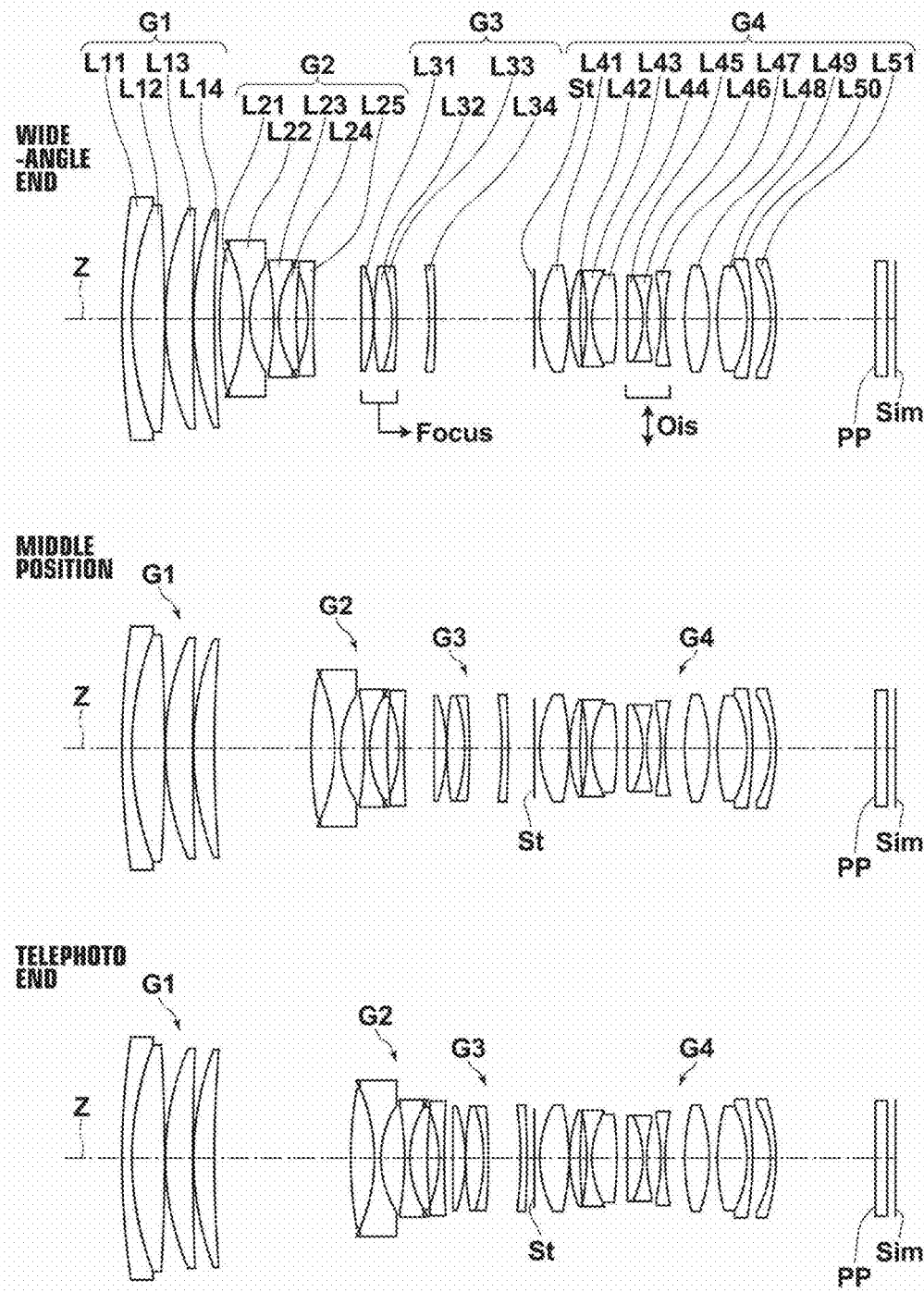

FIG.11 EXAMPLE 11
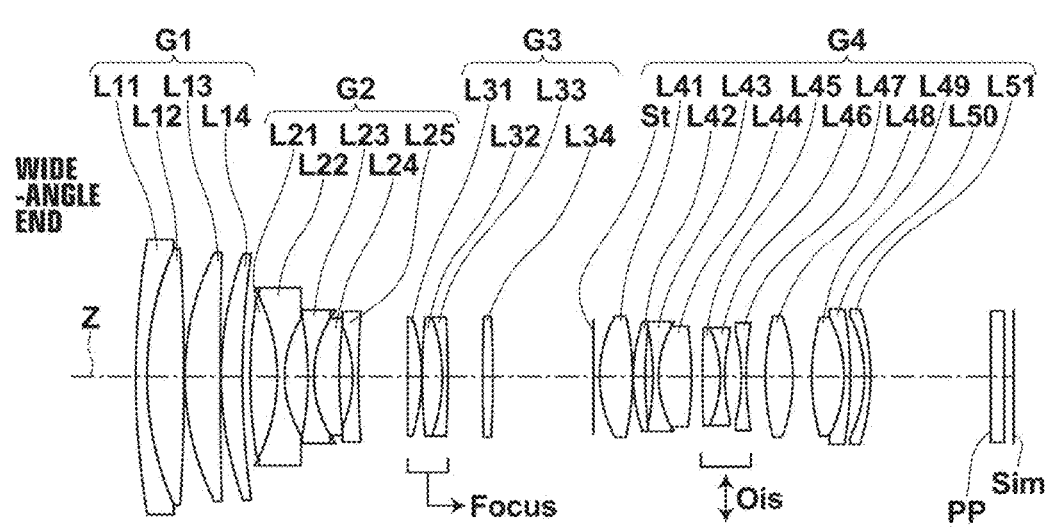
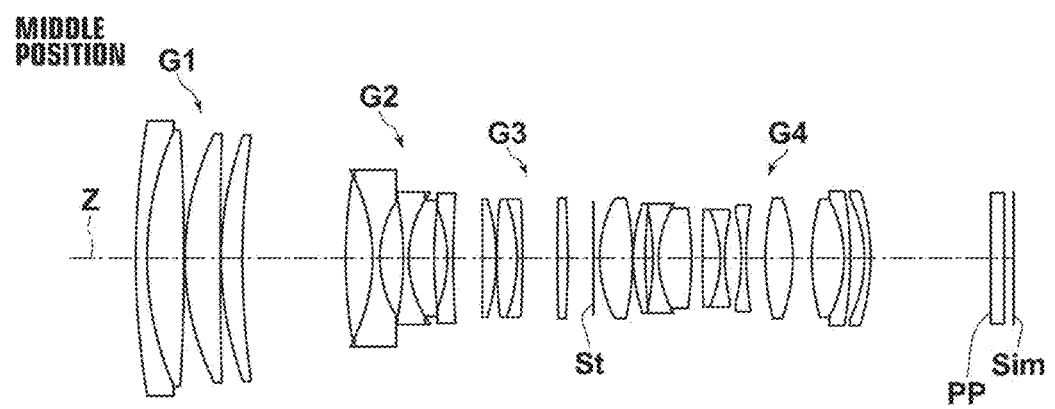
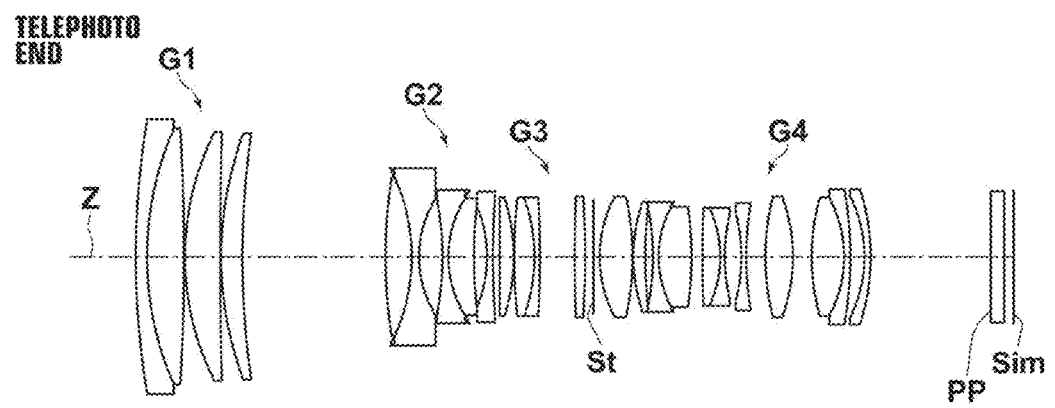

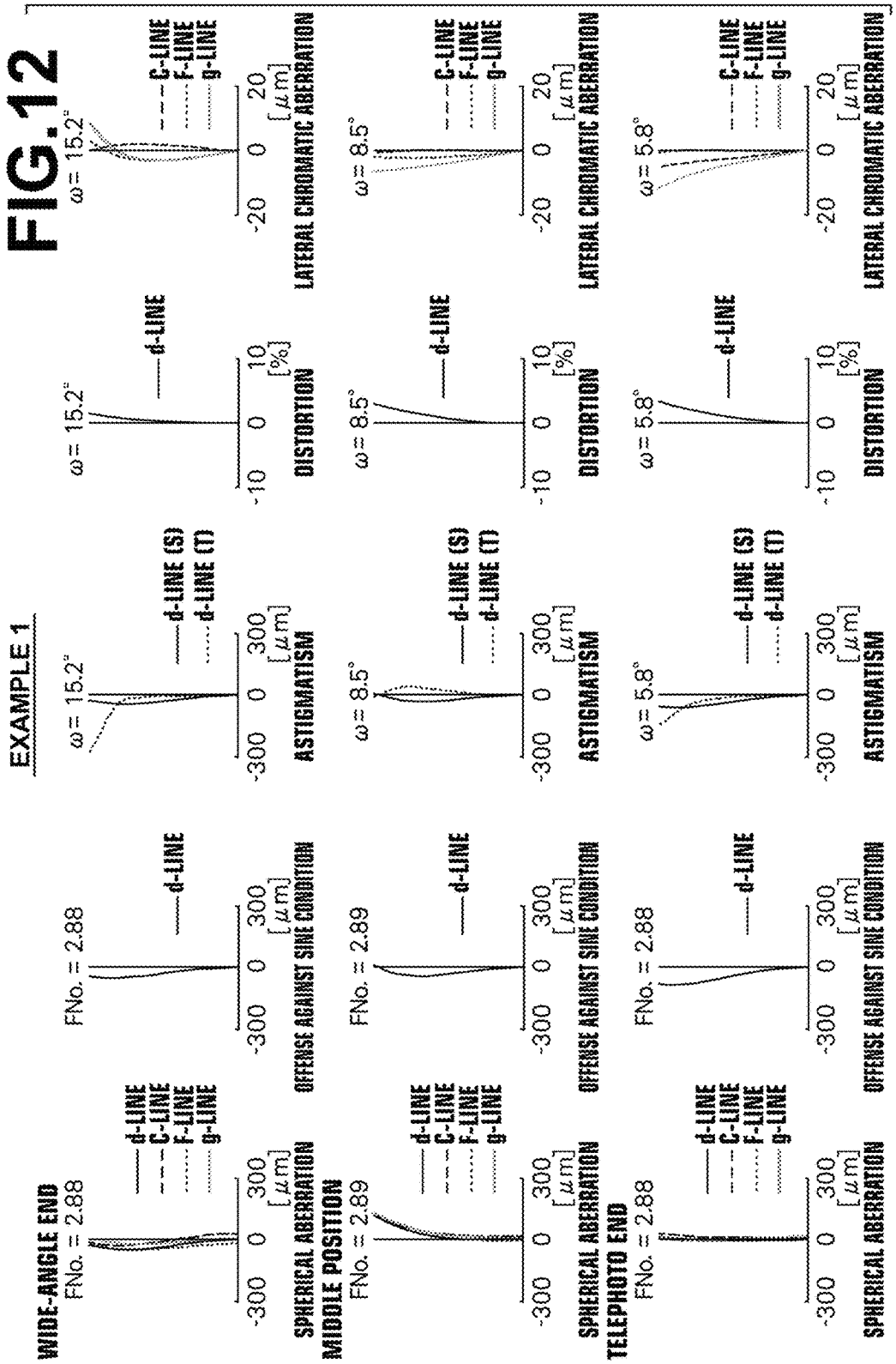

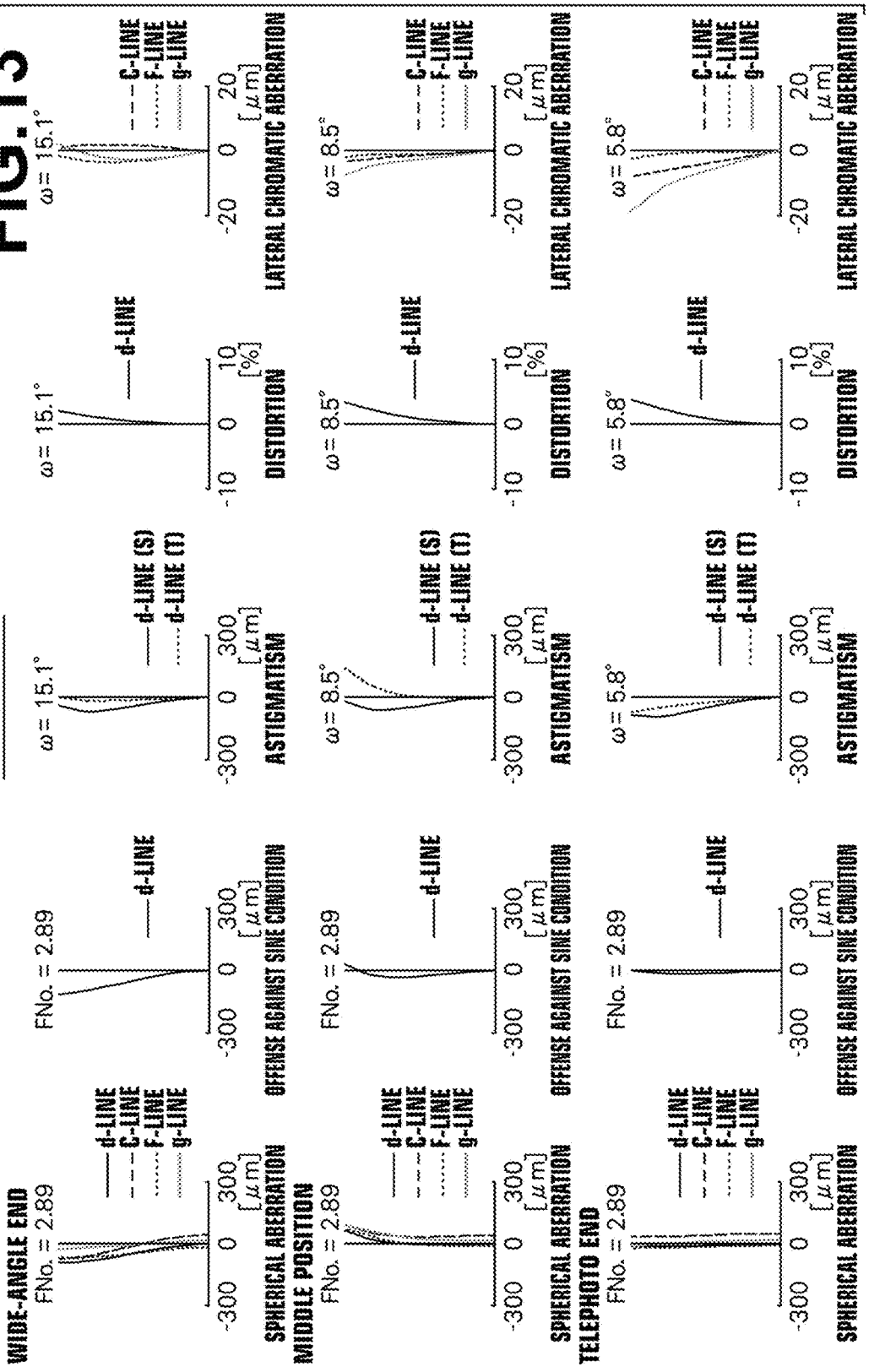

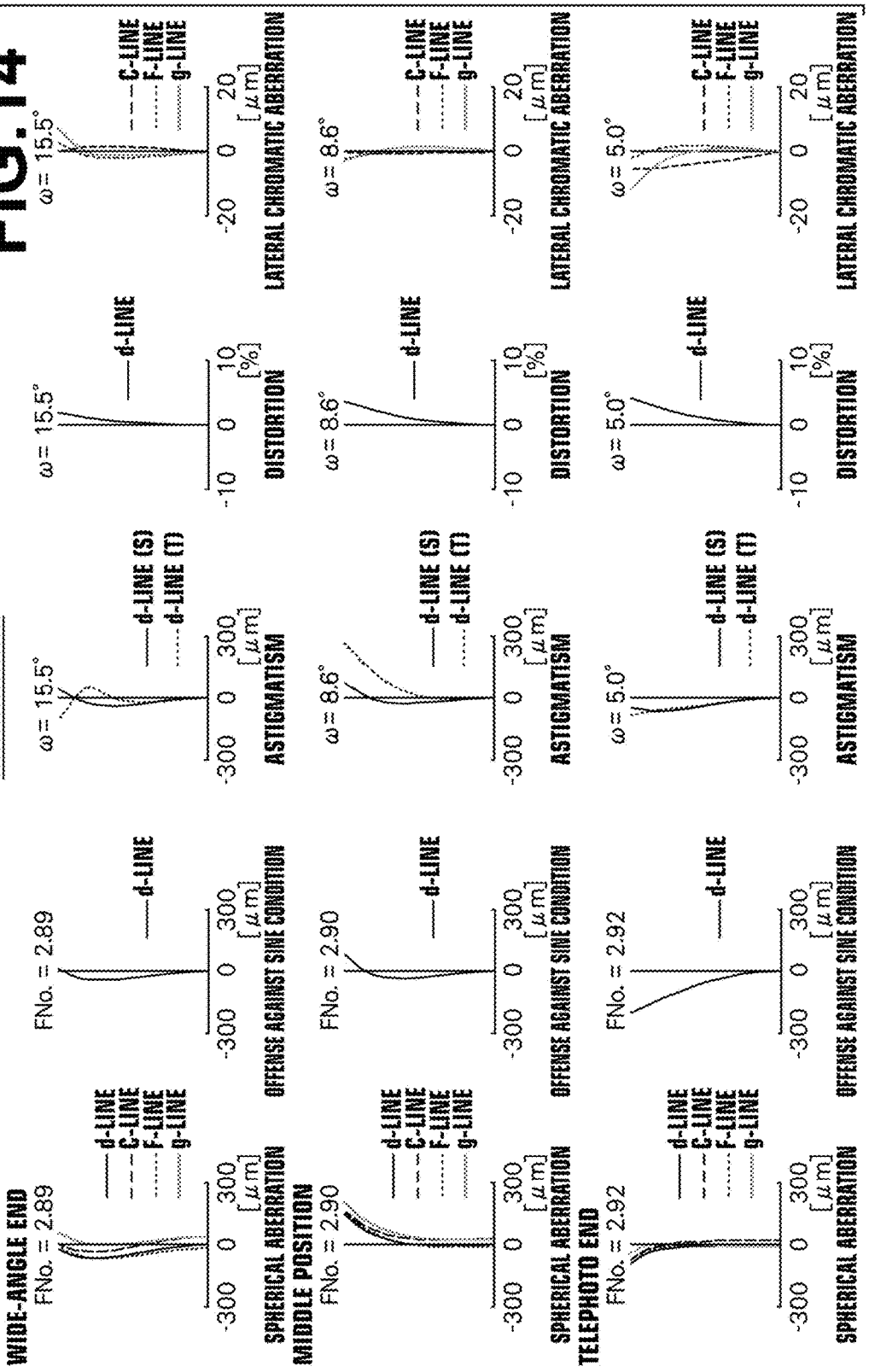

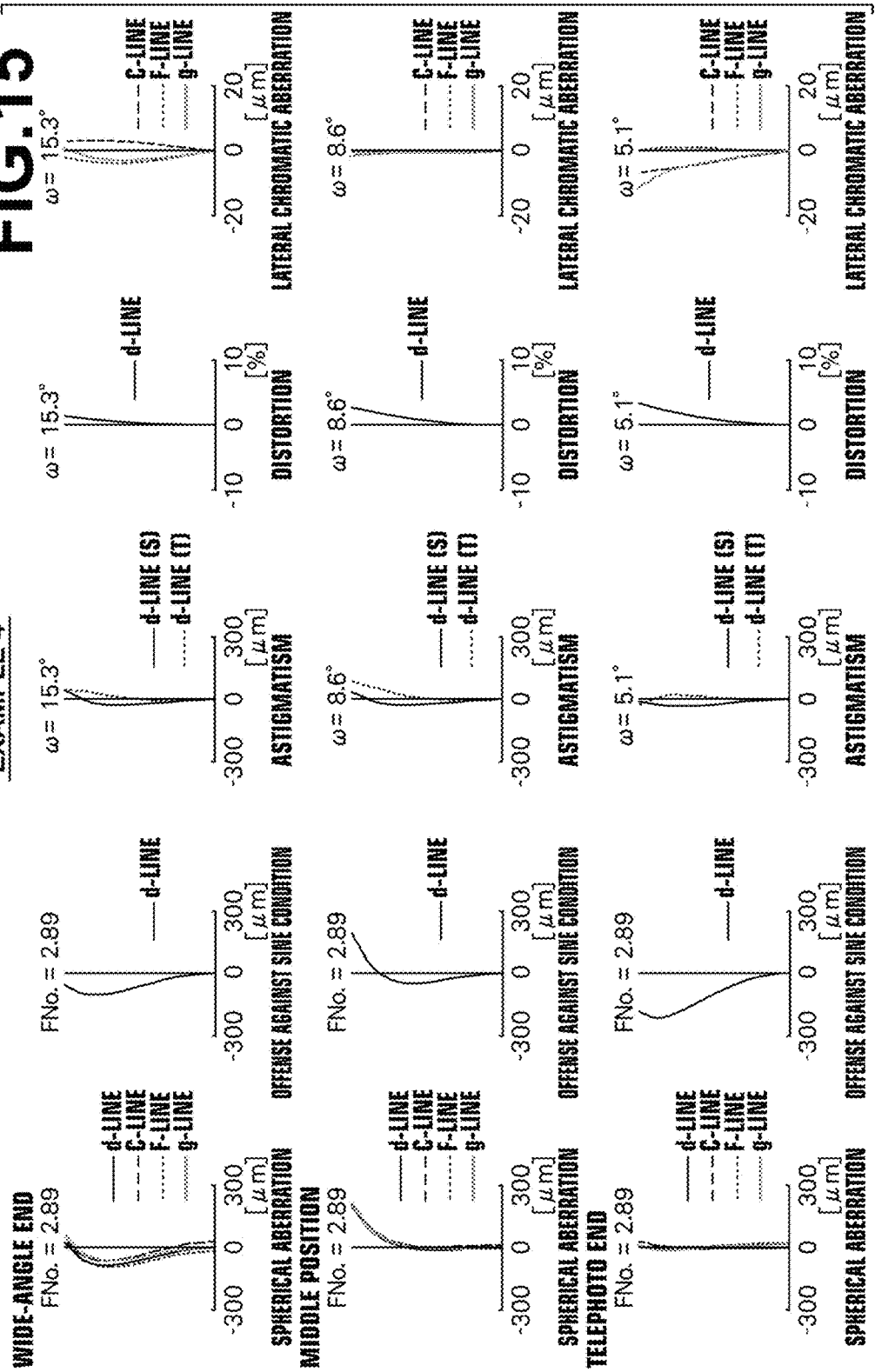

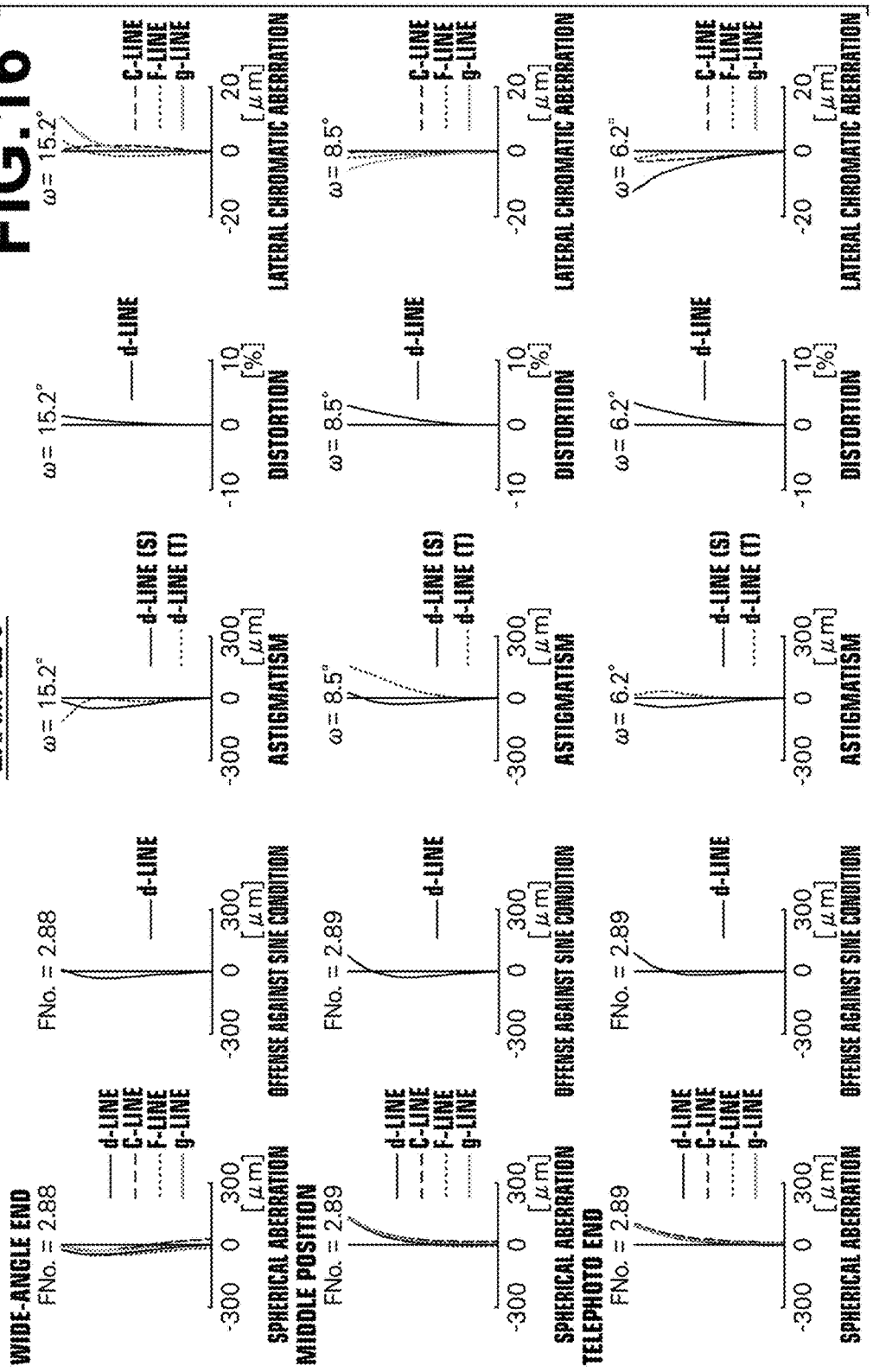

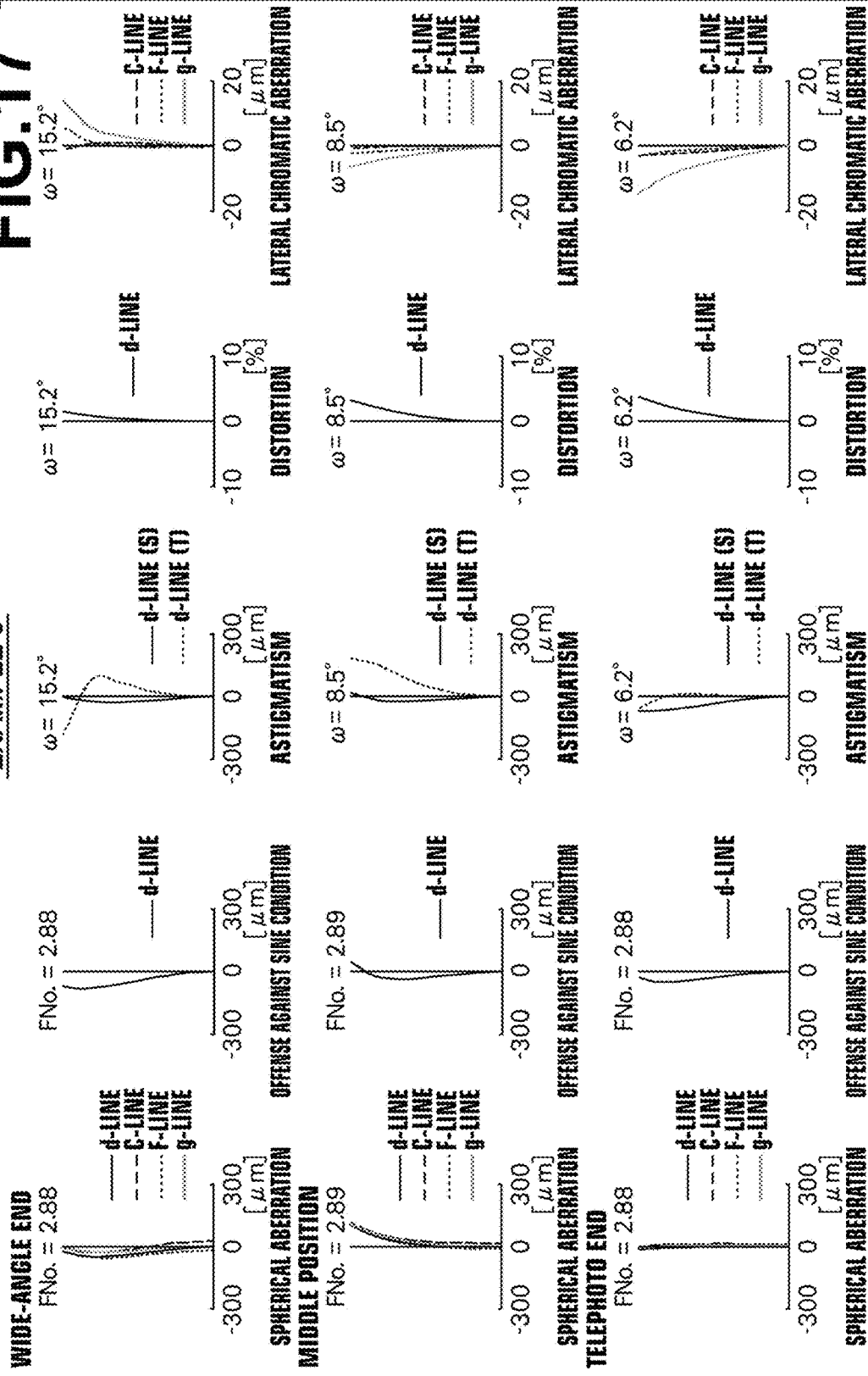

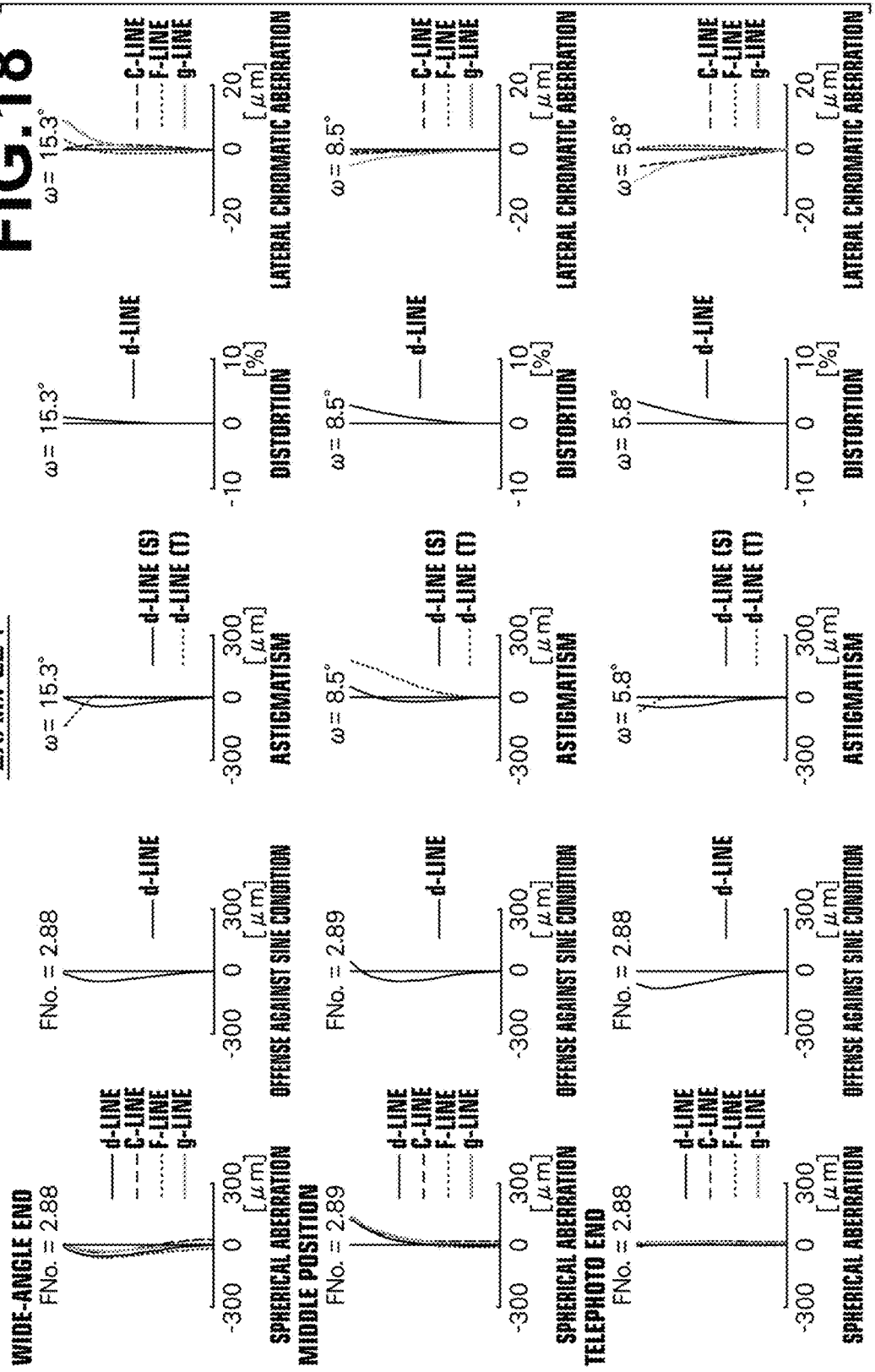

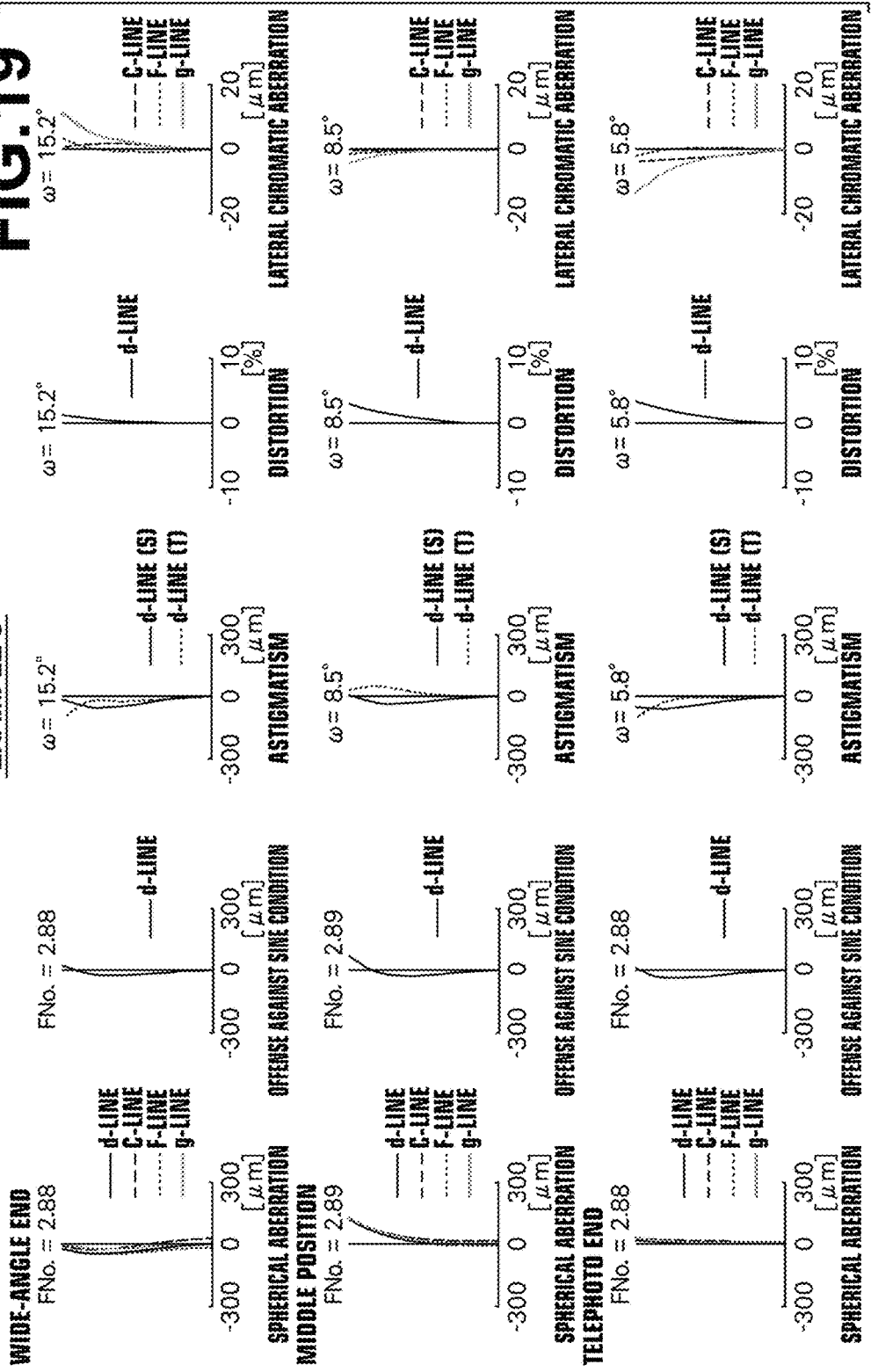

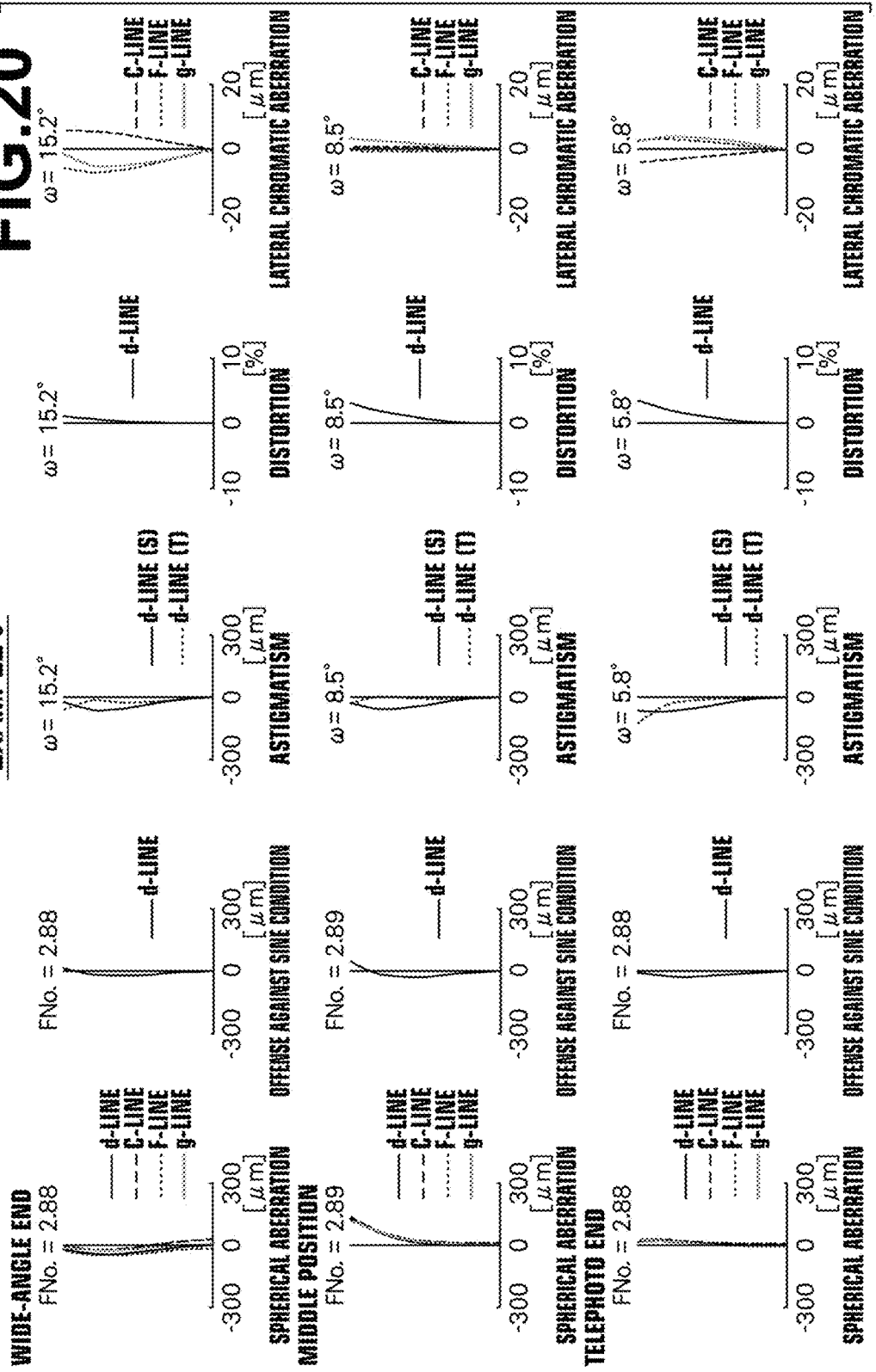

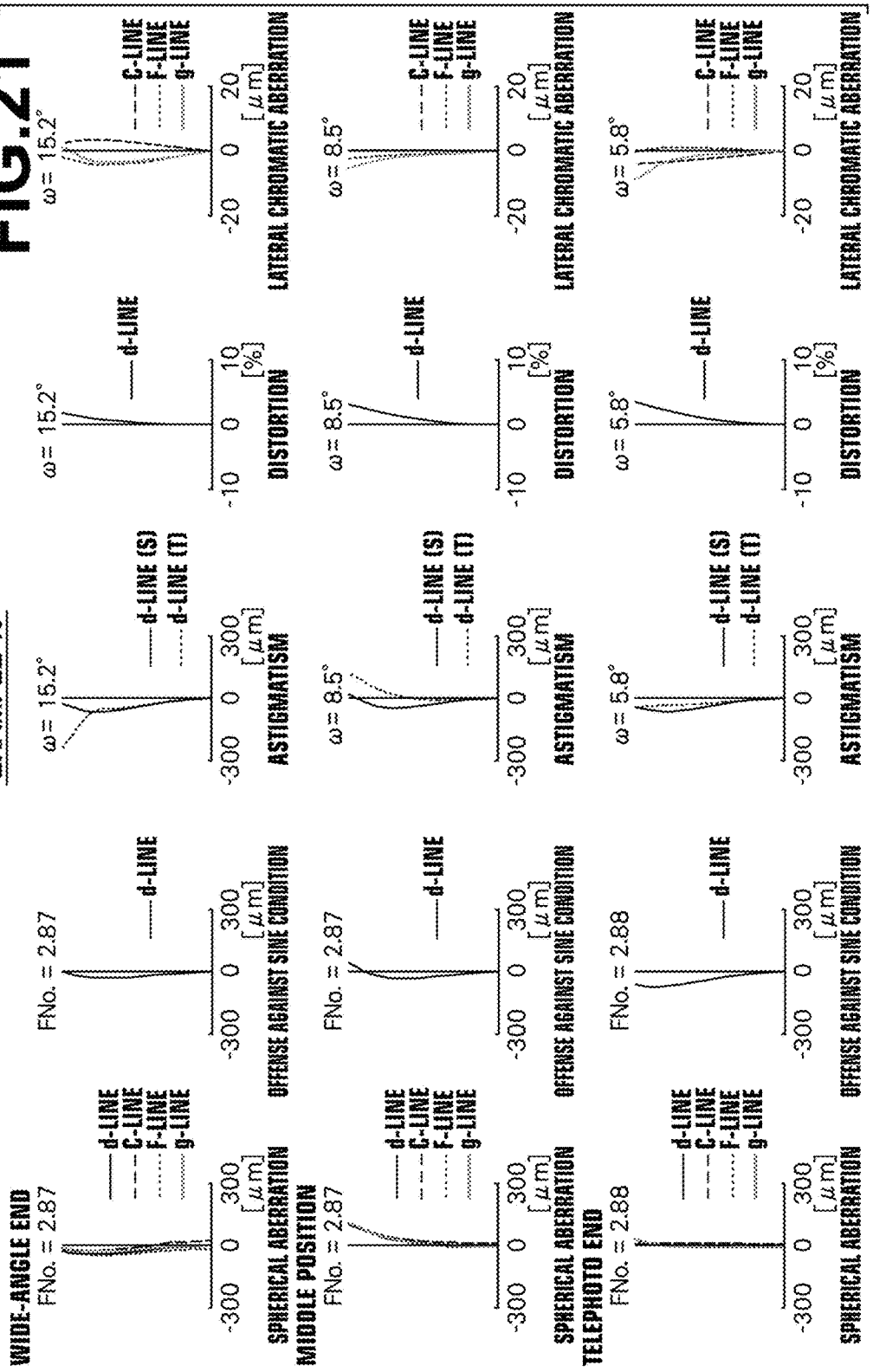

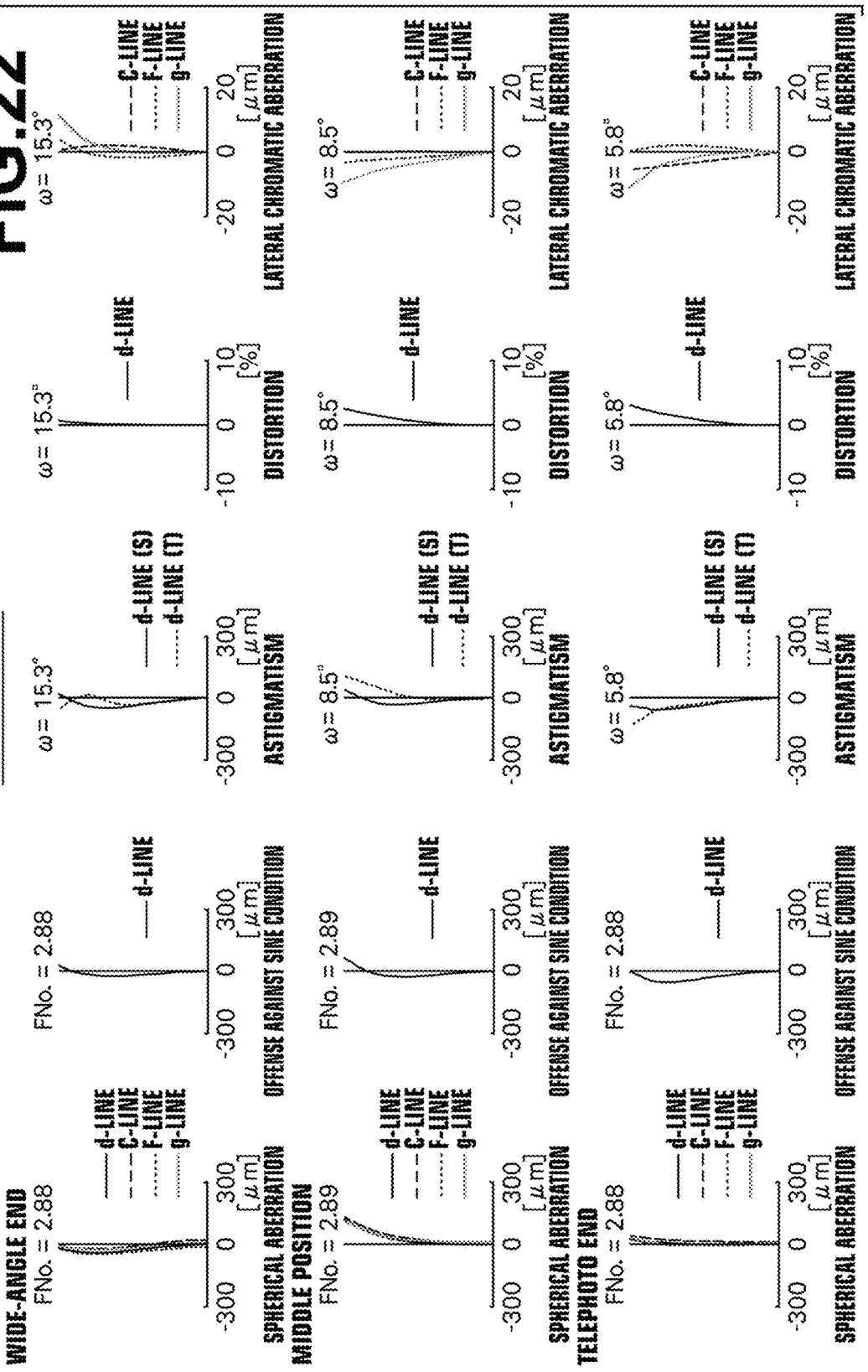

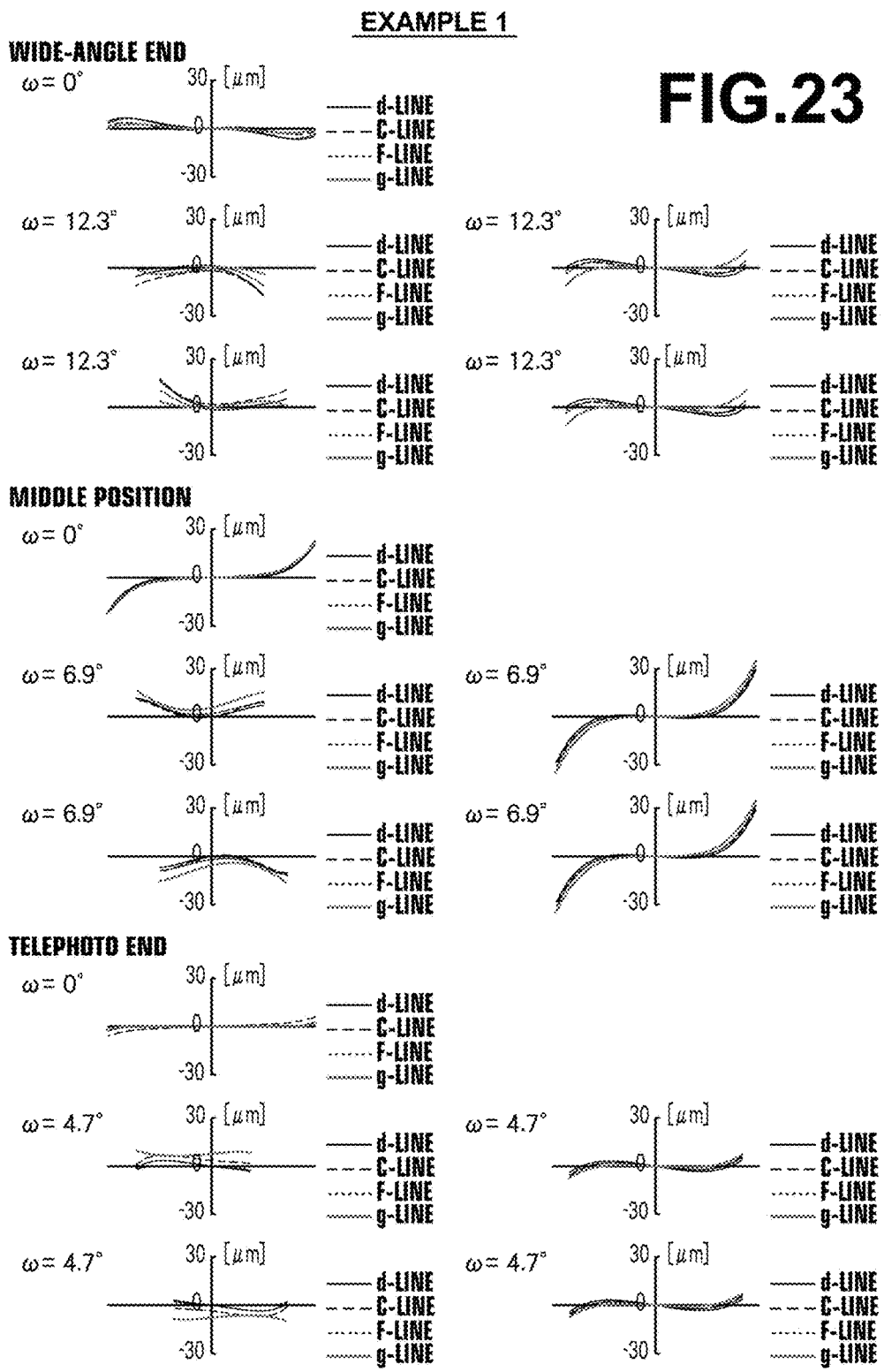

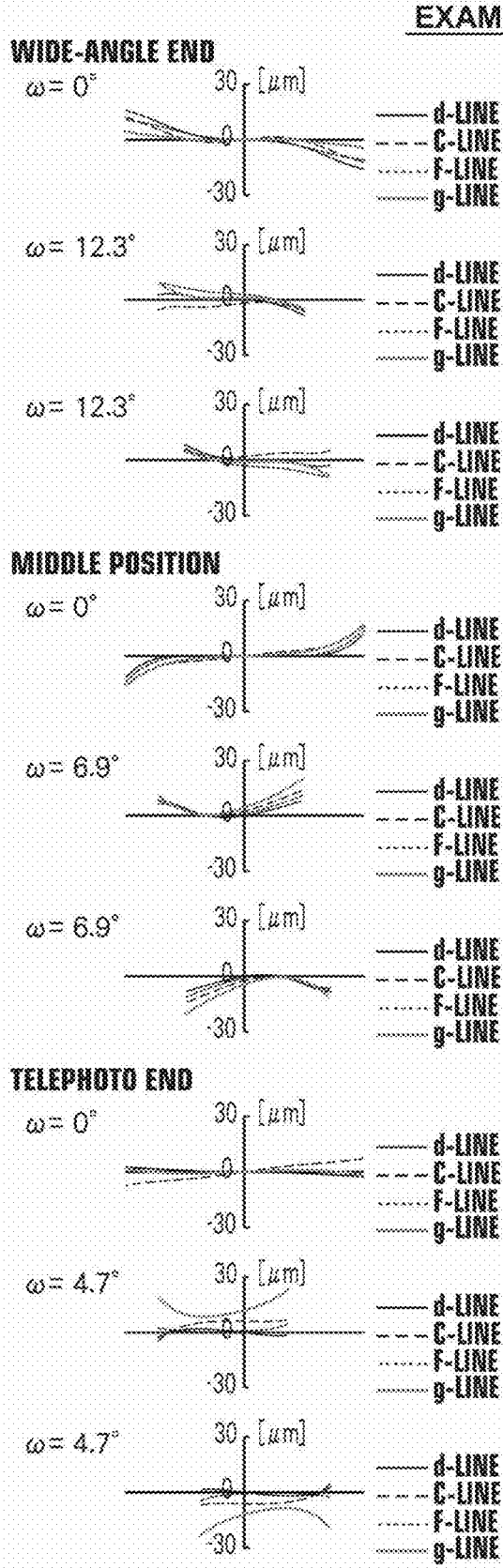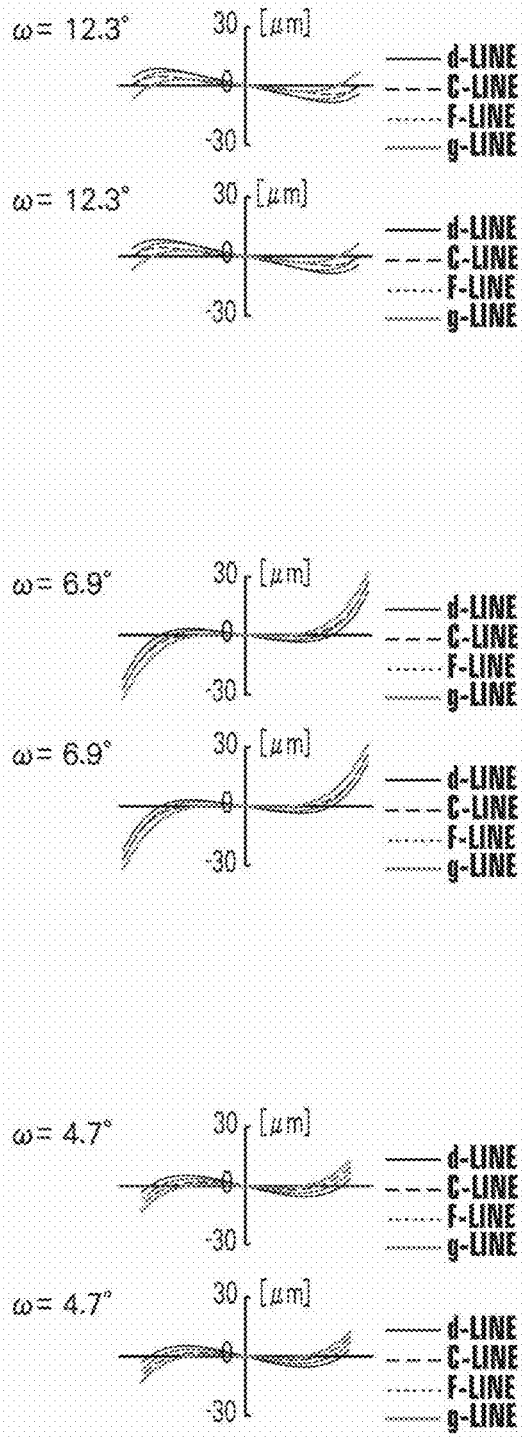
FIG.25 — EXAMPLE 2

FIG.26
EXAMPLE 2
WIDE-ANGLE END, WITH IMAGE STABILIZATION
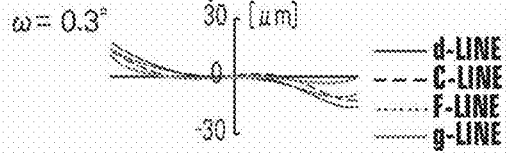
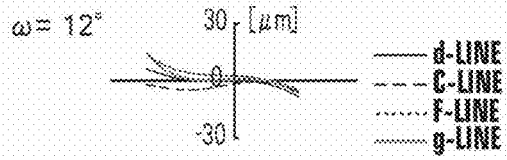 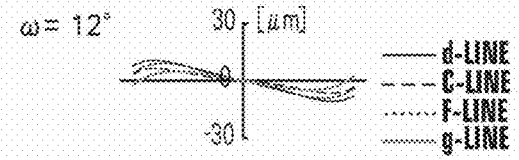
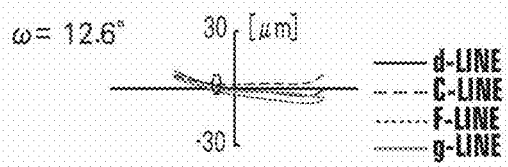 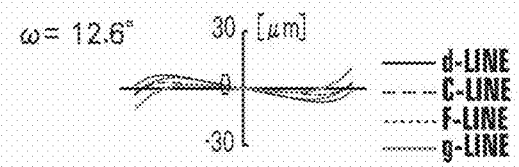
MIDDLE POSITION, WITH IMAGE STABILIZATION
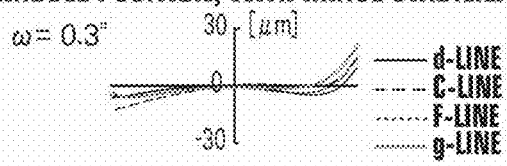
 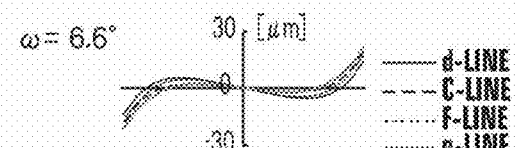
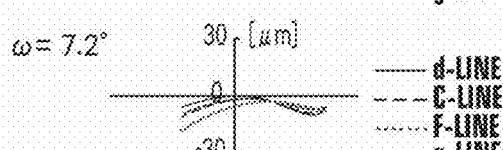 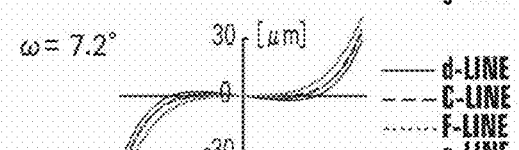
TELEPHOTO END, WITH IMAGE STABILIZATION
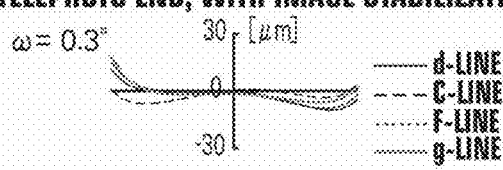
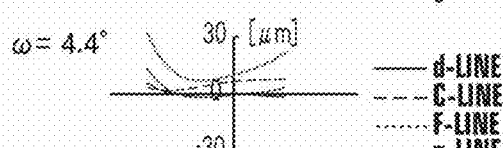 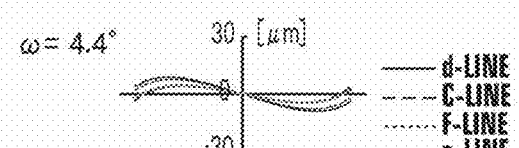
 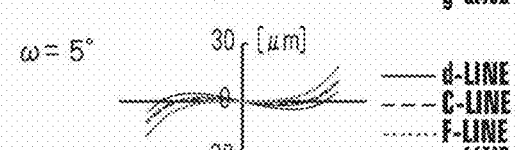

EXAMPLE 3
WIDE-ANGLE END, WITH IMAGE STABILIZATION
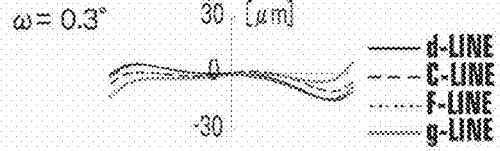
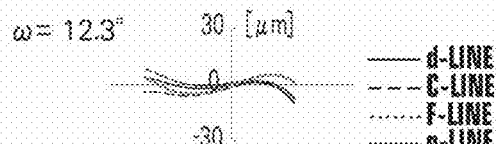
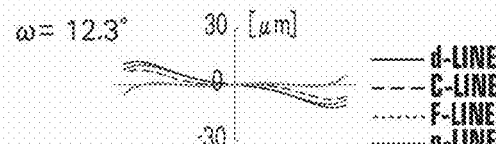
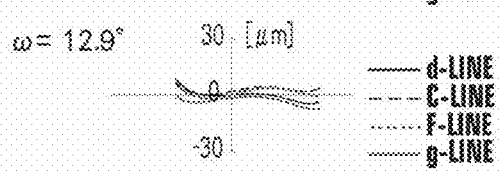
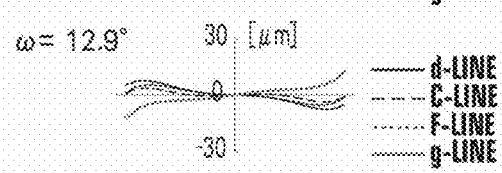
MIDDLE POSITION, WITH IMAGE STABILIZATION
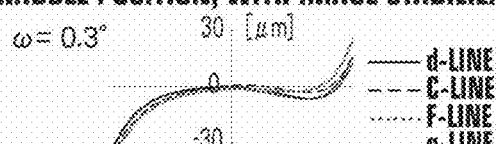
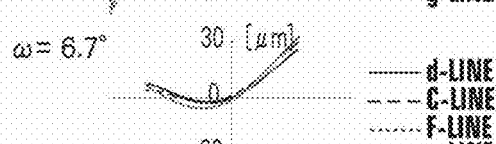
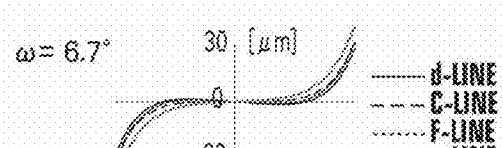
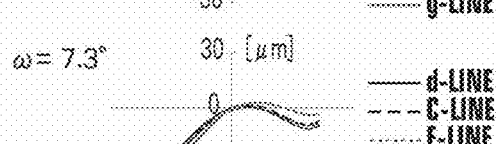
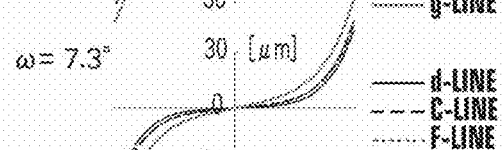
TELEPHOTO END, WITH IMAGE STABILIZATION
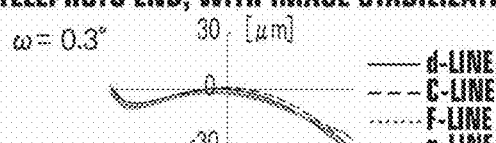
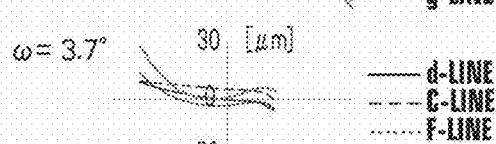
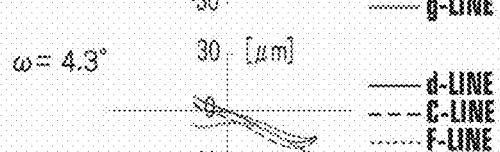
FIG.28

FIG.30
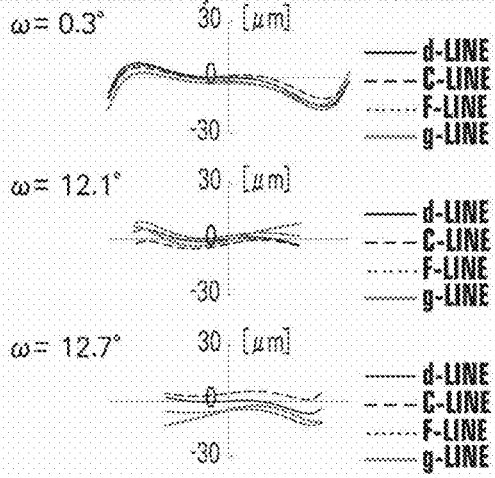
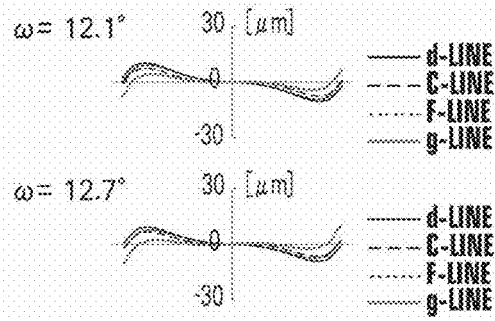
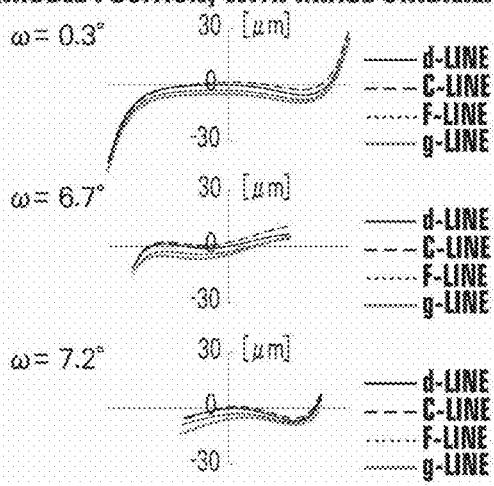
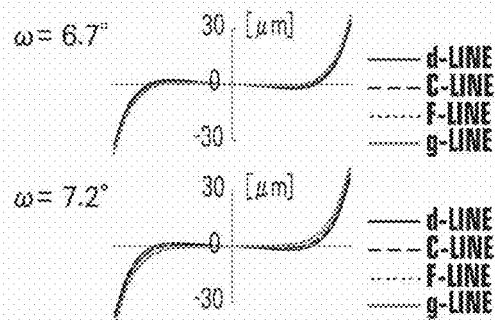
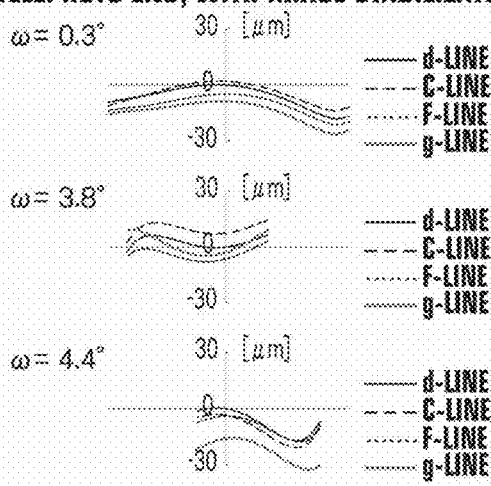
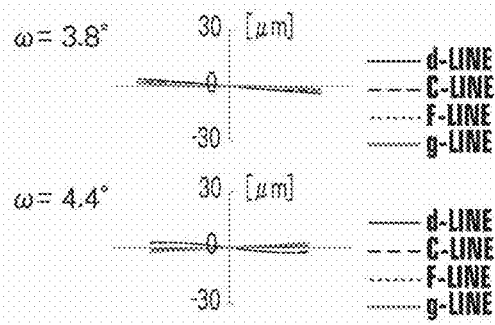

FIG.32
EXAMPLE 5
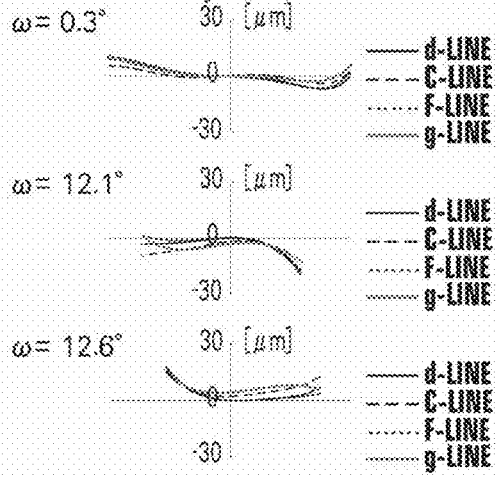
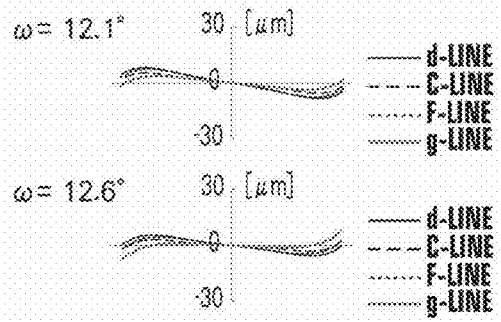
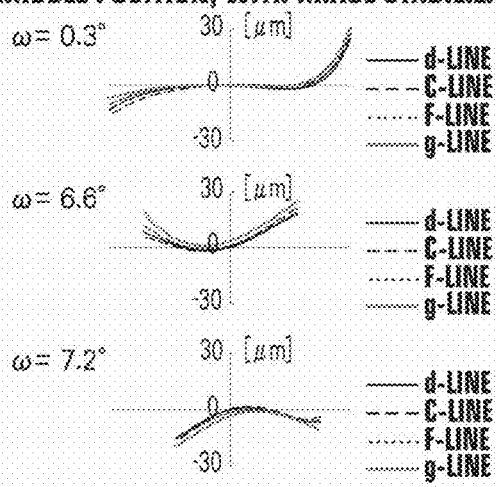
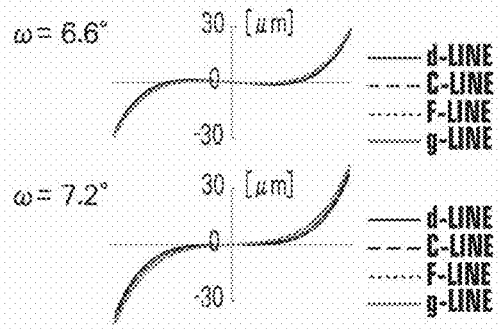
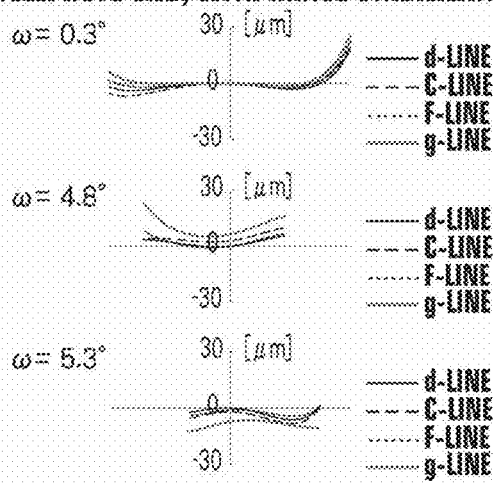
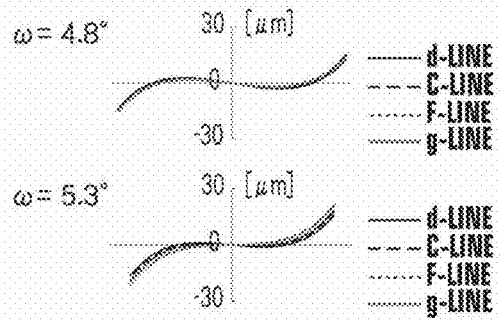

FIG.34
EXAMPLE 6
WIDE-ANGLE END, WITH IMAGE STABILIZATION
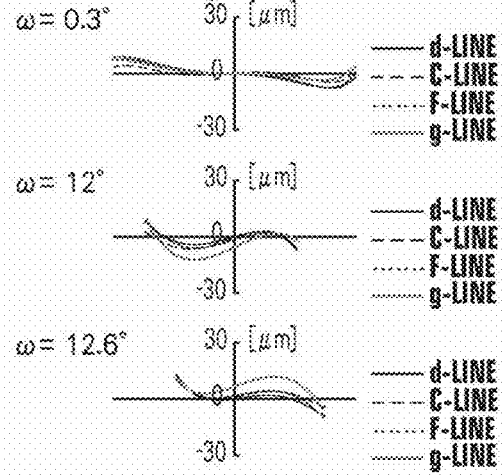
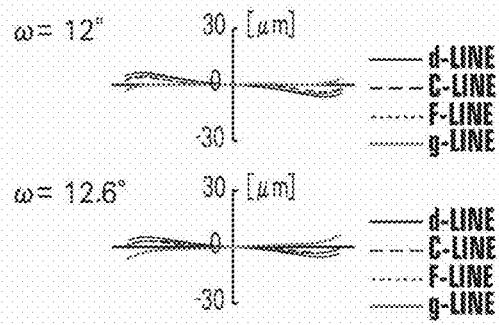
MIDDLE POSITION, WITH IMAGE STABILIZATION
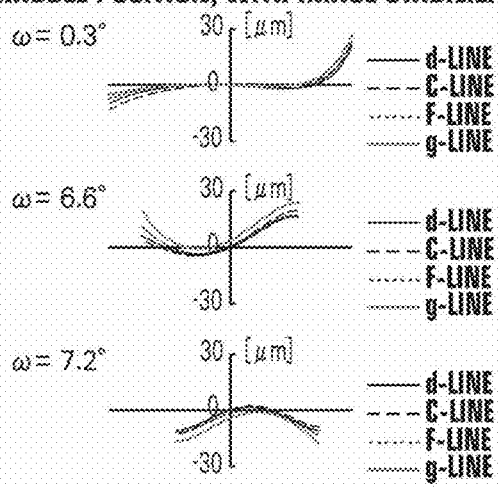
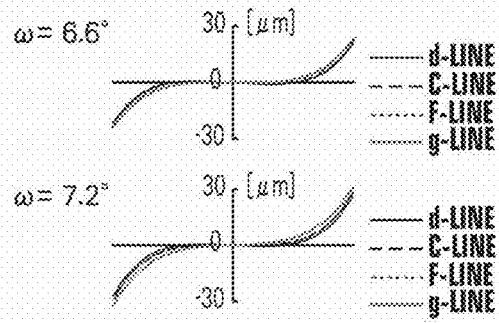
TELEPHOTO END, WITH IMAGE STABILIZATION
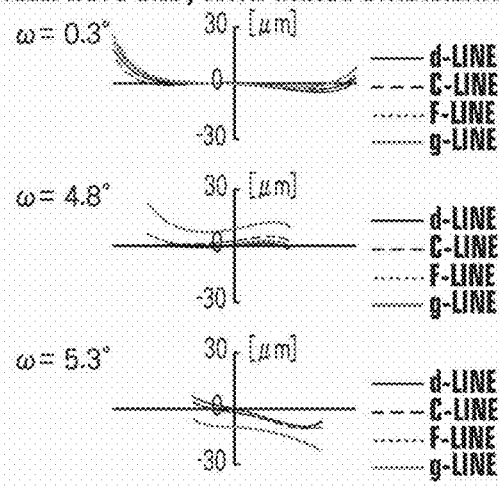
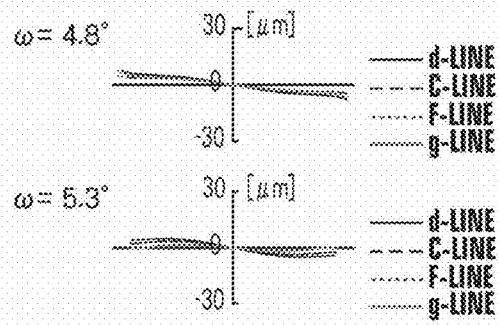

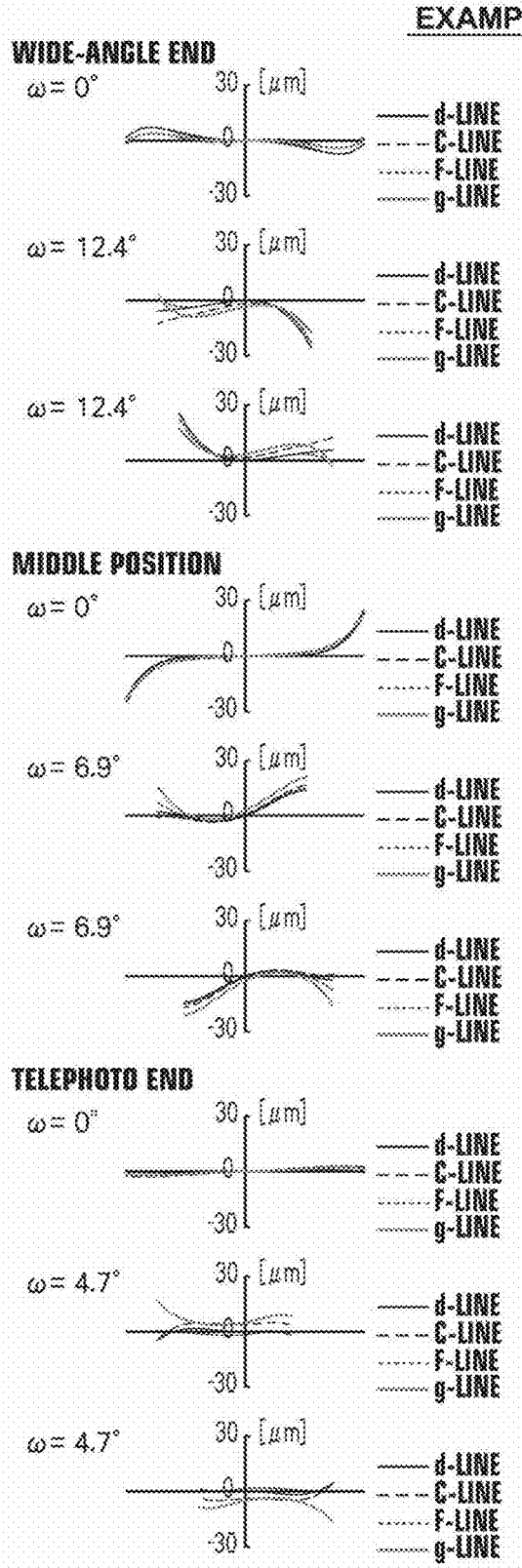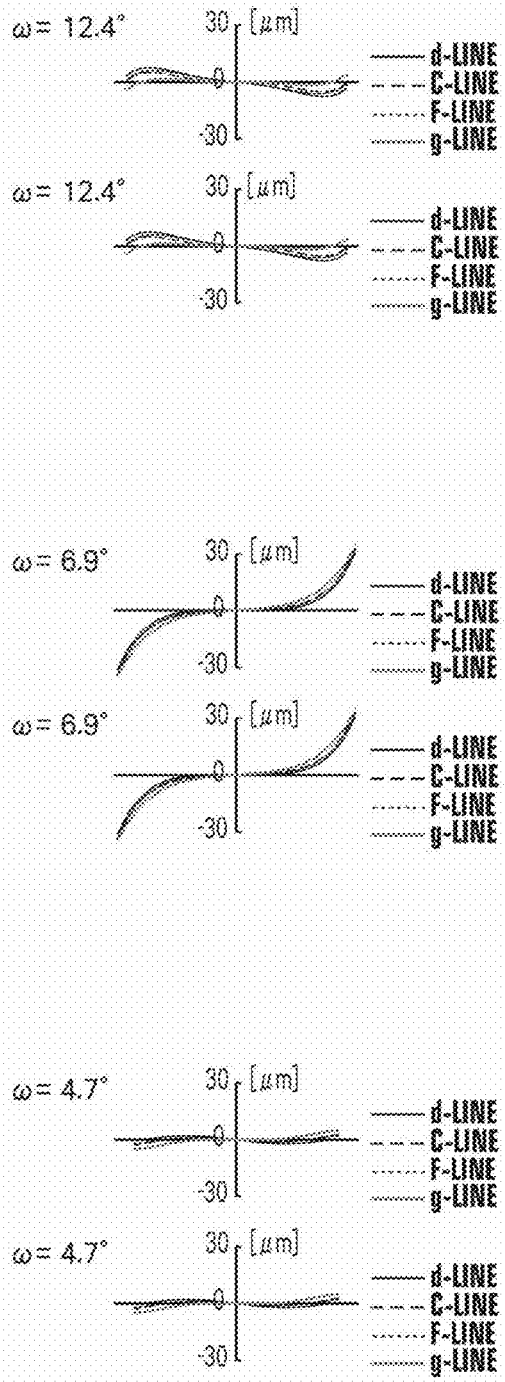
FIG.35 — EXAMPLE 7

FIG.36
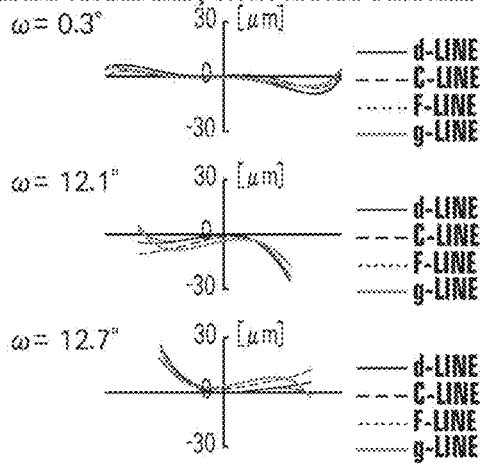
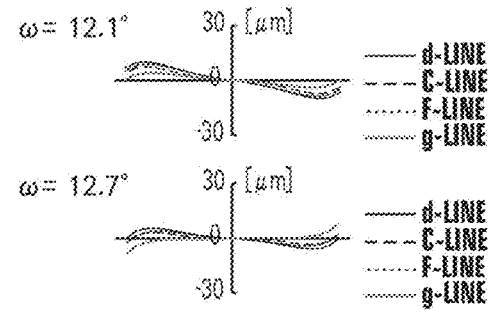
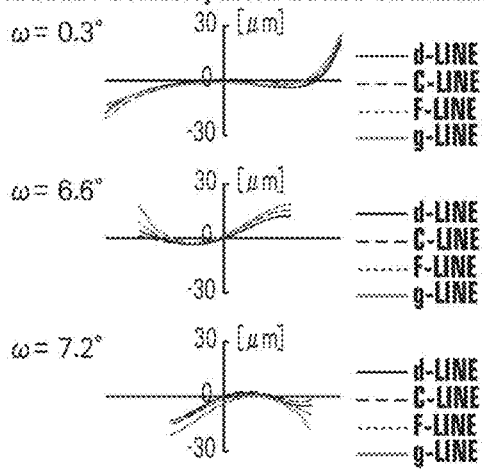
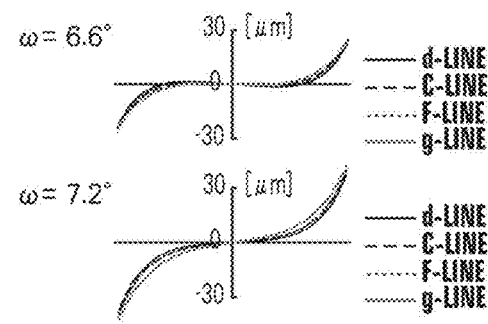
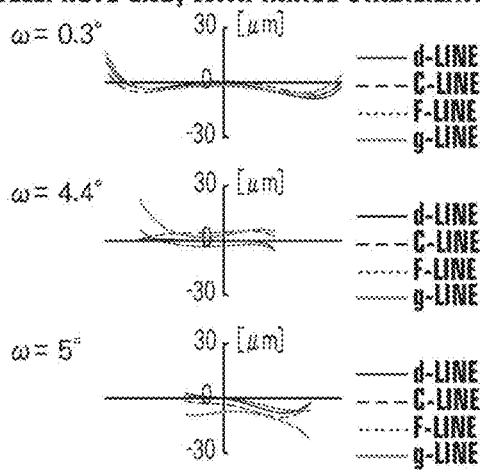
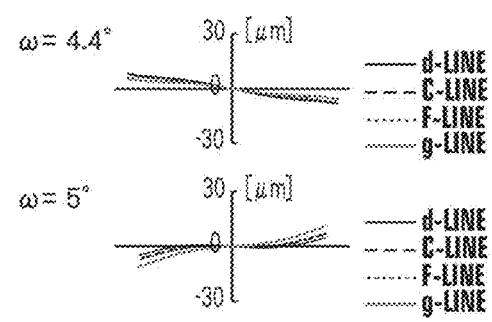

FIG.38
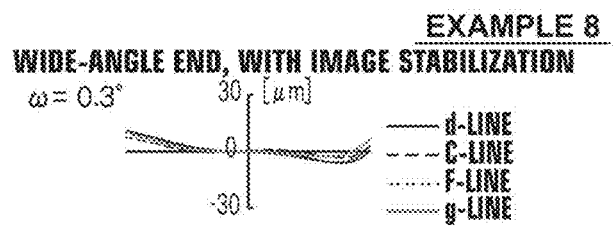
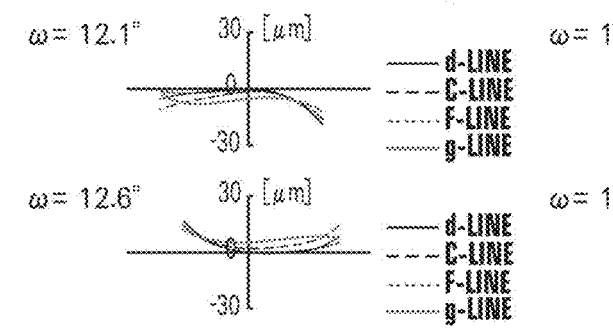
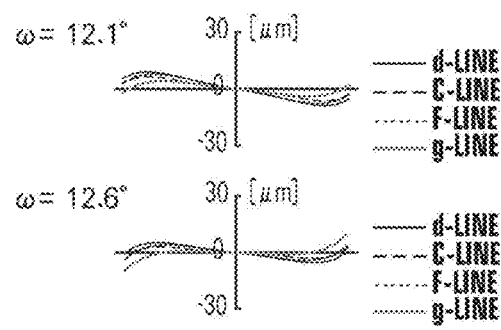
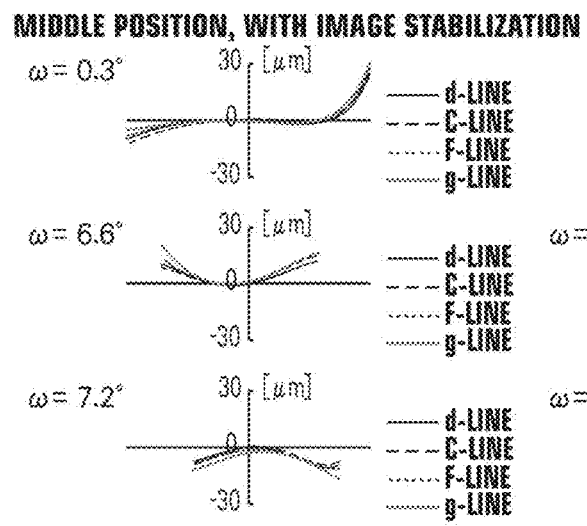
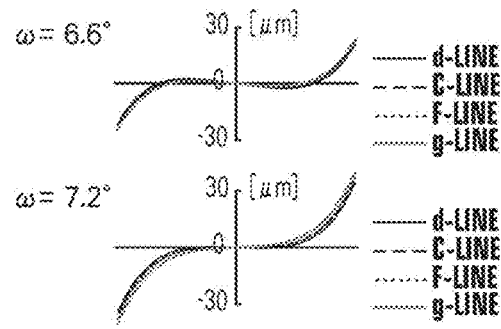
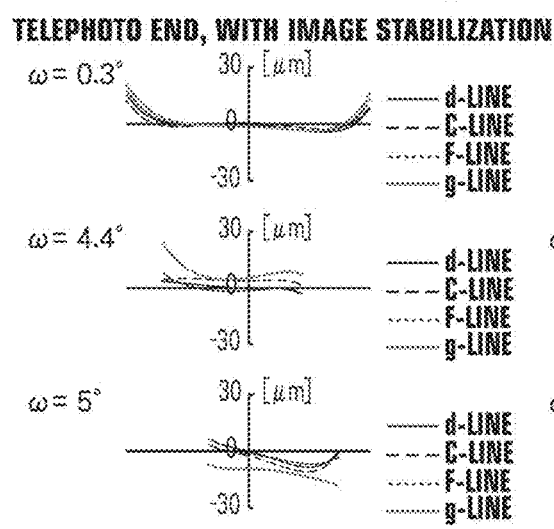
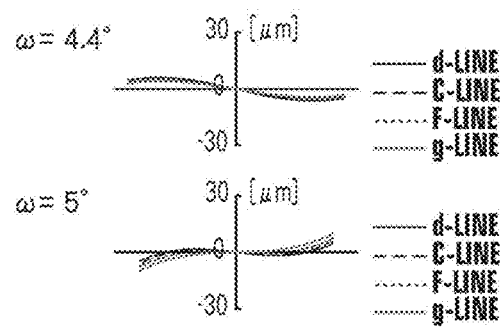

FIG.40
EXAMPLE 9
WIDE-ANGLE END, WITH IMAGE STABILIZATION
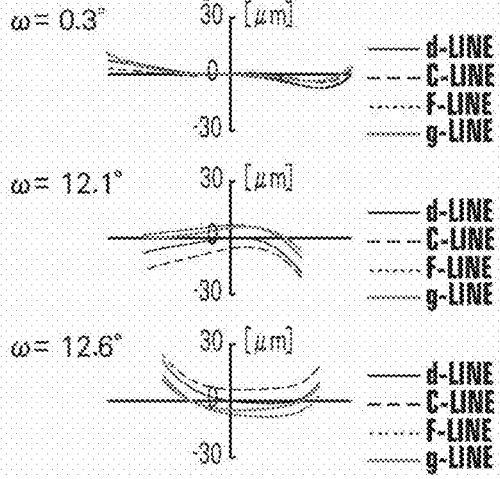
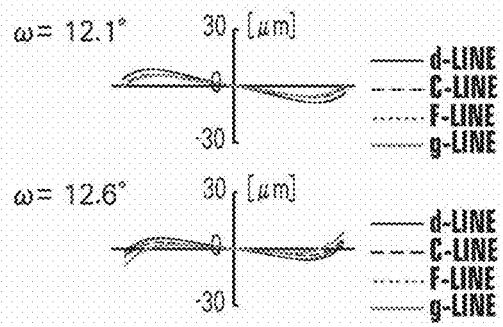
MIDDLE POSITION, WITH IMAGE STABILIZATION
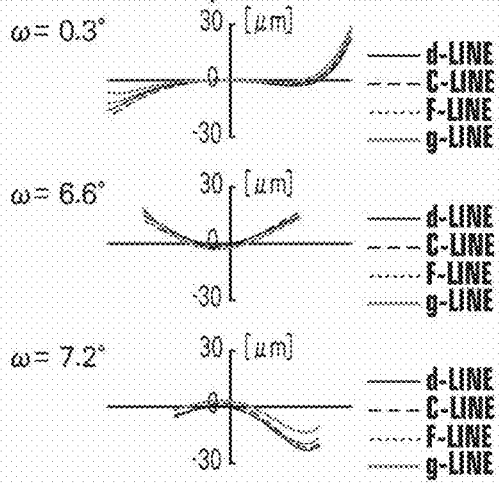
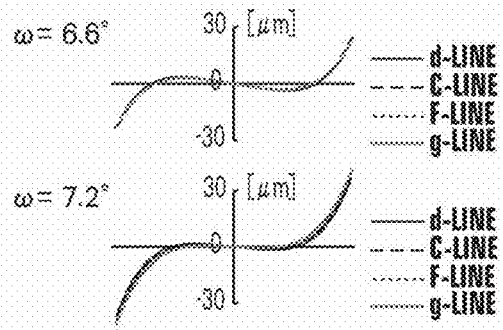
TELEPHOTO END, WITH IMAGE STABILIZATION
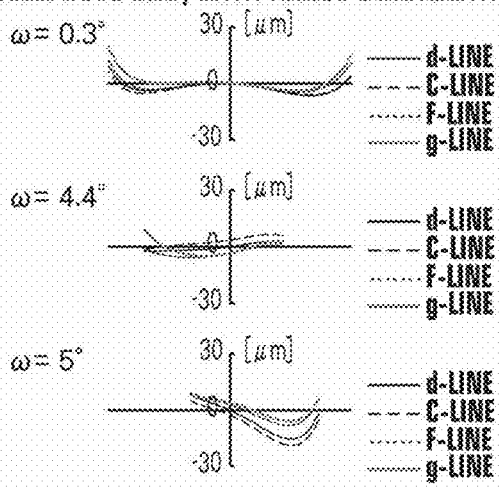
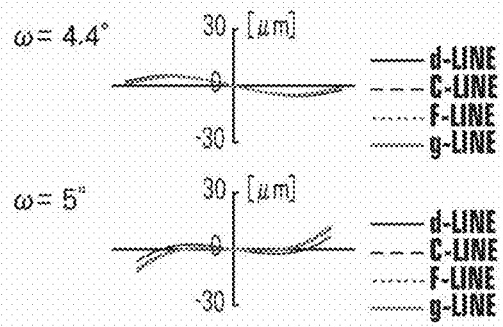

FIG.42
EXAMPLE 10
WIDE-ANGLE END, WITH IMAGE STABILIZATION
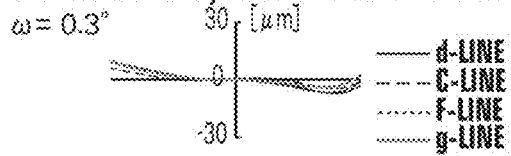
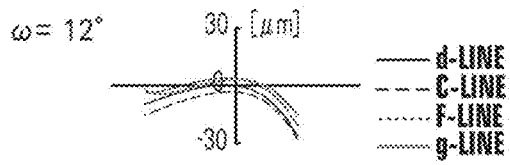
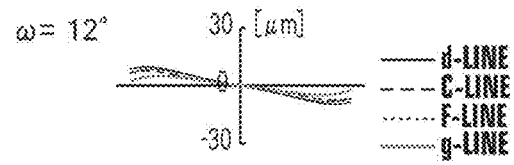
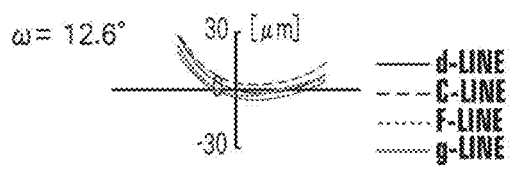
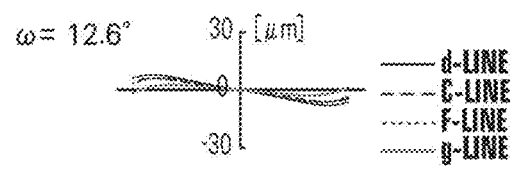
MIDDLE POSITION, WITH IMAGE STABILIZATION
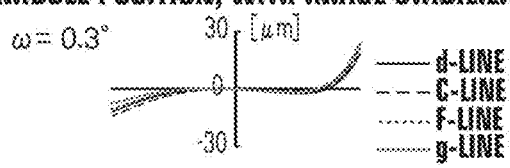
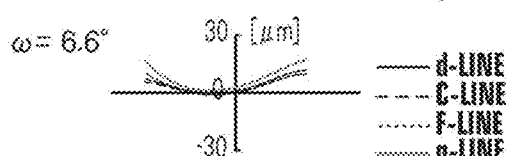
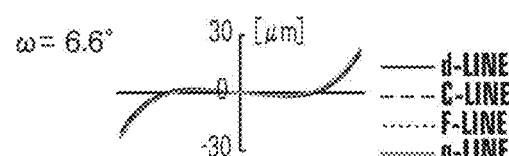
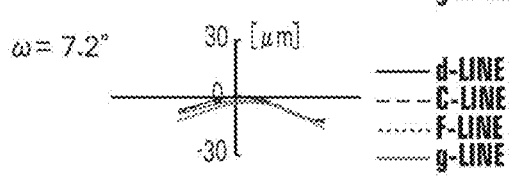
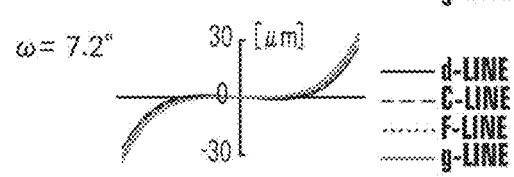
TELEPHOTO END, WITH IMAGE STABILIZATION
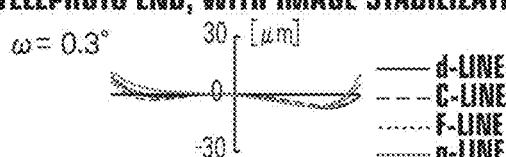
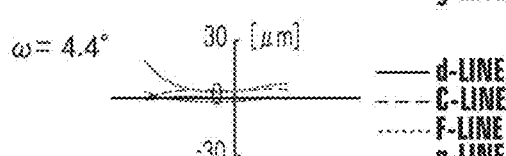
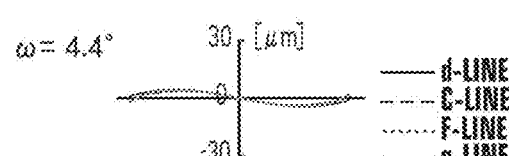
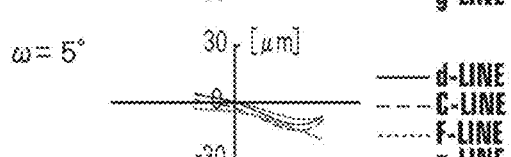
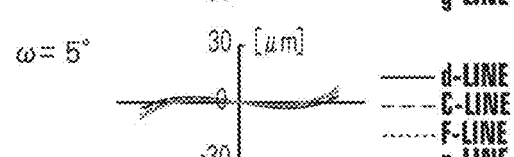

EXAMPLE 11
FIG.43
WIDE-ANGLE END
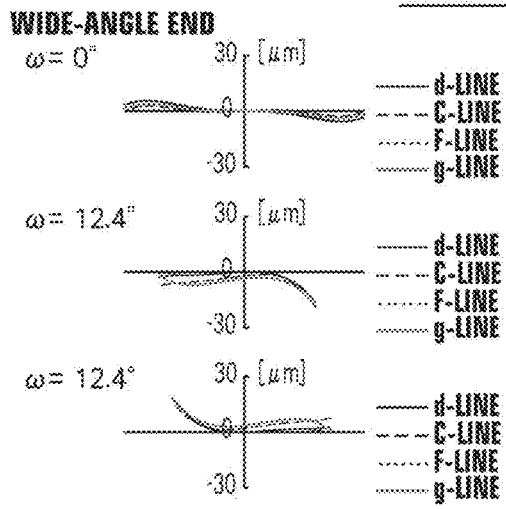
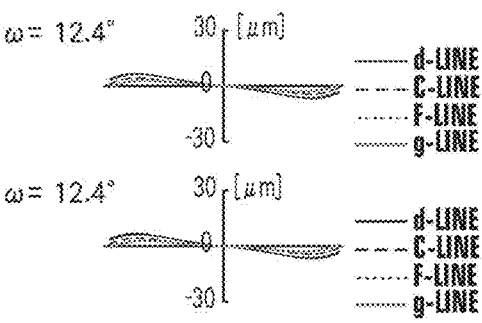
MIDDLE POSITION
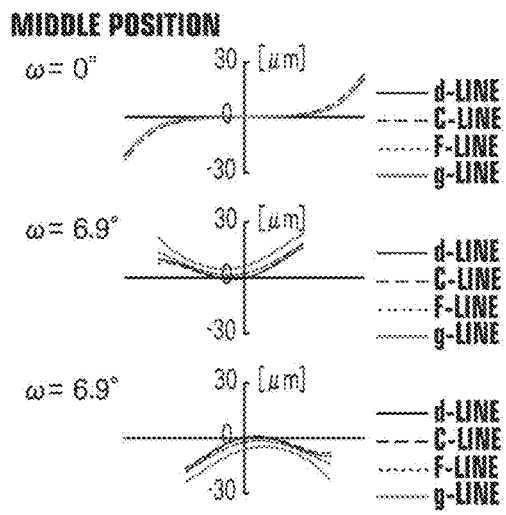
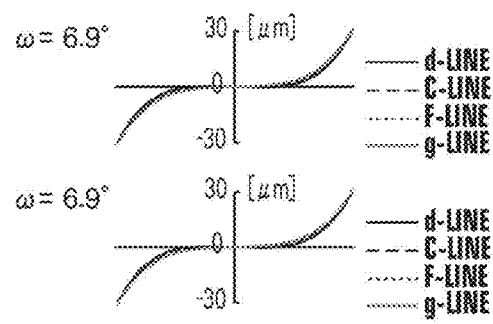
TELEPHOTO END
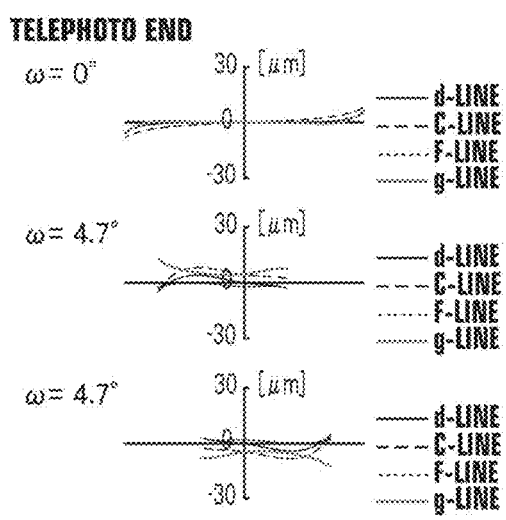
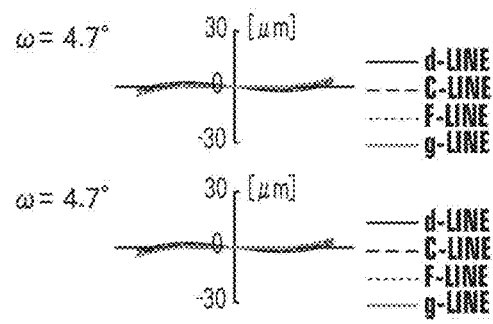

ZOOM LENS AND IMAGING APPARATUS

CROSS-REFERENCE TO RELATED APPLICATIONS

The present application claims priority under 35 U.S.C. §119 to Japanese Patent Application No. 2014-174108, filed on Aug. 28, 2014. The above application is hereby expressly incorporated by reference, in its entirety, into the present application.

BACKGROUND OF THE INVENTION

Field of the Invention

The present invention relates to a zoom lens which is suitable for use with, in particular, digital cameras, lens-replaceable digital cameras, etc., and an imaging apparatus provided with the zoom lens.

Description of the Related Art

So-called constant aperture zoom lenses having a zoom ratio of around 2.5 to 3.0, and a constant maximum aperture of around F2.8 across the entire zoom range are known.

Such a zoom lens has a four-group or five-group configuration including, for example, in order from the object side, a first lens group which has a positive refractive power and is fixed during magnification change, a second lens group which has a negative refractive power and has a strong magnification change effect, about one or two magnification change groups which are provided in addition to the second lens group and include a lens group having a positive refractive power, and a rearmost lens group which is fixed during magnification change.

As a zoom lens having the above-described configuration, those disclosed in Japanese Unexamined Patent Publication Nos. 2011-099964, 2012-027217, and 2011-158599 (hereinafter, Patent Documents 1 to 3, respectively) are known.

SUMMARY OF THE INVENTION

In a case where an image stabilization function is provided, it is important to reduce a load applied to the drive system by reducing the size and weight of the image stabilizing lens unit and reducing the amount of shift of the image stabilizing lens group. In order to address this problem, the rearmost lens group in each of Patent Documents 1 to 3 is formed by a front group having a positive refractive power, a middle group having a negative refractive power, and a rear group having a positive refractive power, and the middle group having a negative refractive power is used as the image stabilizing lens group.

By disposing the lens group having a positive refractive power in front of the image stabilizing lens group in this manner, an incident ray height on the image stabilizing lens group is reduced to achieve size reduction of the image stabilizing lens group. Further, by providing the image stabilizing lens group with a power of the opposite sign from that of the lens groups in front of and behind the image stabilizing lens group, the refractive power of the image stabilizing lens group can be increased to increase sensitivity of the image shift to shift of the image stabilizing lens group.

As described above, it is desired to achieve size reduction and weight reduction of the image stabilizing lens group and reduction of the amount of shift of the image stabilizing lens group, and it is further desired to suppress variation of chromatic aberration and suppress decentering coma along with shift of the image stabilizing lens group. Providing the image stabilizing lens group with a strong refractive power increases the sensitivity, and this allows reducing the amount of shift of the lens. In this case, however, it is difficult to suppress decentering coma, and sensitivity to assembly errors is also increased. It is therefore important to optimize the power of the image stabilizing lens group. It is also important to optimize the configuration of lens groups in front of and behind the image stabilizing lens group, which influence the refractive power (sensitivity) of the image stabilizing lens group and variation of aberrations along with shift of the lens.

In Patent Document 1, the front group of the rearmost lens group consists of only two positive lenses. As mentioned above, in order to reduce the incident ray height on the image stabilizing lens group, it is necessary to provide the front group with a strong positive refractive power. In this case, however, it is difficult to suppress spherical aberration, coma aberration, and chromatic aberration. In contrast, if the front group is provided with a weak refractive power to avoid the above described situation, it is difficult to ensure a sufficient power of the image stabilizing lens group and the power of the entire rearmost lens group becomes weak, resulting in a longer entire length of the optical system.

In Patent Document 2, in order to reduce the amount of shift of the image stabilizing lens group while obtaining high correction effect, the image stabilizing lens group is provided with a very strong refractive power (sensitivity). Further, in order to increase the power of the image stabilizing lens group, and to successfully correct aberrations when the image stabilizing lens group is provided with the strong power, five to six lenses are used in the group in front of the image stabilizing lens group. As described above, however, the image stabilizing lens group having a strong refractive power (sensitivity) makes it difficult to suppress decentering coma, and increases sensitivity to assembly errors.

In contrast, in Patent Document 3, the image stabilizing lens group has a weak refractive power, resulting in a large amount of shift of the image stabilizing lens group.

To address the above-described problems, it is necessary to optimize the configuration of and power distribution among lens groups, in particular, in the rearmost lens group which includes the image stabilizing lens group.

In view of the above-described circumstances, the present invention is directed to providing a compact and light-weight zoom lens having high optical performance with suppressed variation of aberrations during image stabilization, as well as an imaging apparatus provided with the zoom lens.

A first aspect of the zoom lens of the invention consists of four or five lens groups as a whole, which consist of, in order from the object side, a first lens group having a positive refractive power, a second lens group having a negative refractive power, one or two middle lens groups including a mp lens group having a positive refractive power, and a rearmost lens group disposed at the most image side position of the entire system and having a positive refractive power, wherein magnification change is effected by changing all distances between the adjacent lens groups, the rearmost lens group consists of, in order from the object side, a front group having a positive refractive power, a middle group having a negative refractive power, and a rear group having a positive refractive power, air spaces between the front group and the middle group, and between the middle group and the rear group are constant during magnification change and during focusing, the front group comprises two positive lenses and one negative lens, image stabilization is effected by shifting only the middle group in directions perpendicular to the optical axis, the rear group comprises one positive lens and two negative lenses, and the condition expression (1) below is satisfied:

$$0.11 < |fGr2|/ft < 0.25 \tag{1},$$

where fGr2 is a focal length of the middle group, and ft is a focal length of the entire system when the lens is focused on an object at infinity at the telephoto end.

A second aspect of the zoom lens of the invention consists of four or five lens groups as a whole, which consist of, in order from the object side, a first lens group having a positive refractive power, a second lens group having a negative refractive power, one or two middle lens groups including a mp lens group having a positive refractive power, and a rearmost lens group disposed at the most image side position of the entire system and having a positive refractive power, wherein magnification change is effected by changing all distances between the adjacent lens groups, the rearmost lens group consists of, in order from the object side, a front group having a positive refractive power, a middle group having a negative refractive power, and a rear group having a positive refractive power, air spaces between the front group and the middle group, and between the middle group and the rear group are constant during magnification change and during focusing, the front group consists of three positive lenses and one negative lens, the middle group comprises one positive lens and one negative lens, image stabilization is effected by shifting only the middle group in directions perpendicular to the optical axis, and the rear group consists of two positive lenses and two negative lenses.

It should be noted that the mp lens group is not a part of a lens group (a sub-lens group) and is one independent lens group. The "independent lens group" herein means such a lens group that the distance between the lens group and the adjacent lens group is changed during magnification change. In the case where the middle lens group consists of two lens groups, and both the two lens groups have a positive refractive power, the middle positive (mp) lens group may be either of the lens groups.

In the first and second aspects of the zoom lens of the invention, it is preferred that the first lens group be fixed relative to the image plane during magnification change.

It is preferred that the rearmost lens group be fixed relative to the image plane during magnification change.

It is preferred that the middle group consist of two negative lenses and one positive lens.

It is preferred that the condition expression (2) below be satisfied:

$$0.35 < fGr/ft < 0.56 \tag{2},$$

where fGr is a focal length of the rearmost lens group, and ft is a focal length of the entire system when the lens is focused on an object at infinity at the telephoto end.

It is preferred that the front group consist of, in order from the object side, a positive lens, a positive lens, and a cemented lens formed by a negative lens and a positive lens which are cemented together in this order from the object side.

It is preferred that the rear group comprise one cemented lens.

It is preferred that the rear group comprises, at the most image-side position thereof, a single lens having a negative meniscus shape with the concave surface toward the object side.

It is preferred that the rear group consist of, in order from the object side, a positive lens, a cemented lens formed by a positive lens and a negative lens which are cemented together in this order from the object side, and a negative lens.

It is preferred that the rearmost lens group be fixed relative to the image plane during magnification change, and the condition expression (3) below be satisfied:

$$-2.20 < (1-\beta Gr2) \cdot \beta Gr3 < -1.40 \tag{3},$$

where βGr2 is a lateral magnification of the middle group, and βGr3 is a lateral magnification of the rear group.

It is preferred that the rear group comprise at least one positive lens that satisfies the condition expression (4) below:

$$20 < vdGr3p < 41 \tag{4},$$

where vdGr3p is an Abbe number of the positive lens in the rear group.

It is preferred that the condition expression (5) below be satisfied:

$$71 < vdGr1p \tag{5},$$

where dGr1p is an average Abbe number of two positive lenses having the two highest Abbe numbers among the positive lenses in the front group.

It is preferred that the zoom lens consist of four lens groups which consist of, in order from the object side, the first lens group, the second lens group, the mp lens group, and the rearmost lens group.

It is preferred that the first lens group consist of, in order from the object side, a negative lens, a positive lens, a positive lens, and a positive lens.

It is preferred that a stop be disposed at the most object-side position of the rearmost lens group.

An imaging apparatus of the invention comprises the above-described zoom lens of the invention.

It should be noted that the expression "consisting/consist of" as used herein means that the zoom lens may include, besides the elements recited above: lenses substantially without any power; optical elements other than lenses, such as a stop, a mask, a cover glass, and filters; and mechanical components, such as a lens flange, a lens barrel, an image sensor, an image stabilization mechanism, etc.

The Abbe numbers are with respect to the d-line (the wavelength of 587.6 nm).

The sign (positive or negative) with respect to the surface shape and the refractive power of any lens including an aspheric surface are about the paraxial region.

The first aspect of the zoom lens of the invention consists of four or five lens groups as a whole, which consist of, in order from the object side, a first lens group having a positive refractive power, a second lens group having a negative refractive power, one or two middle lens groups including a mp lens group having a positive refractive power, and a rearmost lens group disposed at the most image side position of the entire system and having a positive refractive power, wherein magnification change is effected by changing all distances between the adjacent lens groups, the rearmost lens group consists of, in order from the object side, a front group having a positive refractive power, a middle group having a negative refractive power, and a rear group having a positive refractive power, the air spaces between the front group and the middle group, and between the middle group and the rear group are constant during magnification change and during focusing, the front group includes two positive lenses and one negative lens, image stabilization is effected by shifting only the middle group in directions perpendicular to the optical axis, the rear group includes one positive lens and two negative lenses, and the condition expression (1) below is satisfied:

$$0.11 < |fGr2|/ft < 0.25 \quad (1).$$

This configuration allows providing a compact and light-weight zoom lens having high optical performance with suppressed variation of aberrations during image stabilization.

The second aspect of the zoom lens of the invention consists of four or five lens groups as a whole, which consist of, in order from an object side, a first lens group having a positive refractive power, a second lens group having a negative refractive power, one or two middle lens groups including a mp lens group having a positive refractive power, and a rearmost lens group disposed at the most image side position of the entire system and having a positive refractive power, wherein magnification change is effected by changing all distances between the adjacent lens groups, the rearmost lens group consists of, in order from the object side, a front group having a positive refractive power, a middle group having a negative refractive power, and a rear group having a positive refractive power, air spaces between the front group and the middle group, and between the middle group and the rear group are constant during magnification change and during focusing, the front group consists of three positive lenses and one negative lens, the middle group includes one positive lens and one negative lens, image stabilization is effected by shifting only the middle group in directions perpendicular to the optical axis, and the rear group consists of two positive lenses and two negative lenses. This configuration allows providing a compact and light-weight zoom lens having high optical performance with suppressed variation of aberrations during image stabilization.

The imaging apparatus of the invention, which is provided with the zoom lens of the invention, is compact and light weight, can achieve a high image stabilization effect, and allows obtaining high quality images.

BRIEF DESCRIPTION OF THE DRAWINGS

FIG. 1 is a sectional view illustrating the lens configuration of a zoom lens according to one embodiment of the present invention (a zoom lens of Example 1), FIG. 2 is a sectional view illustrating the lens configuration of a zoom lens of Example 2 of the invention, FIG. 3 is a sectional view illustrating the lens configuration of a zoom lens of Example 3 of the invention, FIG. 4 is a sectional view illustrating the lens configuration of a zoom lens of Example 4 of the invention, FIG. 5 is a sectional view illustrating the lens configuration of a zoom lens of Example 5 of the invention, FIG. 6 is a sectional view illustrating the lens configuration of a zoom lens of Example 6 of the invention, FIG. 7 is a sectional view illustrating the lens configuration of a zoom lens of Example 7 of the invention, FIG. 8 is a sectional view illustrating the lens configuration of a zoom lens of Example 8 of the invention, FIG. 9 is a sectional view illustrating the lens configuration of a zoom lens of Example 9 of the invention, FIG. 10 is a sectional view illustrating the lens configuration of a zoom lens of Example 10 of the invention, FIG. 11 is a sectional view illustrating the lens configuration of a zoom lens of Example 11 of the invention, FIG. 12 shows aberration diagrams of the zoom lens of Example 1 of the invention, FIG. 13 shows aberration diagrams of the zoom lens of Example 2 of the invention, FIG. 14 shows aberration diagrams of the zoom lens of Example 3 of the invention, FIG. 15 shows aberration diagrams of the zoom lens of Example 4 of the invention, FIG. 16 shows aberration diagrams of the zoom lens of Example 5 of the invention, FIG. 17 shows aberration diagrams of the zoom lens of Example 6 of the invention, FIG. 18 shows aberration diagrams of the zoom lens of Example 7 of the invention, FIG. 19 shows aberration diagrams of the zoom lens of Example 8 of the invention, FIG. 20 shows aberration diagrams of the zoom lens of Example 9 of the invention, FIG. 21 shows aberration diagrams of the zoom lens of Example 10 of the invention, FIG. 22 shows aberration diagrams of the zoom lens of Example 11 of the invention, FIG. 23 shows lateral aberration diagrams of the zoom lens of Example 1 of the invention, FIG. 25 shows lateral aberration diagrams of the zoom lens of Example 2 of the invention, FIG. 26 shows lateral aberration diagrams of the zoom lens of Example 2 of the invention (with image stabilization), FIG. 28 shows lateral aberration diagrams of the zoom lens of Example 3 of the invention (with image stabilization), FIG. 30 shows lateral aberration diagrams of the zoom lens of Example 4 of the invention (with image stabilization), FIG. 32 shows lateral aberration diagrams of the zoom lens of Example 5 of the invention (with image stabilization), FIG. 34 shows lateral aberration diagrams of the zoom lens of Example 6 of the invention (with image stabilization), FIG. 35 shows lateral aberration diagrams of the zoom lens of Example 7 of the invention, FIG. 36 shows lateral aberration diagrams of the zoom lens of Example 7 of the invention (with image stabilization), FIG. 38 shows lateral aberration diagrams of the zoom lens of Example 8 of the invention (with image stabilization), FIG. 40 shows lateral aberration diagrams of the zoom lens of Example 9 of the invention (with image stabilization), FIG. 42 shows lateral aberration diagrams of the zoom lens of Example 10 of the invention (with image stabilization), FIG. 43 shows lateral aberration diagrams of the zoom lens of Example 11 of the invention.

DESCRIPTION OF THE PREFERRED EMBODIMENTS

Figure 24:
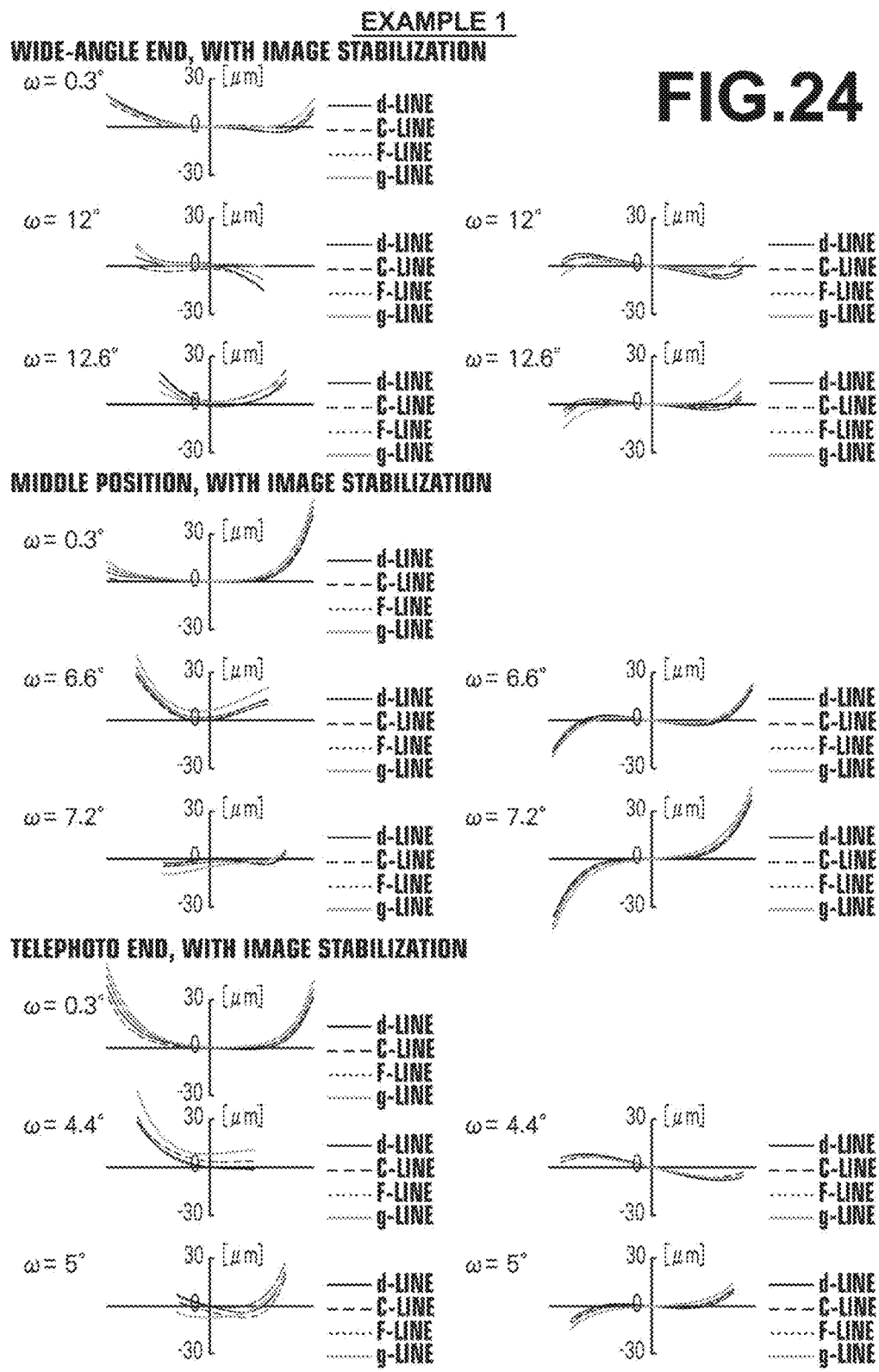
FIG. 24 shows lateral aberration diagrams of the zoom lens of Example 1 of the invention (with image stabilization)

Hereinafter, an embodiment of the present invention will be described in detail with reference to the drawings. FIG. 1 is a sectional view illustrating the lens configuration of a zoom lens according to one embodiment of the invention. The configuration example shown in FIG. 1 is the same as the configuration of a zoom lens of Example 1, which will be described later. In FIG. 1, the left side is the object side and the right side is the image side. An aperture stop St shown in the drawing does not necessarily represent the size and the shape thereof, but represents the position thereof along the optical axis Z.

As shown in FIG. 1, this zoom lens consists of, in order from the object side, a first lens group G1 having a positive refractive power, a second lens group G2 having a negative refractive power, a third lens group G3 having a positive refractive power (which corresponds to an mp lens group of the invention), and a fourth lens group G4 having a positive refractive power (which corresponds to a rearmost lens group of the invention), wherein magnification change is effected by changing all the distances between the adjacent lens groups.

When this zoom lens is used with an imaging apparatus, it is preferred to provide a cover glass, a prism, and various filters, such as an infrared cutoff filter and a low-pass filter, etc., between the optical system and an image plane Sim depending on the configuration of the camera on which the lens is mounted. In the example shown in FIG. 1, an optical member PP in the form of a plane-parallel plate, which is assumed to represent such elements, is disposed between the lens system and the image plane Sim.

The fourth lens group G4 (the rearmost lens group) consists of, in order from the object side, a front group having a positive refractive power (lenses L41 to L44), a middle group having a negative refractive power (lenses L45 to L47, denoted by "Ois" in FIG. 1), and a rear group having a positive refractive power (lenses L48 to L51), wherein the air spaces between the front group and the middle group, and between the middle group and the rear group are constant during magnification change and during focusing.

The front group includes two positive lenses and one negative lens. Image stabilization is effected by shifting only the middle group in directions perpendicular to the optical axis. The rear group includes one positive lens and two negative lenses.

The front group including two positive lenses and one negative lens allows successfully correcting spherical aberration, coma aberration, and chromatic aberration even when the front group and the middle group, which is the image stabilizing lens group, are provided with strong powers. It should be noted that, when the front group includes three positive lenses, the front group can have an even stronger power, and this allows size reduction of the image stabilizing lens group and reduction of the entire length of the lens.

Further, when the middle group includes one positive lens and one negative lens, variation of chromatic aberration and coma aberration during image stabilization can be suppressed.

The rear group works to correct aberrations occurring at the middle group. When the rear group includes two or more negative lenses, chromatic aberration occurring at the front group or the middle group can be canceled. Also, the negative lenses of the rear group allows increasing the outgoing ray angle of the marginal ray, and this allows, in combination with the front group provided with a strong positive refractive power, reducing the entire length of the lens. This configuration is particularly suitable for a case, such as the case of a replaceable lens for so-called mirrorless cameras, where it is not necessary to provide a back focus as long as that of a replaceable lens for single-lens reflex cameras. It should be noted that the rear group has a positive refractive power and includes at least one positive lens. When the rear group includes two positive lenses, a stronger positive refractive power, which is the power of the opposite sign from the power of the image stabilizing lens group (middle group), can be provided, and this allows relatively increasing the refractive power of the image stabilizing lens group and successfully correcting aberrations occurring at the image stabilizing lens group.

In the fourth lens group G4 (the rearmost lens group), the ray height is reduced by the front group having a positive refractive power, size reduction and weight reduction of the middle group, which is the image stabilizing lens group, are achieved, and the front group and the middle group have refractive powers of the opposite signs from each other to allow providing the image stabilizing lens group with a strong refractive power to increase the sensitivity of the image shift. This allows providing a large image stabilization effect by a small amount of shift.

In the zoom lens of this embodiment, it is preferred that the condition expression (1) below be satisfied. Satisfying the lower limit of the condition expression (1) prevents the power of the middle group, which is the image stabilizing lens group, from becoming excessively strong, and this facilitates suppressing spherical aberration and decentering coma during image stabilization. Also, satisfying the lower limit of the condition expression (1) allows reducing sensitivity to assembly errors. Satisfying the upper limit of the condition expression (1) allows reducing the amount of shift of the image stabilizing lens group small and reducing increase of the diameter of the image stabilizing lens group to reduce a load applied to the drive system. It should be noted that higher performance can be obtained when the condition expression (1-1) below is satisfied.

$$0.11 < |fGr2|/ft < 0.25 \quad (1),$$

$$0.12 < |fGr2|/ft < 0.24 \quad (1\text{-}1),$$

where fGr2 is a focal length of the middle group, and ft is a focal length of the entire system when the lens is focused on an object at infinity at the telephoto end.

It is preferred that the first lens group G1 be fixed relative to the image plane Sim during magnification change. Fixing the first lens group G1 in this manner allows simplifying the frame structure. Comparing to a configuration where the first lens group G1 is moved forward toward its telephoto end position, this configuration has advantages such as reducing influence of decentering of the lenses due to flexure of the lens frame, etc., and facilitating use of a dustproof, weather sealed structure.

It is preferred that the fourth lens group G4 (the rearmost lens group) be fixed relative to the image plane Sim during magnification change. Reducing the number of lens groups to be moved in this manner allows reducing influence of decentering. Also, this configuration allows suppressing variation of F-number during magnification change, and this is advantageous for forming a zoom lens having a constant aperture.

It is preferred that the middle group, which is the image stabilizing lens group, consist of two negative lenses and one positive lens. This configuration allows suppressing variation of aberrations during image stabilization.

It is preferred that the condition expression (2) below be satisfied. Satisfying the lower limit of the condition expression (2) allows suppressing off-axis coma aberration. Satisfying the upper limit of the condition expression (2) allows keeping the entire length of the optical system small. It should be noted that higher performance can be obtained when the condition expression (2-1) below is satisfied.

$$0.35 < fGr/ft < 0.56 \quad (2),$$

$$0.39 < fGr/ft < 0.54 \quad (2\text{-}1),$$

where fGr is a focal length of the rearmost lens group, and ft is a focal length of the entire system when the lens is focused on an object at infinity at the telephoto end.

It is preferred that the front group consist of, in order from the object side, a positive lens, a positive lens, and a cemented lens formed by a negative lens and a positive lens which are cemented together in this order from the object side. This configuration allows successfully correcting spherical aberration and chromatic aberration even when the front group is provided with a strong refractive power to reduce the incident ray height on the middle group, which is the image stabilizing lens group, and to keep the entire length of the optical system small.

It is preferred that the rear group includes one cemented lens. This configuration allows successfully correcting, in particular, lateral chromatic aberration.

Further, it is preferred that the rear group includes, at the most image-side position thereof, a single lens having a negative meniscus shape with the concave surface toward the object side. The rear group including a negative lens at the most image-side position allows increasing the outgoing ray angle of the marginal ray, and this allows reducing the entire length of the lens. This configuration is particularly suitable for a case, such as the case of a replaceable lens for so-called mirrorless cameras, where it is not necessary to provide a back focus as long as that of a replaceable lens for single-lens reflex cameras. The negative meniscus shape with the concave surface toward the object side is advantageous for correcting field curvature and distortion.

It is preferred that the rear group consist of, in order from the object side, a positive lens, a cemented lens formed by a positive lens and a negative lens which are cemented together in this order from the object side, and a negative lens. This configuration allows cancelling aberrations occurring at the middle group, which is the image stabilizing lens group, with the rear group even when the image stabilizing lens group is provided with a strong power to reduce the amount of shift of the image stabilizing lens group. Also, when the front group is provided with a strong power to enhance the effect of conversing the axial bundle of rays, the two negative lenses disposed in the rear group allows increasing the outgoing ray angle of the marginal ray, and this allows reducing the entire length of the lens.

It is preferred that the fourth lens group G4 (the rearmost lens group) be fixed relative to the image plane during magnification change, and satisfy the condition expression below (3). The condition expression (3) indicates an amount of image shift on the image plane when the middle group, which is the image stabilizing lens group, is shifted in directions perpendicular to the optical axis, and the negative sign indicates that the direction in which the image is shifted is opposite from the direction in which the lens group is shifted. Satisfying the lower limit of the condition expression (3) allows preventing the power of the image stabilizing lens group from becoming excessively strong, and this facilitates suppressing spherical aberration and decentering coma during image stabilization. Also, satisfying the lower limit of the condition expression (3) allows reducing sensitivity to assembly errors. Satisfying the upper limit of the condition expression (3) allows reducing the amount of shift of the image stabilizing lens group and reducing increase of the diameter of the image stabilizing lens group to reduce a load applied to the drive system. It should be noted that higher performance can be obtained when the condition expression (3-1) below is satisfied.

$$-2.20 < (1-\beta Gr2)\cdot\beta Gr3 < -1.40 \quad (3),$$

$$-2.00 < (1-\beta Gr2)\cdot\beta Gr3 < -1.45 \quad (3\text{-}1),$$

where $\beta Gr2$ is a lateral magnification of the middle group, and $\beta Gr3$ is a lateral magnification of the rear group.

It is preferred that the rear group include at least one positive lens that satisfies the condition expression (4) below. In the zoom lens of this embodiment, the front group in the fourth lens group G4 (the rearmost lens group) is provided with a strong power to reduce the entire length of the lens and to reduce the incident ray height on the middle group, which is the image stabilizing lens group. Chromatic aberration occurring at the front group is cancelled with the rear group, and the rear group provided with at least one positive lens that satisfies the condition expression (4) allows successfully correcting coma with respect to the g-line and lateral chromatic aberration of each color. It should be noted that higher performance can be obtained when the condition expression (4-1) below is satisfied.

$$20 < vdGr3p < 41 \quad (4),$$

$$23 < vdGr3p < 39 \quad (4\text{-}1),$$

where vdGr3p is an Abbe number of the positive lens in the rear group.

It is preferred that the condition expression (5) below be satisfied. Satisfying the condition expression (5) allows reducing longitudinal chromatic aberration and lateral chromatic aberration. It should be noted that higher performance can be obtained when the condition expression (5-1), (5-2), or (5-3) below is satisfied.

$$71 < vdGr1p \quad (5),$$

$$71 < vdGr1p < 100 \quad (5\text{-}1),$$

$$73 < vdGr1p \quad (5\text{-}2),$$

$$73 < vdGr1p < 100 \quad (5\text{-}3),$$

where vdGr1p is an average Abbe number of two positive lenses having the two highest Abbe numbers among the positive lenses in the front group.

It is preferred that the zoom lens consist of four lens groups which consist of, in order from the object side, the first lens group G1, the second lens group G2, the mp lens group (third lens group G3), and the rearmost lens group (fourth lens group G4). Minimizing the number of lens groups and forming the zoom lens having the above-described four-group configuration allows simplifying the frame structure, and reducing influence of decentering.

It is preferred that the first lens group G1 consist of, in order from the object side, a negative lens, a positive lens, a positive lens, and a positive lens. The first lens group G1 including three positive lenses in this manner allows successfully correcting chromatic aberration and spherical aberration, in particular, at the telephoto side. Further, in a case where the first lens group G1 as a whole is provided with a strong power for the purpose of size reduction, etc., the above-described configuration allows distributing the power among the lenses, thereby reducing aberrations occurring at each lens surface.

It is preferred that the aperture stop St be disposed at the most object-side position of the fourth lens group G4 (the rearmost lens group). Disposing the aperture stop St at the most object-side position of the fourth lens group G4 (the rearmost lens group) in place of between lenses of the fourth lens group G4 allows simplifying the frame structure. Further, in the case where the fourth lens group G4 (the rearmost lens group) is fixed relative to the image plane Sim during magnification change, a constant aperture zoom lens can be formed without changing the so-called aperture stop diameter.

In a case where the zoom lens is used in a harsh environment, it is preferred that the zoom lens be provided with a protective multi-layer coating. Besides the protective coating, the zoom lens may be provided with an antireflection coating for reducing ghost light, etc., during use.

In the example shown in FIG. 1, the optical member PP is disposed between the lens system and the image plane Sim. However, in place of disposing the various filters, such as a low-pass filter and a filter that cuts off a specific wavelength range, between the lens system and the image plane Sim, the various filters may be disposed between the lenses, or coatings having the same functions as the various filters may be applied to the lens surfaces of some of the lenses.

Next, numerical examples of the zoom lens of the invention are described.

First, a zoom lens of Example 1 is described. FIG. 1 is a sectional view illustrating the lens configuration of the zoom lens of Example 1. It should be noted that, in FIG. 1, and FIGS. 2 to 11 corresponding to Examples 2 to 11, which will be described later, the left side is the object side and the right side is the image side. The aperture stop St shown in the drawings does not necessarily represent the size and the shape thereof, but represents the position thereof along the optical axis Z. The symbol "Focus" in the drawings denotes a lens group used to effect focusing and the symbol "Ois" denotes a lens group used to effect image stabilization.

The zoom lens of Example 1 has a four-group configuration which consists of, in order from the object side, a first lens group G1 having a positive refractive power, a second lens group G2 having a negative refractive power, a third lens group G3 (the mp lens group) having a positive refractive power, and a fourth lens group G4 (the rearmost lens group) having a positive refractive power.

Table 1 shows basic lens data of the zoom lens of Example 1, Table 2 shows data about specifications of the zoom lens, and Table 3 shows data about distances between surfaces to be moved of the zoom lens. In the following description, meanings of symbols used in the tables are explained with respect to Example 1 as an example. The same explanations basically apply to those with respect to Examples 2 to 11.

In the lens data shown in Table 1, each value in the column of "Surface No." represents a surface number, where the object-side surface of the most object-side element is the 1st surface and the number is sequentially increased toward the image side, each value in the column of "Radius of Curvature" represents the radius of curvature of the corresponding surface, and each value in the column of "Surface Distance" represents the distance along the optical axis Z between the corresponding surface and the next surface. Each value in the column of "nd" represents the refractive index with respect to the d-line (the wavelength of 587.6 nm) of the corresponding optical element, each value in the column of "vd" represents the Abbe number with respect to the d-line (the wavelength of 587.6 nm) of the corresponding optical element, and each value in the column of "θgF" represents the partial dispersion ratio of the corresponding optical element.

It should be noted that the partial dispersion ratio θgF is expressed by the formula below:

$$\theta gF = (ng - nF)/(nF - nC),$$

where ng is a refractive index with respect to the g-line (the wavelength of 435.8 nm), nF is a refractive index with respect to the F-line (the wavelength of 486.1 nm), and nC is a refractive index with respect to the C-line (the wavelength of 656.3 nm).

The sign with respect to the radius of curvature is provided such that a positive radius of curvature indicates a surface shape that is convex toward the object side, and a negative radius of curvature indicates a surface shape that is convex toward the image side. The basic lens data also includes data of the aperture stop St and the optical member PP, and the surface number and the text "(stop)" are shown at the position in the column of the surface number corresponding to the aperture stop St. In the lens data shown in Table 1, the value of each surface distance that is changed during magnification change is represented by the symbol "DD[surface number]". The numerical values corresponding to each DD[surface number] at the wide-angle end, at the middle position, and at the telephoto end are shown in Table 3.

The data about specifications shown in Table 2 show values of zoom magnification, focal length f', back focus Bf', F-number FNo., and total angle of view 2ω at the wide-angle end, at the middle position, and at the telephoto end.

With respect to the basic lens data, the data about specifications, and the data about distances between surfaces to be moved, the unit of angle is degrees, and the unit of length is millimeters; however, any other suitable units may be used since optical systems are usable when they are proportionally enlarged or reduced.

TABLE 1

Example 1 - Lens Data

| Surface No. | Radius of Curvature | Surface Distance | nd | vd | θgF |
|---|---|---|---|---|---|
| 1 | 274.96102 | 2.390 | 1.80100 | 34.97 | 0.58642 |
| 2 | 77.90148 | 7.850 | 1.49700 | 81.54 | 0.53748 |

TABLE 1-continued

Example 1 - Lens Data

| Surface No. | Radius of Curvature | Surface Distance | nd | vd | θgF |
|---|---|---|---|---|---|
| 3 | −1203.47290 | 0.200 | | | |
| 4 | 97.12166 | 5.000 | 1.43875 | 94.94 | 0.53433 |
| 5 | 3892.40898 | 0.200 | | | |
| 6 | 62.76476 | 6.000 | 1.49700 | 81.54 | 0.53748 |
| 7 | 583.05158 | DD[7] | | | |
| 8 | 110.71627 | 5.710 | 1.72047 | 34.71 | 0.58350 |
| 9 | −42.66766 | 1.550 | 1.62230 | 53.17 | 0.55424 |
| 10 | 24.37958 | 4.958 | | | |
| 11 | −78.43069 | 1.260 | 1.49700 | 81.54 | 0.53748 |
| 12 | 25.54612 | 5.501 | 1.84661 | 23.88 | 0.62072 |
| 13 | 105.31259 | 4.001 | | | |
| 14 | −28.87373 | 1.250 | 1.91082 | 35.25 | 0.58224 |
| 15 | 391.32559 | DD[15] | | | |
| 16 | −349.16836 | 2.950 | 1.80100 | 34.97 | 0.58642 |
| 17 | −38.22034 | 0.100 | | | |
| 18 | 63.65733 | 4.310 | 1.61800 | 63.33 | 0.54414 |
| 19 | −39.25049 | 1.150 | 1.80518 | 25.42 | 0.61616 |
| 20 | ∞ | DD[20] | | | |
| 21 (stop) | ∞ | 1.300 | | | |
| 22 | 27.59915 | 6.985 | 1.49700 | 81.54 | 0.53748 |
| 23 | −58.46986 | 0.150 | | | |
| 24 | 34.60348 | 2.550 | 1.65412 | 39.68 | 0.57378 |
| 25 | 95.96990 | 1.610 | | | |
| 26 | −53.62431 | 1.210 | 1.90366 | 31.31 | 0.59481 |
| 27 | 22.84961 | 6.512 | 1.49700 | 81.54 | 0.53748 |
| 28 | −84.57206 | 2.500 | | | |
| 29 | 293.69564 | 3.771 | 1.80518 | 25.42 | 0.61616 |
| 30 | −23.04083 | 0.950 | 1.58913 | 61.13 | 0.54067 |
| 31 | 33.63593 | 2.693 | | | |
| 32 | −43.53615 | 1.050 | 1.80100 | 34.97 | 0.58642 |
| 33 | 62.25169 | 3.752 | | | |
| 34 | 51.53927 | 6.921 | 1.80000 | 29.84 | 0.60178 |
| 35 | −39.86271 | 3.848 | | | |
| 36 | 50.27571 | 7.368 | 1.48749 | 70.24 | 0.53007 |
| 37 | −26.02866 | 1.310 | 1.80518 | 25.42 | 0.61616 |
| 38 | −69.72800 | 3.069 | | | |
| 39 | −30.18711 | 1.310 | 1.91082 | 35.25 | 0.58224 |
| 40 | −51.30966 | 26.063 | | | |
| 41 | ∞ | 2.850 | 1.51633 | 64.14 | 0.53531 |
| 42 | ∞ | | | | |

TABLE 2

Example 1 - Specifications (d-line)

| | Wide-Angle End | Middle | Telephoto End |
|---|---|---|---|
| Zoom Magnification | 1.0 | 1.8 | 2.6 |
| f | 51.517 | 92.224 | 135.968 |
| Bf | 29.940 | 29.940 | 29.940 |
| FNo. | 2.88 | 2.89 | 2.88 |
| 2ω [°] | 30.4 | 17.0 | 11.6 |

TABLE 3

Example 1 - Distances Relating to Zoom

| | Wide-Angle End | Middle | Telephoto End |
|---|---|---|---|
| DD[7] | 1.647 | 24.961 | 34.686 |
| DD[15] | 11.849 | 7.355 | 2.477 |
| DD[20] | 32.001 | 13.182 | 8.334 |

FIG. 12 shows aberration diagrams of the zoom lens of Example 1. The aberration diagrams shown at the top of FIG. 12 are those of spherical aberration, offense against the sine condition, astigmatism, distortion, and lateral chromatic aberration at the wide-angle end in this order from the left side, the aberration diagrams shown at the middle of FIG. 12 are those of spherical aberration, offense against the sine condition, astigmatism, distortion, and lateral chromatic aberration at the middle position in this order from the left side, and the aberration diagrams shown at the bottom of FIG. 12 are those of spherical aberration, offense against the sine condition, astigmatism, distortion, and lateral chromatic aberration at the telephoto end in this order from the left side. The aberration diagrams of spherical aberration, offense against the sine condition, astigmatism, and distortion show those with respect to the d-line (the wavelength of 587.6 nm), which is used as a reference wavelength. The aberration diagrams of spherical aberration show those with respect to the d-line (the wavelength of 587.6 nm), the C-line (the wavelength of 656.3 nm), the F-line (the wavelength of 486.1 nm), and the g-line (the wavelength of 435.8 nm) in the solid line, the long dashed line, the short dashed line, and the gray line, respectively. The aberration diagrams of astigmatism show those in the sagittal direction and the tangential direction in the solid line and the short dashed line, respectively. The aberration diagrams of lateral chromatic aberration show those with respect to the C-line (the wavelength of 656.3 nm), the F-line (the wavelength of 486.1 nm), and the g-line (the wavelength of 435.8 nm) in the long dashed line, the short dashed line, and the gray line, respectively. It should be noted that these longitudinal aberration diagrams show aberrations when the lens is focused on an object at infinity. The symbol "FNo." in the aberration diagrams of spherical aberration and offense against the sine condition means "F-number", and the symbol "ω" in the other aberration diagrams means "half angle of view".

FIG. 23 shows lateral aberration diagrams of the zoom lens of Example 1 without image stabilization. FIG. 23 shows, in order from the top, lateral aberration diagrams at the wide-angle end, at the middle position, and at the telephoto end. Among the lateral aberration diagrams shown in two columns, the lateral aberration diagrams on the left show those with respect to the tangential direction, and the lateral aberration diagrams on the right show those with respect to the sagittal direction. Among the lateral aberration diagrams, one at the top shows aberrations at the center of the image plane, two at the middle show aberrations at the position where the image height is 80% of the maximum image height on the positive (+) side, and two at the bottom show aberrations at the position where the image height is 80% of the maximum image height on the negative (−) side. FIG. 24 shows lateral aberration diagrams of the zoom lens of Example 1 with image stabilization. The contents of the aberration diagrams are similar to those without image stabilization. It should be noted that, in FIGS. 23 and 24, aberrations with respect to the d-line (the wavelength of 587.6 nm), the C-line (the wavelength of 656.3 nm), the F-line (the wavelength of 486.1 nm), and the g-line (the wavelength of 435.8 nm) are shown in the solid line, the long dashed line, the short dashed line, and the gray line, respectively. These lateral aberration diagrams show lateral aberrations when the lens is focused on an object at infinity. The symbol "ω" in the aberration diagrams means "half angle of view".

The above-described symbols, meanings and manners of description of the various data of Example 1 apply also to the examples described below, unless otherwise noted, and the same explanations are not repeated in the following description.

Next, a zoom lens of Example 2 is described. The zoom lens of Example 2 has a lens group configuration similar to that of the zoom lens of Example 1. FIG. 2 is a sectional view illustrating the lens configuration of the zoom lens of Example 2. Table 4 shows basic lens data of the zoom lens of Example 2, Table 5 shows data about specifications of the zoom lens, Table 6 shows data about distances between surfaces to be moved of the zoom lens, FIG. 13 shows aberration diagrams of the zoom lens, FIG. 25 shows lateral aberration diagrams of the zoom lens without image stabilization, and FIG. 26 shows lateral aberration diagrams of the zoom lens with image stabilization.

TABLE 4

Example 2 - Lens Data

| Surface No. | Radius of Curvature | Surface Distance | nd | vd | θgF |
|---|---|---|---|---|---|
| 1 | 147.14684 | 2.312 | 1.90366 | 31.31 | 0.59481 |
| 2 | 71.34579 | 6.799 | 1.49700 | 81.54 | 0.53748 |
| 3 | 4466.14983 | 0.262 | | | |
| 4 | 82.92060 | 4.599 | 1.45562 | 91.31 | 0.53429 |
| 5 | 222.61947 | 0.209 | | | |
| 6 | 72.46651 | 7.001 | 1.48749 | 70.24 | 0.53007 |
| 7 | 2229.87611 | DD[7] | | | |
| 8 | 83.14047 | 6.305 | 1.64769 | 33.79 | 0.59393 |
| 9 | −54.99973 | 1.501 | 1.61772 | 49.81 | 0.56035 |
| 10 | 22.65737 | 6.228 | | | |
| 11 | −129.46710 | 1.009 | 1.53775 | 74.70 | 0.53936 |
| 12 | 23.41440 | 5.501 | 1.84661 | 23.88 | 0.62072 |
| 13 | 90.28797 | 3.246 | | | |
| 14 | −32.56444 | 0.999 | 1.91082 | 35.25 | 0.58224 |
| 15 | −754.10763 | DD[15] | | | |
| 16 | −139.28102 | 3.100 | 1.91082 | 35.25 | 0.58224 |
| 17 | −37.20322 | 0.100 | | | |
| 18 | 45.57357 | 5.511 | 1.48749 | 70.24 | 0.53007 |
| 19 | −45.00113 | 1.100 | 1.80518 | 25.42 | 0.61616 |
| 20 | 302.73331 | DD[20] | | | |
| 21 (stop) | ∞ | 1.300 | | | |
| 22 | 29.00638 | 5.564 | 1.53775 | 74.70 | 0.53936 |
| 23 | −83.12098 | 0.182 | | | |
| 24 | 28.22418 | 2.499 | 1.65412 | 39.68 | 0.57378 |
| 25 | 48.84185 | 1.900 | | | |
| 26 | −76.98887 | 1.210 | 1.90366 | 31.31 | 0.59481 |
| 27 | 20.91613 | 7.501 | 1.53775 | 74.70 | 0.53936 |
| 28 | −71.39743 | 3.663 | | | |
| 29 | 101.15891 | 4.706 | 1.80518 | 25.42 | 0.61616 |
| 30 | −24.63022 | 0.882 | 1.60300 | 65.44 | 0.54022 |
| 31 | 26.11599 | 3.199 | | | |
| 32 | −41.59530 | 0.899 | 1.80100 | 34.97 | 0.58642 |
| 33 | 49.70954 | 2.255 | | | |
| 34 | 43.72156 | 5.600 | 1.80000 | 29.84 | 0.60178 |
| 35 | −36.00246 | 2.992 | | | |
| 36 | 36.16338 | 5.708 | 1.48749 | 70.24 | 0.53007 |
| 37 | −25.22381 | 1.199 | 1.80518 | 25.42 | 0.61616 |
| 38 | −148.78795 | 4.102 | | | |
| 39 | −27.60609 | 1.199 | 1.91082 | 35.25 | 0.58224 |
| 40 | −43.25152 | 23.562 | | | |
| 41 | ∞ | 2.850 | 1.51633 | 64.14 | 0.53531 |
| 42 | ∞ | | | | |

TABLE 5

Example 2 - Specifications (d-line)

| | Wide-Angle End | Middle | Telephoto End |
|---|---|---|---|
| Zoom Magnification | 1.0 | 1.8 | 2.6 |
| f | 51.492 | 92.178 | 135.901 |
| Bf | 27.440 | 27.440 | 27.440 |
| FNo. | 2.89 | 2.89 | 2.89 |
| 2ω [°] | 30.2 | 17.0 | 11.6 |

TABLE 6

Example 2 - Distances Relating to Zoom

| | Wide-Angle End | Middle | Telephoto End |
|---|---|---|---|
| DD[7] | 1.199 | 24.644 | 34.908 |
| DD[15] | 12.356 | 7.391 | 1.751 |
| DD[20] | 31.802 | 13.322 | 8.698 |

Figure 27:
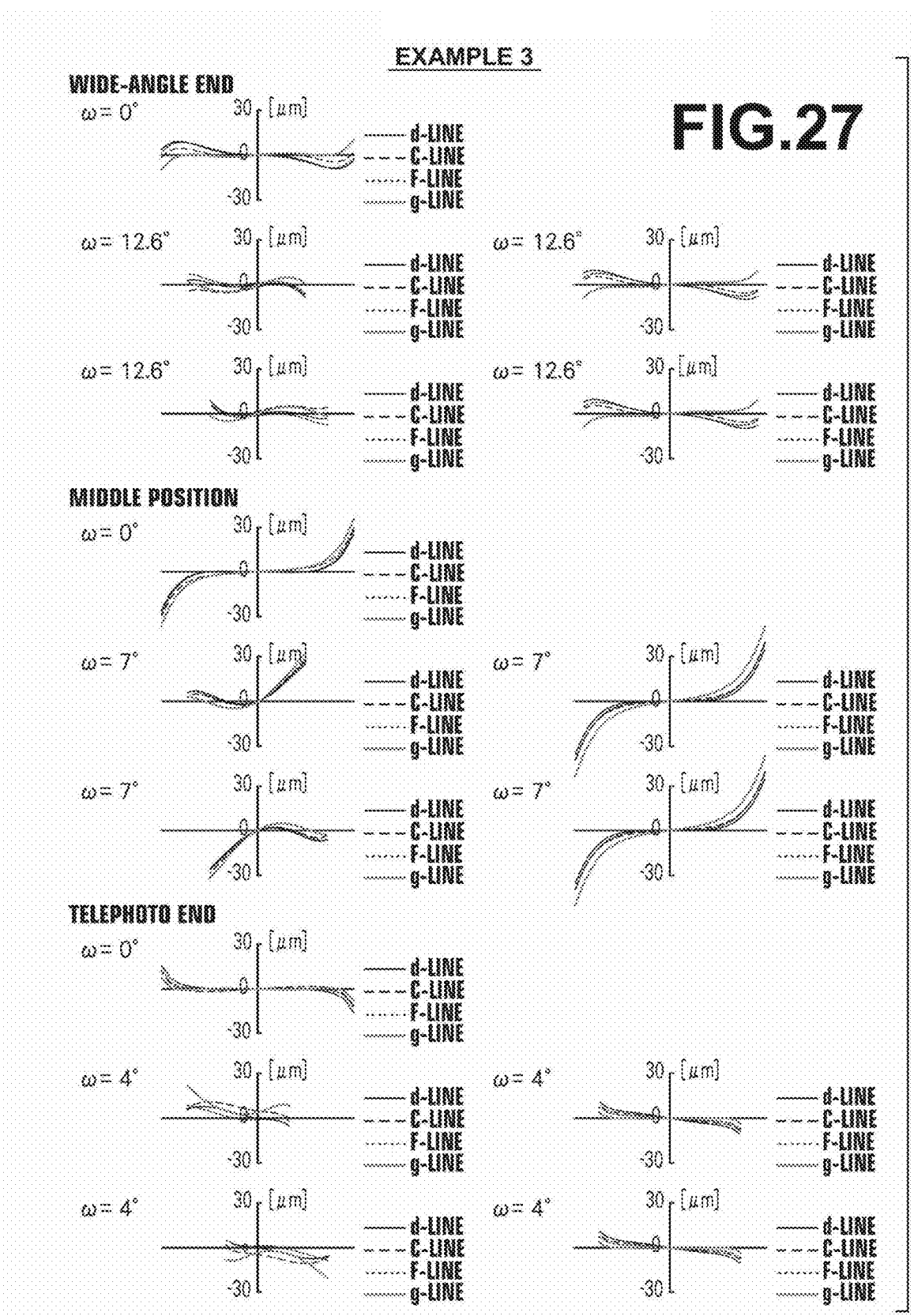
FIG. 27 shows lateral aberration diagrams of the zoom lens of Example 3 of the invention.

Next, a zoom lens of Example 3 is described. The zoom lens of Example 3 has a lens group configuration similar to that of the zoom lens of Example 1. FIG. 3 is a sectional view illustrating the lens configuration of the zoom lens of Example 3. Table 7 shows basic lens data of the zoom lens of Example 3, Table 8 shows data about specifications of the zoom lens, Table 9 shows data about distances between surfaces to be moved of the zoom lens, FIG. 14 shows aberration diagrams of the zoom lens, FIG. 27 shows lateral aberration diagrams of the zoom lens without image stabilization, and FIG. 28 shows lateral aberration diagrams of the zoom lens with image stabilization.

TABLE 7

Example 3 - Lens Data

| Surface No. | Radius of Curvature | Surface Distance | nd | vd | θgF |
|---|---|---|---|---|---|
| 1 | 263.09263 | 2.312 | 1.88100 | 40.14 | 0.57010 |
| 2 | 65.86876 | 7.199 | 1.49700 | 81.54 | 0.53748 |
| 3 | −571.64100 | 0.262 | | | |
| 4 | 65.97392 | 6.200 | 1.45562 | 91.31 | 0.53429 |
| 5 | 1175.27258 | 0.209 | | | |
| 6 | 81.36467 | 5.500 | 1.53775 | 74.70 | 0.53936 |
| 7 | 614.16494 | DD[7] | | | |
| 8 | 120.18724 | 5.912 | 1.72047 | 34.71 | 0.58350 |
| 9 | −42.77946 | 1.200 | 1.62230 | 53.17 | 0.55424 |
| 10 | 26.30170 | 5.468 | | | |
| 11 | −3031.67199 | 1.009 | 1.43875 | 94.94 | 0.53433 |
| 12 | 24.69032 | 4.403 | 1.84661 | 23.88 | 0.62072 |
| 13 | 52.10852 | 4.001 | | | |
| 14 | −29.01944 | 0.999 | 1.88300 | 40.76 | 0.56679 |
| 15 | 677.75184 | DD[15] | | | |
| 16 | −624.58221 | 3.099 | 1.91082 | 35.25 | 0.58224 |
| 17 | −48.99609 | 0.100 | | | |
| 18 | 84.61141 | 4.859 | 1.62041 | 60.29 | 0.54266 |
| 19 | −45.52887 | 1.100 | 1.84666 | 23.78 | 0.62054 |
| 20 | −11814.82817 | DD[20] | | | |
| 21 (stop) | ∞ | 1.300 | | | |
| 22 | 28.94841 | 7.001 | 1.49700 | 81.54 | 0.53748 |
| 23 | −70.94964 | 2.298 | | | |
| 24 | 35.48837 | 2.499 | 1.65412 | 39.68 | 0.57378 |
| 25 | 125.19811 | 1.799 | | | |
| 26 | −55.44889 | 1.210 | 1.90366 | 31.31 | 0.59481 |
| 27 | 24.47948 | 7.501 | 1.49700 | 81.54 | 0.53748 |
| 28 | −71.45146 | 2.001 | | | |
| 29 | 93.11345 | 4.160 | 1.80518 | 25.42 | 0.61616 |
| 30 | −26.87211 | 0.849 | 1.58313 | 59.37 | 0.54345 |
| 31 | 26.83474 | 3.501 | | | |
| 32 | −31.98401 | 0.901 | 1.80100 | 34.97 | 0.58642 |
| 33 | 64.79704 | 2.718 | | | |
| 34 | 52.34160 | 5.499 | 1.80000 | 29.84 | 0.60178 |
| 35 | −36.46191 | 4.001 | | | |
| 36 | 56.45949 | 7.310 | 1.48749 | 70.24 | 0.53007 |
| 37 | −23.44294 | 1.199 | 1.80518 | 25.42 | 0.61616 |
| 38 | −60.82914 | 2.999 | | | |
| 39 | −26.37941 | 1.199 | 1.91082 | 35.25 | 0.58224 |
| 40 | −35.96318 | 22.238 | | | |
| 41 | ∞ | 2.850 | 1.51633 | 64.14 | 0.53531 |
| 42 | ∞ | | | | |

TABLE 8

Example 3 - Specifications (d-line)

|  | Wide-Angle End | Middle | Telephoto End |
|---|---|---|---|
| Zoom Magnification | 1.0 | 1.8 | 3.1 |
| f | 50.359 | 90.150 | 157.119 |
| Bf | 26.122 | 26.122 | 26.122 |
| FNo. | 2.89 | 2.90 | 2.92 |
| 2ω [°] | 31.0 | 17.2 | 10.0 |

TABLE 9

Example 3 - Distances Relating to Zoom

|  | Wide-Angle End | Middle | Telephoto End |
|---|---|---|---|
| DD[7] | 1.199 | 24.327 | 37.203 |
| DD[15] | 16.502 | 10.829 | 1.100 |
| DD[20] | 32.001 | 14.546 | 11.399 |

Figure 29:
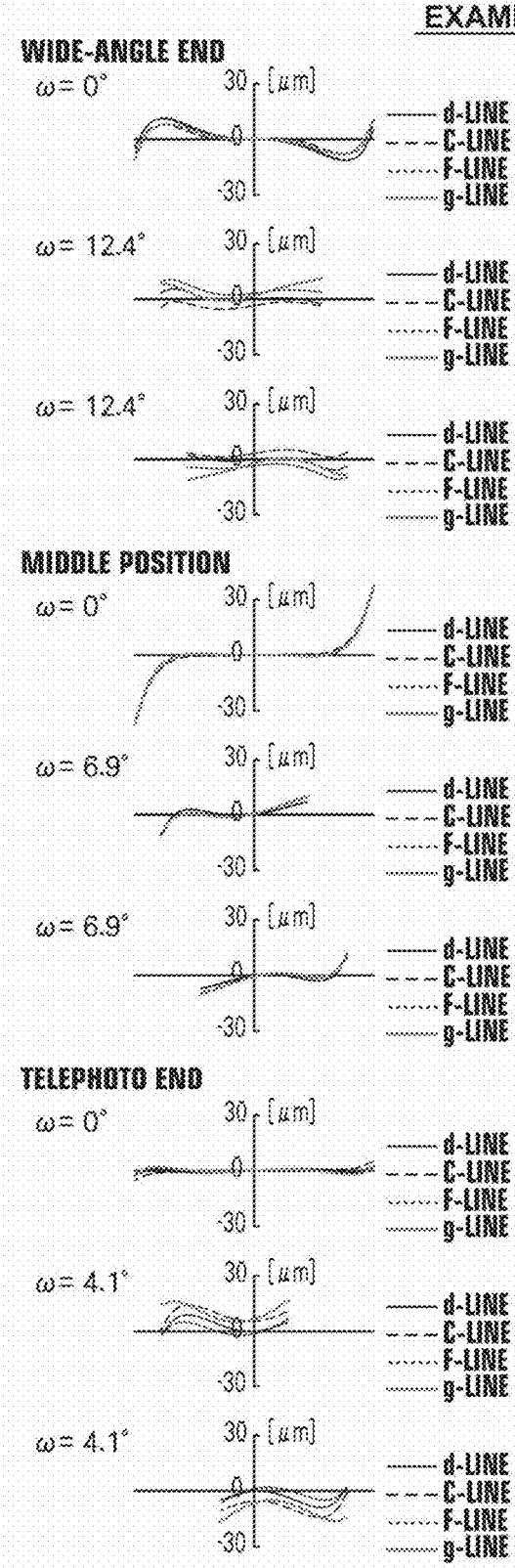
FIG. 29 shows lateral aberration diagrams of the zoom lens of Example 4 of the invention.

Next, a zoom lens of Example 4 is described. The zoom lens of Example 4 has a lens group configuration similar to that of the zoom lens of Example 1. FIG. 4 is a sectional view illustrating the lens configuration of the zoom lens of Example 4. Table 10 shows basic lens data of the zoom lens of Example 4, Table 11 shows data about specifications of the zoom lens, Table 12 shows data about distances between surfaces to be moved of the zoom lens, FIG. 15 shows aberration diagrams of the zoom lens, FIG. 29 shows lateral aberration diagrams of the zoom lens without image stabilization, and FIG. 30 shows lateral aberration diagrams of the zoom lens with image stabilization.

TABLE 10

Example 4 - Lens Data

| Surface No. | Radius of Curvature | Surface Distance | nd | vd | θgF |
|---|---|---|---|---|---|
| 1 | 188.13090 | 2.312 | 1.80610 | 33.27 | 0.58845 |
| 2 | 76.50883 | 7.200 | 1.49700 | 81.54 | 0.53748 |
| 3 | −3204.67292 | 0.262 | | | |
| 4 | 71.91851 | 6.200 | 1.43875 | 94.94 | 0.53433 |
| 5 | 718.81472 | 0.209 | | | |
| 6 | 63.83157 | 5.500 | 1.43875 | 94.94 | 0.53433 |
| 7 | 286.11890 | DD[7] | | | |
| 8 | 127.11673 | 5.510 | 1.72047 | 34.71 | 0.58350 |
| 9 | −52.90722 | 1.200 | 1.62230 | 53.17 | 0.55424 |
| 10 | 24.99227 | 6.501 | | | |
| 11 | −273.45110 | 1.511 | 1.59522 | 67.74 | 0.54426 |
| 12 | 26.07897 | 5.501 | 1.84661 | 23.88 | 0.62072 |
| 13 | 90.43692 | 4.000 | | | |
| 14 | −28.20939 | 1.001 | 1.88300 | 40.76 | 0.56679 |
| 15 | −219.42843 | DD[15] | | | |
| 16 | 4368.42118 | 3.099 | 1.91082 | 35.25 | 0.58224 |
| 17 | −45.70178 | 0.100 | | | |
| 18 | 75.53670 | 5.511 | 1.49700 | 81.54 | 0.53748 |
| 19 | −37.32451 | 1.100 | 1.80518 | 25.42 | 0.61616 |
| 20 | −582.89400 | DD[20] | | | |
| 21 (stop) | ∞ | 1.300 | | | |
| 22 | 31.57617 | 7.001 | 1.49700 | 81.54 | 0.53748 |
| 23 | −84.25408 | 1.501 | | | |
| 24 | 32.66369 | 2.500 | 1.65412 | 39.68 | 0.57378 |
| 25 | 452.11337 | 1.799 | | | |
| 26 | −77.71874 | 1.210 | 1.90366 | 31.31 | 0.59481 |
| 27 | 23.15115 | 5.500 | 1.49700 | 81.54 | 0.53748 |
| 28 | −93.31207 | 2.001 | | | |
| 29 | 664.84163 | 4.161 | 1.80518 | 25.42 | 0.61616 |
| 30 | −28.96139 | 1.201 | 1.58313 | 59.37 | 0.54345 |
| 31 | 23.87736 | 3.200 | | | |
| 32 | −37.84433 | 0.899 | 1.80100 | 34.97 | 0.58642 |
| 33 | 66.37072 | 2.215 | | | |
| 34 | 45.41616 | 8.001 | 1.80518 | 25.42 | 0.61616 |
| 35 | −36.36637 | 1.453 | | | |
| 36 | 44.07982 | 7.310 | 1.48749 | 70.24 | 0.53007 |
| 37 | −23.31946 | 1.200 | 1.80518 | 25.42 | 0.61616 |
| 38 | −147.09849 | 2.999 | | | |
| 39 | −27.43891 | 1.200 | 1.91082 | 35.25 | 0.58224 |
| 40 | −35.75126 | 22.213 | | | |
| 41 | ∞ | 2.850 | 1.51633 | 64.14 | 0.53531 |
| 42 | ∞ | | | | |

TABLE 11

Example 4 - Specifications (d-line)

|  | Wide-Angle End | Middle | Telephoto End |
|---|---|---|---|
| Zoom Magnification | 1.0 | 1.8 | 3.0 |
| f | 51.153 | 91.572 | 154.995 |
| Bf | 26.096 | 26.096 | 26.096 |
| FNo. | 2.89 | 2.89 | 2.89 |
| 2ω [°] | 30.6 | 17.2 | 10.2 |

TABLE 12

Example 4 - Distances Relating to Zoom

|  | Wide-Angle End | Middle | Telephoto End |
|---|---|---|---|
| DD[7] | 1.199 | 22.851 | 34.047 |
| DD[15] | 17.079 | 11.080 | 1.673 |
| DD[20] | 28.994 | 13.341 | 11.552 |

Figure 31:
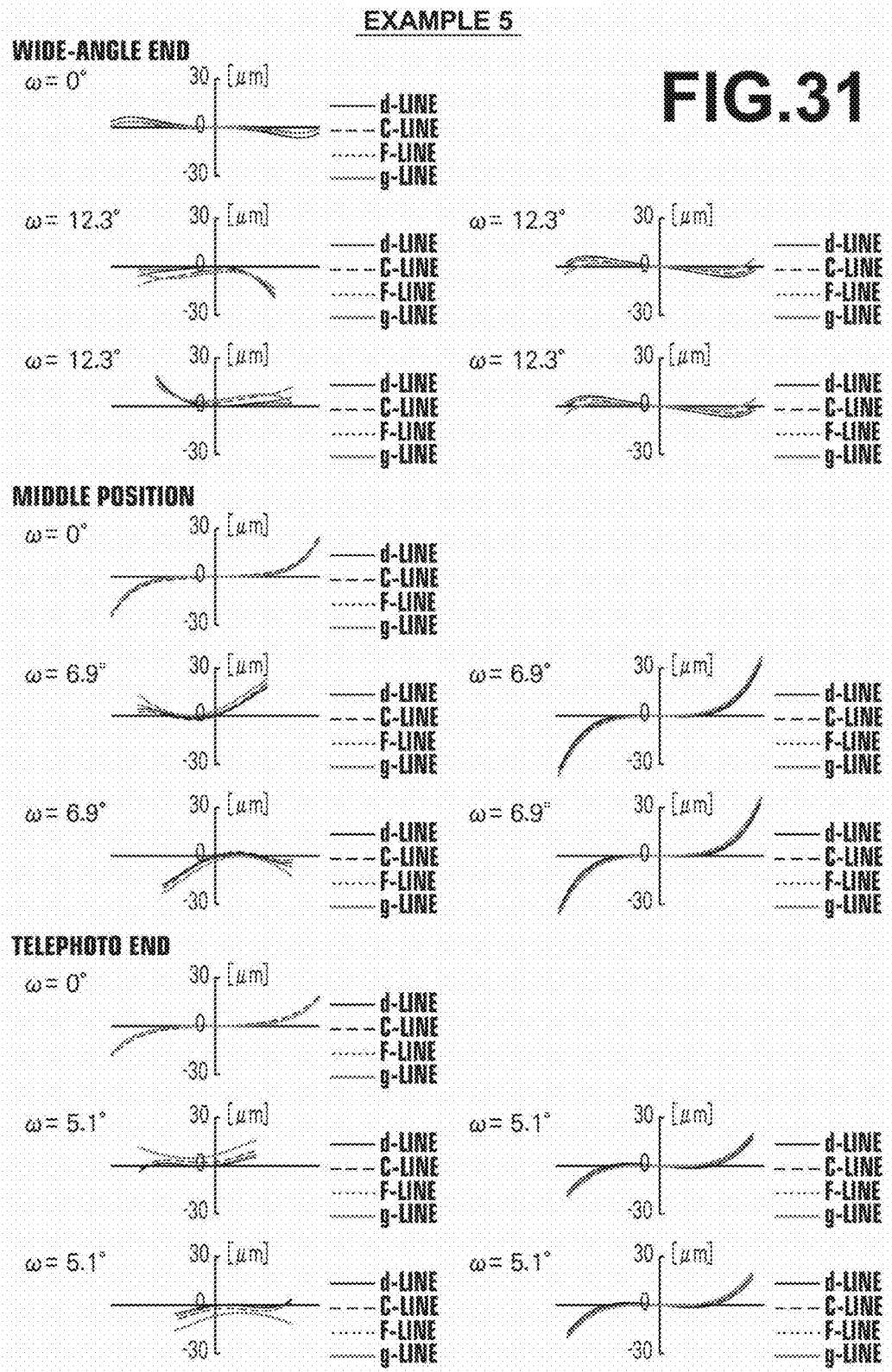
FIG. 31 shows lateral aberration diagrams of the zoom lens of Example 5 of the invention.

Next, a zoom lens of Example 5 is described. The zoom lens of Example 5 has a lens group configuration similar to that of the zoom lens of Example 1. FIG. 5 is a sectional view illustrating the lens configuration of the zoom lens of Example 5. Table 13 shows basic lens data of the zoom lens of Example 5, Table 14 shows data about specifications of the zoom lens, Table 15 shows data about distances between surfaces to be moved of the zoom lens, FIG. 16 shows aberration diagrams of the zoom lens, FIG. 31 shows lateral aberration diagrams of the zoom lens without image stabilization, and FIG. 32 shows lateral aberration diagrams of the zoom lens with image stabilization.

TABLE 13

Example 5 - Lens Data

| Surface No. | Radius of Curvature | Surface Distance | nd | vd | θgF |
|---|---|---|---|---|---|
| 1 | 308.24145 | 2.390 | 1.80100 | 34.97 | 0.58642 |
| 2 | 78.18266 | 7.850 | 1.49700 | 81.54 | 0.53748 |
| 3 | −340.82791 | 0.200 | | | |
| 4 | 66.71039 | 6.600 | 1.43875 | 94.94 | 0.53433 |
| 5 | 720.82813 | 0.200 | | | |
| 6 | 71.57189 | 4.950 | 1.49700 | 81.54 | 0.53748 |
| 7 | 271.98720 | DD[7] | | | |
| 8 | 100.51474 | 5.710 | 1.72047 | 34.71 | 0.58350 |
| 9 | −47.31525 | 1.550 | 1.62230 | 53.17 | 0.55424 |
| 10 | 25.05895 | 5.799 | | | |
| 11 | −81.14905 | 1.260 | 1.49700 | 81.54 | 0.53748 |
| 12 | 26.42066 | 5.385 | 1.84661 | 23.88 | 0.62072 |
| 13 | 110.30764 | 3.945 | | | |
| 14 | −30.83422 | 1.250 | 1.91082 | 35.25 | 0.58224 |

TABLE 13-continued

Example 5 - Lens Data

| Surface No. | Radius of Curvature | Surface Distance | nd | vd | θgF |
|---|---|---|---|---|---|
| 15 | 339.66055 | DD[15] | | | |
| 16 | −578.30556 | 2.950 | 1.80100 | 34.97 | 0.58642 |
| 17 | −44.53935 | 0.100 | | | |
| 18 | 76.28815 | 4.310 | 1.61800 | 63.33 | 0.54414 |
| 19 | −43.38154 | 1.150 | 1.80518 | 25.42 | 0.61616 |
| 20 | ∞ | DD[20] | | | |
| 21 (stop) | ∞ | 1.300 | | | |
| 22 | 27.81766 | 6.849 | 1.49700 | 81.54 | 0.53748 |
| 23 | −58.16078 | 0.150 | | | |
| 24 | 34.51417 | 2.550 | 1.65412 | 39.68 | 0.57378 |
| 25 | 107.98255 | 1.610 | | | |
| 26 | −54.74993 | 1.210 | 1.90366 | 31.31 | 0.59481 |
| 27 | 23.44507 | 5.499 | 1.49700 | 81.54 | 0.53748 |
| 28 | −83.55949 | 2.500 | | | |
| 29 | 343.99918 | 3.771 | 1.80518 | 25.42 | 0.61616 |
| 30 | −24.56535 | 0.950 | 1.58913 | 61.13 | 0.54067 |
| 31 | 39.79185 | 2.559 | | | |
| 32 | −45.16452 | 1.050 | 1.80100 | 34.97 | 0.58642 |
| 33 | 60.11939 | 4.533 | | | |
| 34 | 51.91667 | 6.541 | 1.80000 | 29.84 | 0.60178 |
| 35 | −39.70261 | 4.000 | | | |
| 36 | 54.95096 | 6.950 | 1.48749 | 70.24 | 0.53007 |
| 37 | −27.73386 | 1.310 | 1.80518 | 25.42 | 0.61616 |
| 38 | −89.67633 | 3.413 | | | |
| 39 | −27.15780 | 1.310 | 1.91082 | 35.25 | 0.58224 |
| 40 | −45.53256 | 24.577 | | | |
| 41 | ∞ | 2.850 | 1.51633 | 64.14 | 0.53531 |
| 42 | ∞ | | | | |

TABLE 14

Example 5 - Specifications (d-line)

| | Wide-Angle End | Middle | Telephoto End |
|---|---|---|---|
| Zoom Magnification | 1.0 | 1.8 | 2.4 |
| f | 51.515 | 92.219 | 125.696 |
| Bf | 28.455 | 28.455 | 28.455 |
| FNo. | 2.88 | 2.89 | 2.89 |
| 2ω [°] | 30.4 | 17.0 | 12.4 |

TABLE 15

Example 5 - Distances Relating to Zoom

| | Wide-Angle End | Middle | Telephoto End |
|---|---|---|---|
| DD[7] | 1.199 | 22.040 | 29.321 |
| DD[15] | 14.144 | 8.593 | 3.929 |
| DD[20] | 27.855 | 12.565 | 9.948 |

Figure 33:
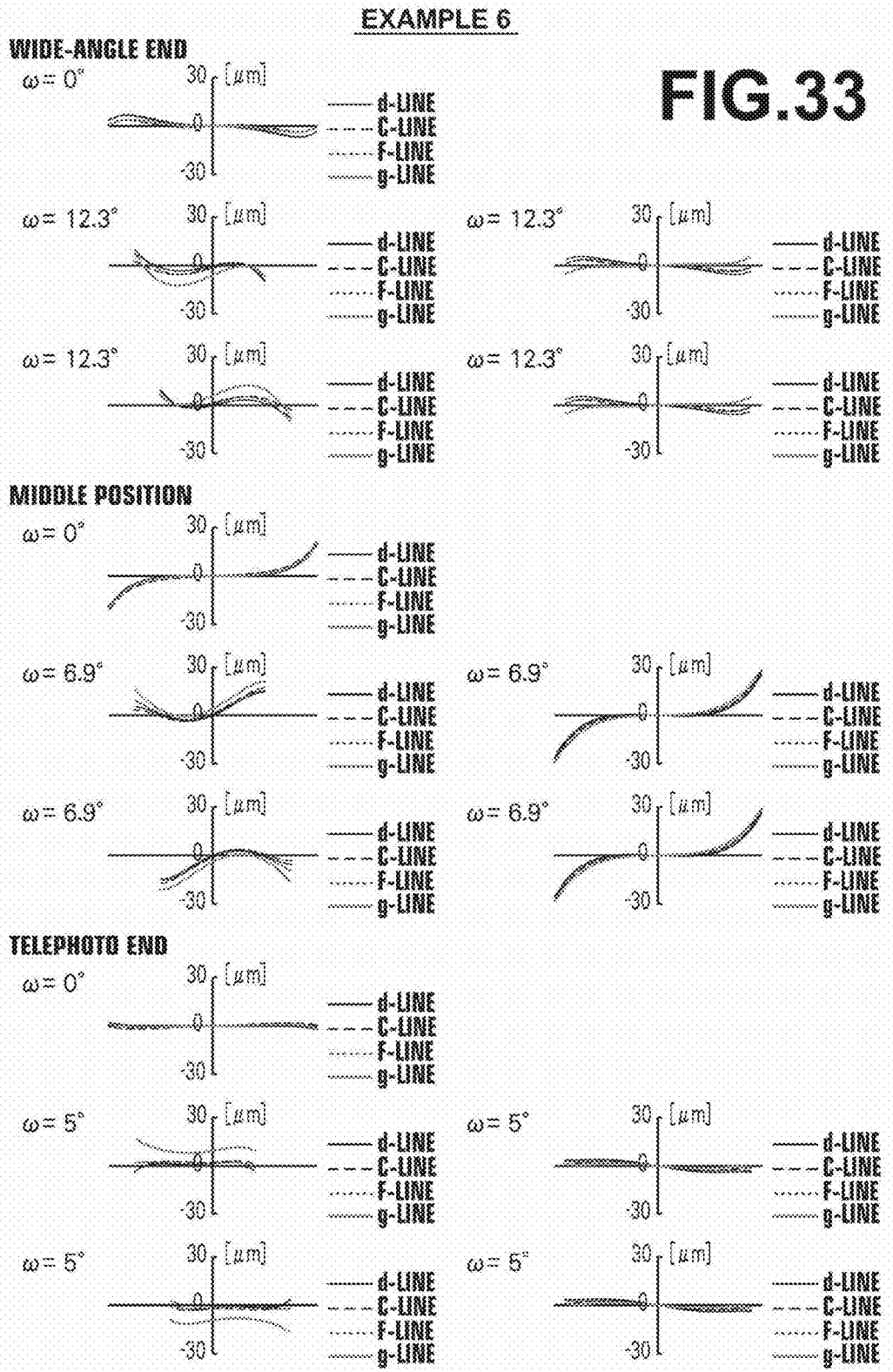
FIG. 33 shows lateral aberration diagrams of the zoom lens of Example 6 of the invention.

Next, a zoom lens of Example 6 is described. The zoom lens of Example 6 has a lens group configuration similar to that of the zoom lens of Example 1. FIG. 6 is a sectional view illustrating the lens configuration of the zoom lens of Example 6. Table 16 shows basic lens data of the zoom lens of Example 6, Table 17 shows data about specifications of the zoom lens, Table 18 shows data about distances between surfaces to be moved of the zoom lens, FIG. 17 shows aberration diagrams of the zoom lens, FIG. 33 shows lateral aberration diagrams of the zoom lens without image stabilization, and FIG. 34 shows lateral aberration diagrams of the zoom lens with image stabilization.

TABLE 16

Example 6 - Lens Data

| Surface No. | Radius of Curvature | Surface Distance | nd | vd | θgF |
|---|---|---|---|---|---|
| 1 | 379.59503 | 2.390 | 1.80100 | 34.97 | 0.58642 |
| 2 | 87.06343 | 7.850 | 1.49700 | 81.54 | 0.53748 |
| 3 | −423.40525 | 0.200 | | | |
| 4 | 77.08956 | 6.600 | 1.43875 | 94.94 | 0.53433 |
| 5 | 505.15031 | 0.200 | | | |
| 6 | 74.14509 | 4.950 | 1.49700 | 81.54 | 0.53748 |
| 7 | 428.65265 | DD[7] | | | |
| 8 | 95.00168 | 5.710 | 1.72047 | 34.71 | 0.58350 |
| 9 | −42.18184 | 1.550 | 1.62230 | 53.17 | 0.55424 |
| 10 | 25.82252 | 4.852 | | | |
| 11 | −127.50772 | 1.260 | 1.49700 | 81.54 | 0.53748 |
| 12 | 27.56506 | 4.000 | 1.84661 | 23.88 | 0.62072 |
| 13 | 102.12490 | 3.395 | | | |
| 14 | −31.04306 | 1.250 | 1.91082 | 35.25 | 0.58224 |
| 15 | 593.08219 | DD[15] | | | |
| 16 | −587.37289 | 2.950 | 1.80100 | 34.97 | 0.58642 |
| 17 | −43.88242 | 0.100 | | | |
| 18 | 78.12881 | 4.310 | 1.61800 | 63.33 | 0.54414 |
| 19 | −42.34007 | 1.150 | 1.80518 | 25.42 | 0.61616 |
| 20 | ∞ | DD[20] | | | |
| 21 (stop) | ∞ | 1.300 | | | |
| 22 | 27.72433 | 6.373 | 1.49700 | 81.54 | 0.53748 |
| 23 | −59.65321 | 0.150 | | | |
| 24 | 34.01198 | 2.550 | 1.65412 | 39.68 | 0.57378 |
| 25 | 93.88248 | 1.610 | | | |
| 26 | −54.41210 | 1.210 | 1.90366 | 31.31 | 0.59481 |
| 27 | 23.35543 | 5.569 | 1.49700 | 81.54 | 0.53748 |
| 28 | −77.98799 | 2.500 | | | |
| 29 | 394.61491 | 3.771 | 1.80518 | 25.42 | 0.61616 |
| 30 | −24.49939 | 0.950 | 1.58913 | 61.13 | 0.54067 |
| 31 | 37.65964 | 2.511 | | | |
| 32 | −48.39346 | 1.050 | 1.80100 | 34.97 | 0.58642 |
| 33 | 60.29812 | 4.948 | | | |
| 34 | 52.39389 | 5.299 | 1.80000 | 29.84 | 0.60178 |
| 35 | −39.28541 | 3.134 | | | |
| 36 | 53.75550 | 7.501 | 1.48749 | 70.24 | 0.53007 |
| 37 | −26.62926 | 1.310 | 1.80518 | 25.42 | 0.61616 |
| 38 | −98.73317 | 6.921 | | | |
| 39 | −26.89205 | 1.310 | 1.91082 | 35.25 | 0.58224 |
| 40 | −46.99846 | 18.856 | | | |
| 41 | ∞ | 2.850 | 1.51633 | 64.14 | 0.53531 |
| 42 | ∞ | | | | |

TABLE 17

Example 6 - Specifications (d-line)

| | Wide-Angle End | Middle | Telephoto End |
|---|---|---|---|
| Zoom Magnification | 1.0 | 1.8 | 2.4 |
| f | 51.515 | 92.219 | 125.696 |
| Bf | 22.736 | 22.736 | 22.736 |
| FNo. | 2.88 | 2.89 | 2.88 |
| 2ω [°] | 30.4 | 17.0 | 12.4 |

TABLE 18

Example 6 - Distances Relating to Zoom

| | Wide-Angle End | Middle | Telephoto End |
|---|---|---|---|
| DD[7] | 1.199 | 26.087 | 34.640 |
| DD[15] | 13.697 | 7.573 | 2.495 |
| DD[20] | 32.001 | 13.236 | 9.762 |

Next, a zoom lens of Example 7 is described. The zoom lens of Example 7 has a lens group configuration similar to that of the zoom lens of Example 1. FIG. 7 is a sectional view illustrating the lens configuration of the zoom lens of Example 7. Table 19 shows basic lens data of the zoom lens of Example 7, Table 20 shows data about specifications of the zoom lens, Table 21 shows data about distances between surfaces to be moved of the zoom lens, FIG. 18 shows aberration diagrams of the zoom lens, FIG. 35 shows lateral aberration diagrams of the zoom lens without image stabilization, and FIG. 36 shows lateral aberration diagrams of the zoom lens with image stabilization.

TABLE 19

Example 7 - Lens Data

| Surface No. | Radius of Curvature | Surface Distance | nd | vd | θgF |
|---|---|---|---|---|---|
| 1 | 358.57195 | 2.320 | 1.80100 | 34.97 | 0.58642 |
| 2 | 85.09780 | 7.200 | 1.49700 | 81.54 | 0.53748 |
| 3 | −386.19076 | 0.200 | | | |
| 4 | 72.25745 | 6.972 | 1.43875 | 94.94 | 0.53433 |
| 5 | ∞ | 0.200 | | | |
| 6 | 69.93587 | 5.200 | 1.49700 | 81.54 | 0.53748 |
| 7 | 235.70554 | DD[7] | | | |
| 8 | 96.21157 | 6.291 | 1.72047 | 34.71 | 0.58350 |
| 9 | −43.59489 | 1.530 | 1.62230 | 53.17 | 0.55424 |
| 10 | 24.59706 | 5.600 | | | |
| 11 | −73.29120 | 1.410 | 1.49700 | 81.54 | 0.53748 |
| 12 | 27.09637 | 4.000 | 1.84661 | 23.88 | 0.62072 |
| 13 | 123.98633 | 2.799 | | | |
| 14 | −30.96977 | 1.200 | 1.91082 | 35.25 | 0.58224 |
| 15 | 353.74684 | DD[15] | | | |
| 16 | −406.80952 | 2.850 | 1.80100 | 34.97 | 0.58642 |
| 17 | −43.60631 | 0.100 | | | |
| 18 | 74.86402 | 4.260 | 1.61800 | 63.33 | 0.54414 |
| 19 | −43.68363 | 1.170 | 1.80518 | 25.42 | 0.61616 |
| 20 | ∞ | DD[20] | | | |
| 21 (stop) | ∞ | 1.300 | | | |
| 22 | 28.04424 | 7.050 | 1.49700 | 81.54 | 0.53748 |
| 23 | −59.60296 | 0.150 | | | |
| 24 | 34.77250 | 2.570 | 1.65412 | 39.68 | 0.57378 |
| 25 | 89.21437 | 1.800 | | | |
| 26 | −51.39895 | 1.110 | 1.90366 | 31.31 | 0.59481 |
| 27 | 24.25217 | 5.266 | 1.49700 | 81.54 | 0.53748 |
| 28 | −60.88125 | 2.800 | | | |
| 29 | 733.80887 | 3.771 | 1.80518 | 25.42 | 0.61616 |
| 30 | −23.29690 | 0.950 | 1.58913 | 61.13 | 0.54067 |
| 31 | 39.10301 | 2.801 | | | |
| 32 | −39.71546 | 1.000 | 1.80100 | 34.97 | 0.58642 |
| 33 | 62.34880 | 4.199 | | | |
| 34 | 54.23606 | 5.285 | 1.80000 | 29.84 | 0.60178 |
| 35 | −37.12789 | 4.367 | | | |
| 36 | 51.75623 | 6.461 | 1.48749 | 70.24 | 0.53007 |
| 37 | −25.77385 | 1.310 | 1.80518 | 25.42 | 0.61616 |
| 38 | −86.83396 | 4.400 | | | |
| 39 | −27.43970 | 1.260 | 1.91082 | 35.25 | 0.58224 |
| 40 | −40.98080 | 25.514 | | | |
| 41 | ∞ | 2.850 | 1.51633 | 64.14 | 0.53531 |
| 42 | ∞ | | | | |

TABLE 20

Example 7 - Specification (d-line)

| | Wide-Angle End | Middle | Telephoto End |
|---|---|---|---|
| Zoom Magnification | 1.0 | 1.8 | 2.6 |
| f | 51.516 | 92.222 | 135.965 |
| Bf | 29.393 | 29.393 | 29.393 |
| FNo. | 2.88 | 2.89 | 2.88 |
| 2ω[°] | 30.6 | 17.0 | 11.6 |

TABLE 21

Example 7 - Distances Relating to Zoom

| | Wide-Angle End | Middle | Telephoto End |
|---|---|---|---|
| DD[7] | 1.191 | 22.931 | 32.107 |
| DD[15] | 14.409 | 8.821 | 2.687 |
| DD[20] | 29.090 | 12.939 | 9.896 |

Figure 37:
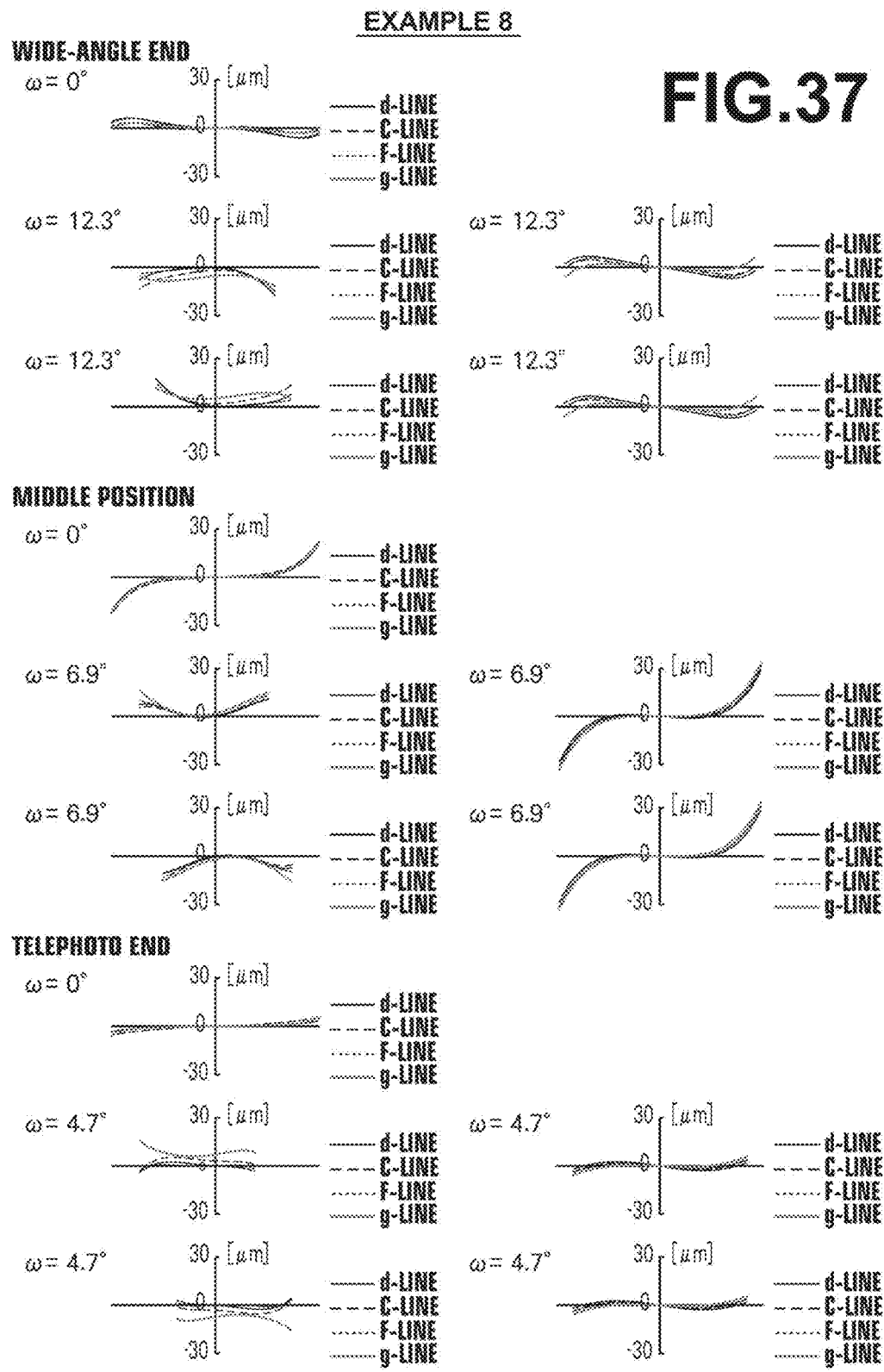
FIG. 37 shows lateral aberration diagrams of the zoom lens of Example 8 of the invention.

Next, a zoom lens of Example 8 is described. The zoom lens of Example 8 has a five-group configuration which consists of, in order from the object side, a first lens group G1 having a positive refractive power, a second lens group G2 having a negative refractive power, a third lens group G3 having a negative refractive power, a fourth lens group G4 (the mp lens group) having a positive refractive power, and a fifth lens group G5 (the rearmost lens group) having a positive refractive power. FIG. 8 is a sectional view illustrating the lens configuration of the zoom lens of Example 8. Table 22 shows basic lens data of the zoom lens of Example 8, Table 23 shows data about specifications of the zoom lens, Table 24 shows data about distances between surfaces to be moved of the zoom lens, FIG. 19 shows aberration diagrams of the zoom lens, FIG. 37 shows lateral aberration diagrams of the zoom lens without image stabilization, and FIG. 38 shows lateral aberration diagrams of the zoom lens with image stabilization.

TABLE 22

Example 8 - Lens Data

| Surface No. | Radius of Curvature | Surface Distance | nd | vd | θgF |
|---|---|---|---|---|---|
| 1 | 303.47850 | 2.390 | 1.80100 | 34.97 | 0.58642 |
| 2 | 75.71759 | 7.850 | 1.49700 | 81.54 | 0.53748 |
| 3 | −338.62836 | 0.200 | | | |
| 4 | 67.27723 | 6.600 | 1.43875 | 94.94 | 0.53433 |
| 5 | 706.55071 | 0.200 | | | |
| 6 | 67.16666 | 4.950 | 1.49700 | 81.54 | 0.53748 |
| 7 | 287.46150 | DD[7] | | | |
| 8 | 98.18370 | 5.710 | 1.72047 | 34.71 | 0.58350 |
| 9 | −49.05401 | 1.550 | 1.62230 | 53.17 | 0.55424 |
| 10 | 24.62771 | DD[10] | | | |
| 11 | −75.51985 | 1.260 | 1.49700 | 81.54 | 0.53748 |
| 12 | 25.58057 | 5.388 | 1.84661 | 23.88 | 0.62072 |
| 13 | 106.72525 | 3.704 | | | |
| 14 | −31.24101 | 1.250 | 1.91082 | 35.25 | 0.58224 |
| 15 | 268.03486 | DD[15] | | | |
| 16 | −521.95122 | 2.950 | 1.80100 | 34.97 | 0.58642 |
| 17 | −44.70833 | 0.100 | | | |
| 18 | 73.37158 | 4.310 | 1.61800 | 63.33 | 0.54414 |
| 19 | −43.22381 | 1.150 | 1.80518 | 25.42 | 0.61616 |
| 20 | ∞ | DD[20] | | | |
| 21 (stop) | ∞ | 1.300 | | | |
| 22 | 27.81729 | 6.868 | 1.49700 | 81.54 | 0.53748 |
| 23 | −57.84476 | 0.150 | | | |
| 24 | 34.09999 | 2.550 | 1.65412 | 39.68 | 0.57378 |
| 25 | 102.68991 | 1.610 | | | |
| 26 | −54.83237 | 1.210 | 1.90366 | 31.31 | 0.59481 |
| 27 | 23.14151 | 5.662 | 1.49700 | 81.54 | 0.53748 |
| 28 | −87.93105 | 2.500 | | | |
| 29 | 372.91281 | 3.771 | 1.80518 | 25.42 | 0.61616 |
| 30 | −24.31863 | 0.950 | 1.58913 | 61.13 | 0.54067 |
| 31 | 36.29877 | 3.256 | | | |
| 32 | −44.08151 | 1.050 | 1.80100 | 34.97 | 0.58642 |
| 33 | 60.80519 | 3.831 | | | |
| 34 | 50.53032 | 5.748 | 1.80000 | 29.84 | 0.60178 |
| 35 | −39.43779 | 4.000 | | | |
| 36 | 48.86127 | 8.012 | 1.48749 | 70.24 | 0.53007 |
| 37 | −26.40743 | 1.310 | 1.80518 | 25.42 | 0.61616 |
| 38 | −86.68447 | 3.157 | | | |
| 39 | −27.70770 | 1.310 | 1.91082 | 35.25 | 0.58224 |
| 40 | −44.10429 | 24.901 | | | |

TABLE 22-continued

Example 8 - Lens Data

| Surface No. | Radius of Curvature | Surface Distance | nd | vd | θgF |
|---|---|---|---|---|---|
| 41 | ∞ | 2.850 | 1.51633 | 64.14 | 0.53531 |
| 42 | ∞ | | | | |

TABLE 23

Example 8 - Specification (d-line)

| | Wide-Angle End | Middle | Telephoto End |
|---|---|---|---|
| Zoom Magnification | 1.0 | 1.8 | 2.6 |
| f | 51.514 | 92.218 | 135.960 |
| Bf | 28.781 | 28.781 | 28.781 |
| FNo. | 2.88 | 2.89 | 2.88 |
| 2ω[°] | 30.4 | 17.0 | 11.6 |

TABLE 24

Example 8 - Distances Relating to Zoom

| | Wide-Angle End | Middle | Telephoto End |
|---|---|---|---|
| DD[7] | 1.199 | 20.933 | 29.242 |
| DD[10] | 6.235 | 6.638 | 6.783 |
| DD[15] | 14.153 | 8.593 | 2.488 |
| DD[20] | 26.710 | 12.132 | 9.785 |

Figure 39:
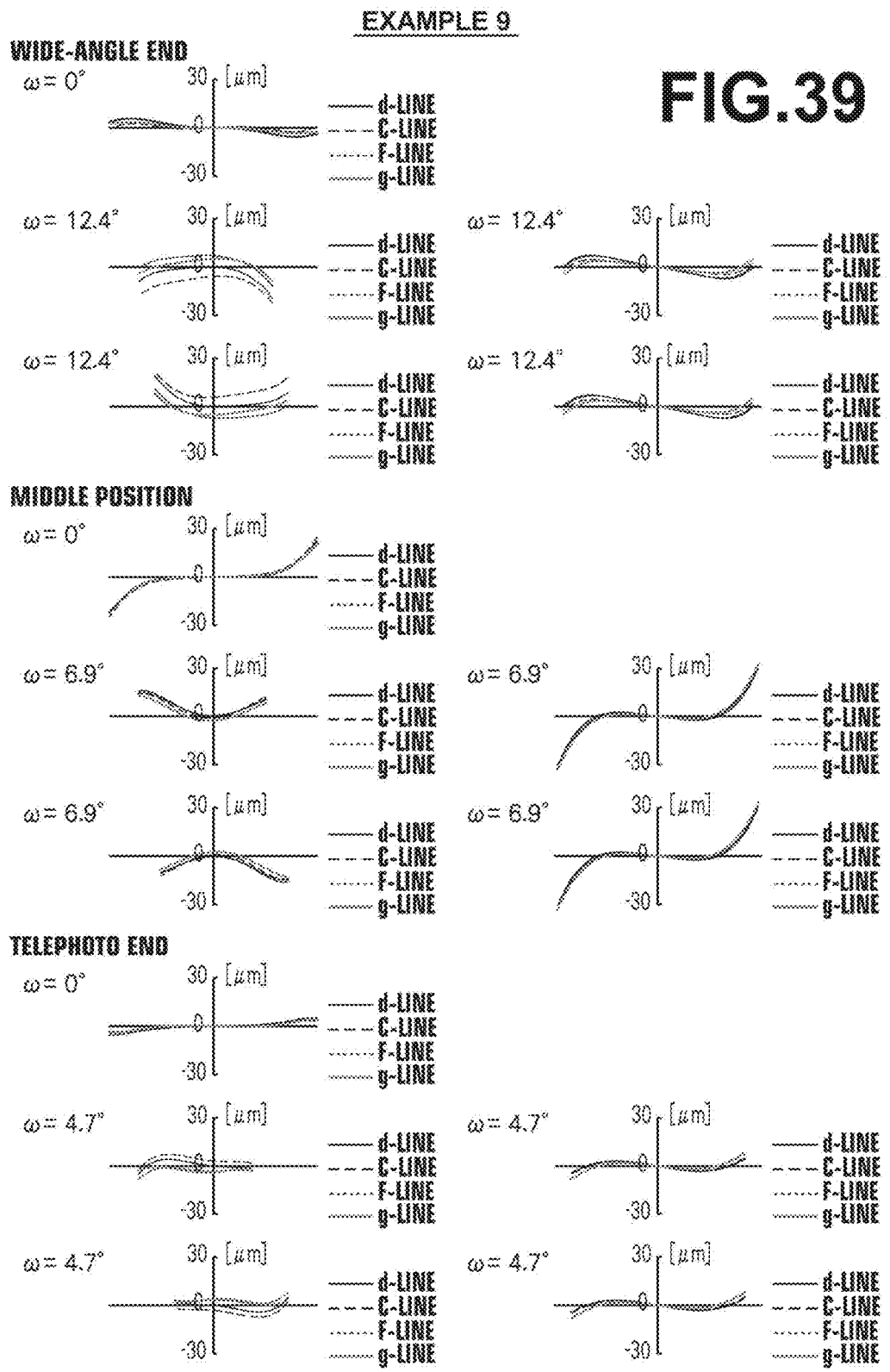
FIG. 39 shows lateral aberration diagrams of the zoom lens of Example 9 of the invention.

Next, a zoom lens of Example 9 is described. The zoom lens of Example 9 has a lens group configuration similar to that of the zoom lens of Example 8. FIG. 9 is a sectional view illustrating the lens configuration of the zoom lens of Example 9. Table 25 shows basic lens data of the zoom lens of Example 9, Table 26 shows data about specifications of the zoom lens, Table 27 shows data about distances between surfaces to be moved of the zoom lens, FIG. 20 shows aberration diagrams of the zoom lens, FIG. 39 shows lateral aberration diagrams of the zoom lens without image stabilization, and FIG. 40 shows lateral aberration diagrams of the zoom lens with image stabilization.

TABLE 25

Example 9 - Lens Data

| Surface No. | Radius of Curvature | Surface Distance | nd | vd | θgF |
|---|---|---|---|---|---|
| 1 | 257.91881 | 2.390 | 1.83400 | 37.16 | 0.57759 |
| 2 | 73.18612 | 7.850 | 1.49700 | 81.54 | 0.53748 |
| 3 | −329.42308 | 0.200 | | | |
| 4 | 62.30117 | 6.600 | 1.43700 | 95.10 | 0.53364 |
| 5 | 849.43043 | 0.200 | | | |
| 6 | 72.87230 | 4.950 | 1.49700 | 81.54 | 0.53748 |
| 7 | 263.78540 | DD[7] | | | |
| 8 | 107.78333 | 5.710 | 1.72047 | 34.71 | 0.58350 |
| 9 | −47.76821 | 1.550 | 1.62230 | 53.17 | 0.55424 |
| 10 | 25.18309 | 5.631 | | | |
| 11 | −93.23488 | 1.260 | 1.49700 | 81.54 | 0.53748 |
| 12 | 26.34063 | 3.999 | 1.84661 | 23.88 | 0.62072 |
| 13 | 99.67576 | DD[13] | | | |
| 14 | −31.09640 | 1.250 | 1.91082 | 35.25 | 0.58224 |
| 15 | 318.83279 | DD[15] | | | |
| 16 | −974.57258 | 2.950 | 1.80100 | 34.97 | 0.58642 |
| 17 | −43.76266 | 0.100 | | | |
| 18 | 65.14269 | 4.310 | 1.53775 | 74.70 | 0.53936 |
| 19 | −49.97731 | 1.150 | 1.80518 | 25.42 | 0.61616 |
| 20 | ∞ | DD[20] | | | |

TABLE 25-continued

Example 9 - Lens Data

| Surface No. | Radius of Curvature | Surface Distance | nd | vd | θgF |
|---|---|---|---|---|---|
| 21 (stop) | ∞ | 1.300 | | | |
| 22 | 28.69392 | 7.001 | 1.49700 | 81.54 | 0.53748 |
| 23 | −59.87797 | 0.150 | | | |
| 24 | 34.09590 | 2.550 | 1.65412 | 39.68 | 0.57378 |
| 25 | 85.63948 | 1.610 | | | |
| 26 | −54.93056 | 1.210 | 1.90366 | 31.31 | 0.59481 |
| 27 | 24.95033 | 6.359 | 1.49700 | 81.54 | 0.53748 |
| 28 | −76.31225 | 2.500 | | | |
| 29 | 141.63653 | 3.771 | 1.80518 | 25.42 | 0.61616 |
| 30 | −23.83965 | 0.950 | 1.58913 | 61.13 | 0.54067 |
| 31 | 30.73799 | 2.499 | | | |
| 32 | −37.50492 | 1.050 | 1.80100 | 34.97 | 0.58642 |
| 33 | 53.05759 | 2.617 | | | |
| 34 | 55.65453 | 6.802 | 1.83400 | 37.16 | 0.57759 |
| 35 | −41.09507 | 4.001 | | | |
| 36 | 52.54294 | 6.611 | 1.48749 | 70.24 | 0.53007 |
| 37 | −38.16059 | 1.310 | 1.80518 | 25.42 | 0.61616 |
| 38 | −57.00236 | 3.270 | | | |
| 39 | −28.19030 | 1.310 | 1.91082 | 35.25 | 0.58224 |
| 40 | −47.93144 | 28.451 | | | |
| 41 | ∞ | 2.850 | 1.51633 | 64.14 | 0.53531 |
| 42 | ∞ | | | | |

TABLE 26

Example 9 - Specification (d-line)

| | Wide-Angle End | Middle | Telephoto End |
|---|---|---|---|
| Zoom Magnification | 1.0 | 1.8 | 2.6 |
| f | 51.526 | 92.240 | 135.992 |
| Bf | 32.332 | 32.332 | 32.332 |
| FNo. | 2.88 | 2.89 | 2.88 |
| 2ω[°] | 30.4 | 17.0 | 11.6 |

TABLE 27

Example 9 - Distances Relating to Zoom

| | Wide-Angle End | Middle | Telephoto End |
|---|---|---|---|
| DD[7] | 1.199 | 21.287 | 29.769 |
| DD[13] | 4.000 | 4.585 | 4.348 |
| DD[15] | 14.542 | 8.794 | 2.472 |
| DD[20] | 26.846 | 11.921 | 9.998 |

Figure 41:
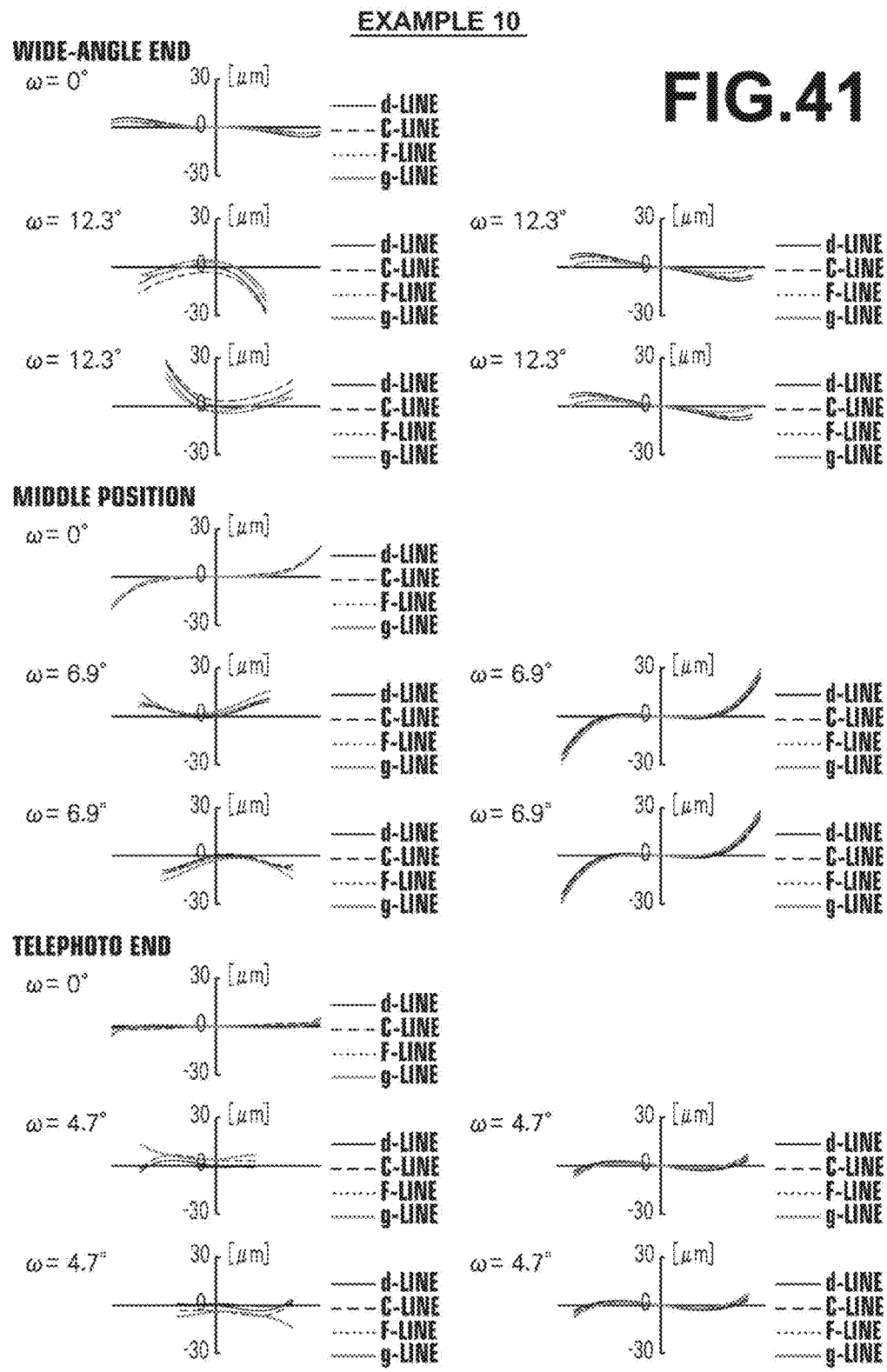
FIG. 41 shows lateral aberration diagrams of the zoom lens of Example 10 of the invention.

Next, a zoom lens of Example 10 is described. The zoom lens of Example 10 has a lens group configuration similar to that of the zoom lens of Example 1. FIG. 10 is a sectional view illustrating the lens configuration of the zoom lens of Example 10. Table 28 shows basic lens data of the zoom lens of Example 10, Table 29 shows data about specifications of the zoom lens, Table 30 shows data about distances between surfaces to be moved of the zoom lens, FIG. 21 shows aberration diagrams of the zoom lens, FIG. 41 shows lateral aberration diagrams of the zoom lens without image stabilization, and FIG. 42 shows lateral aberration diagrams of the zoom lens with image stabilization.

TABLE 28

Example 10 - Lens Data

| Surface No. | Radius of Curvature | Surface Distance | nd | vd | θgF |
|---|---|---|---|---|---|
| 1 | 206.18300 | 2.390 | 1.80100 | 34.97 | 0.58642 |
| 2 | 77.37033 | 7.850 | 1.43875 | 94.94 | 0.53433 |

TABLE 28-continued

Example 10 - Lens Data

| Surface No. | Radius of Curvature | Surface Distance | nd | vd | θgF |
|---|---|---|---|---|---|
| 3 | −468.12933 | 0.200 | | | |
| 4 | 68.18946 | 6.600 | 1.43875 | 94.94 | 0.53433 |
| 5 | 665.76128 | 0.200 | | | |
| 6 | 75.70042 | 4.950 | 1.49700 | 81.54 | 0.53748 |
| 7 | 318.83987 | DD[7] | | | |
| 8 | 97.24407 | 5.710 | 1.72047 | 34.71 | 0.58350 |
| 9 | −43.72645 | 1.550 | 1.62230 | 53.17 | 0.55424 |
| 10 | 24.36854 | 5.706 | | | |
| 11 | −73.08228 | 1.260 | 1.49700 | 81.54 | 0.53748 |
| 12 | 25.31089 | 4.204 | 1.84661 | 23.88 | 0.62072 |
| 13 | 107.97061 | 2.799 | | | |
| 14 | −30.56048 | 1.250 | 1.91082 | 35.25 | 0.58224 |
| 15 | 253.08206 | DD[15] | | | |
| 16 | −16125.23228 | 2.950 | 1.80100 | 34.97 | 0.58642 |
| 17 | −40.12049 | 0.100 | | | |
| 18 | 80.78359 | 4.310 | 1.59282 | 68.62 | 0.54414 |
| 19 | −40.99835 | 1.150 | 1.84666 | 23.78 | 0.62054 |
| 20 | −145.20798 | 7.757 | | | |
| 21 | −92.18977 | 1.500 | 1.80000 | 29.84 | 0.60178 |
| 22 | −254.53436 | DD[22] | | | |
| 23 (stop) | ∞ | 1.300 | | | |
| 24 | 27.68095 | 7.001 | 1.49700 | 81.54 | 0.53748 |
| 25 | −56.35341 | 0.150 | | | |
| 26 | 32.42093 | 2.550 | 1.65412 | 39.68 | 0.57378 |
| 27 | 119.28847 | 1.610 | | | |
| 28 | −55.80214 | 1.210 | 1.90366 | 31.31 | 0.59481 |
| 29 | 23.16845 | 6.126 | 1.49700 | 81.54 | 0.53748 |
| 30 | −90.54469 | 2.500 | | | |
| 31 | 590.71987 | 3.771 | 1.80518 | 25.42 | 0.61616 |
| 32 | −24.23391 | 0.950 | 1.58913 | 61.13 | 0.54067 |
| 33 | 37.50164 | 3.358 | | | |
| 34 | −43.90672 | 1.050 | 1.80100 | 34.97 | 0.58642 |
| 35 | 57.93149 | 4.715 | | | |
| 36 | 51.33459 | 5.893 | 1.80000 | 29.84 | 0.60178 |
| 37 | −38.45068 | 1.953 | | | |
| 38 | 50.11025 | 7.136 | 1.48749 | 70.24 | 0.53007 |
| 39 | −28.43175 | 1.310 | 1.80518 | 25.42 | 0.61616 |
| 40 | −83.91857 | 4.329 | | | |
| 41 | −26.99010 | 1.310 | 1.91082 | 35.25 | 0.58224 |
| 42 | −47.11637 | 24.016 | | | |
| 43 | ∞ | 2.850 | 1.51633 | 64.14 | 0.53531 |
| 44 | ∞ | | | | |

TABLE 29

Example 10 - Specification (d-line)

| | Wide-Angle End | Middle | Telephoto End |
|---|---|---|---|
| Zoom Magnification | 1.0 | 1.8 | 2.6 |
| f | 51.519 | 92.228 | 135.974 |
| Bf | 27.894 | 27.894 | 27.894 |
| FNo. | 2.87 | 2.87 | 2.88 |
| 2ω[°] | 30.4 | 17.0 | 11.6 |

TABLE 30

Example 10 - Distances Relating to Zoom

| | Wide-Angle End | Middle | Telephoto End |
|---|---|---|---|
| DD[7] | 1.279 | 23.274 | 32.917 |
| DD[15] | 11.721 | 7.221 | 2.117 |
| DD[22] | 23.835 | 6.340 | 1.801 |

Figure 44:
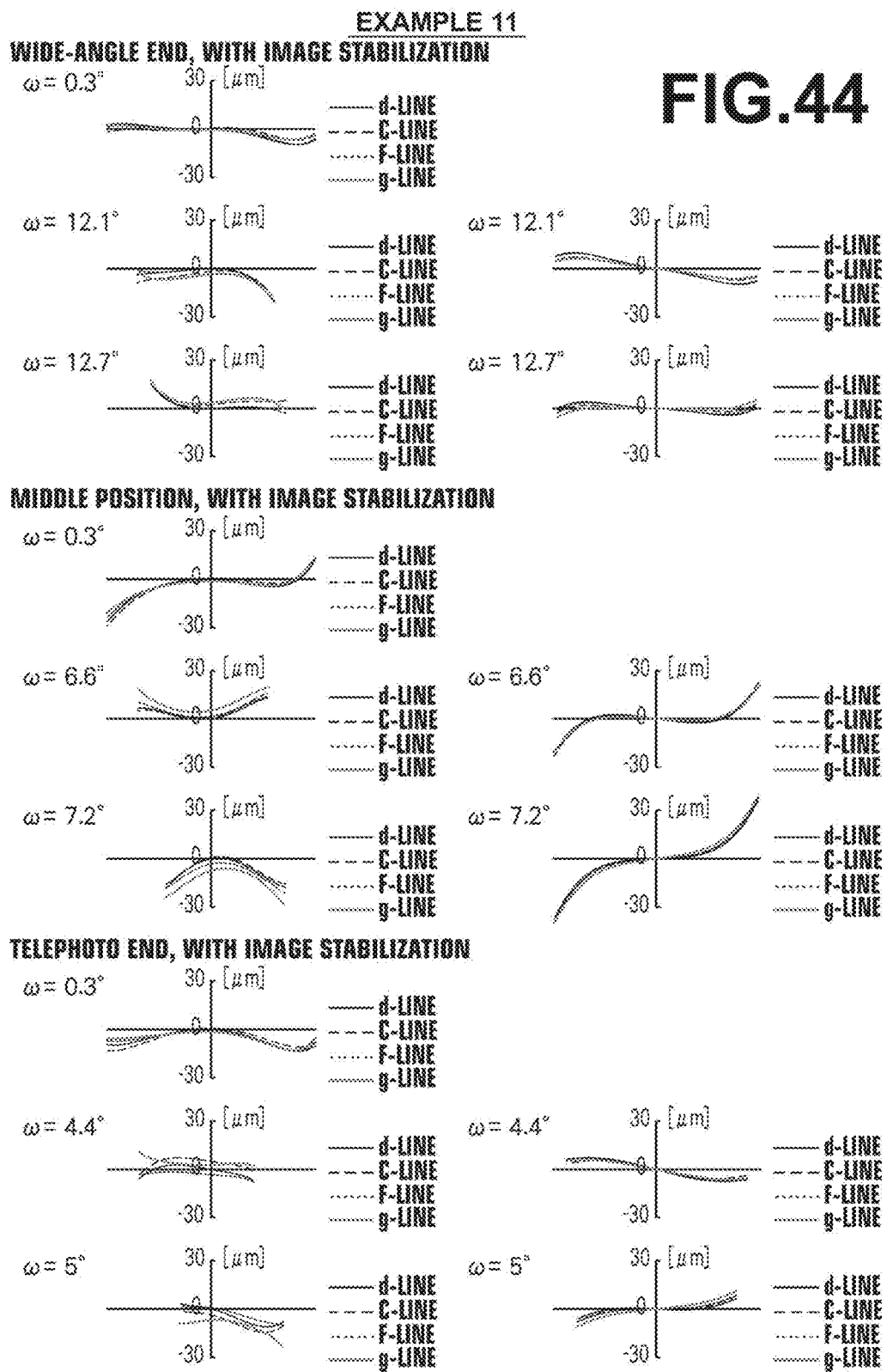
FIG. 44 shows lateral aberration diagrams of the zoom lens of Example 11 of the invention (with image stabilization)

Next, a zoom lens of Example 11 is described. The zoom lens of Example 11 has a lens group configuration similar to that of the zoom lens of Example 1. FIG. 11 is a sectional view illustrating the lens configuration of the zoom lens of Example 11. Table 31 shows basic lens data of the zoom lens of Example 11, Table 32 shows data about specifications of the zoom lens, Table 33 shows data about distances between surfaces to be moved of the zoom lens, FIG. 22 shows aberration diagrams of the zoom lens, FIG. 43 shows lateral aberration diagrams of the zoom lens without image stabilization, and FIG. 44 shows lateral aberration diagrams of the zoom lens with image stabilization.

TABLE 31

Example 11 - Lens Data

| Surface No. | Radius of Curvature | Surface Distance | nd | vd | θgF |
|---|---|---|---|---|---|
| 1 | 180.37474 | 2.390 | 1.80100 | 34.97 | 0.58642 |
| 2 | 69.14868 | 7.850 | 1.49700 | 81.54 | 0.53748 |
| 3 | −481.66507 | 0.200 | | | |
| 4 | 60.15068 | 7.500 | 1.43875 | 94.94 | 0.53433 |
| 5 | 1142.76498 | 0.200 | | | |
| 6 | 76.86117 | 4.500 | 1.49700 | 81.54 | 0.53748 |
| 7 | 187.53228 | DD[7] | | | |
| 8 | 111.60159 | 5.710 | 1.72047 | 34.71 | 0.58350 |
| 9 | −39.89381 | 1.550 | 1.62230 | 53.17 | 0.55424 |
| 10 | 24.07077 | 4.980 | | | |
| 11 | −64.75230 | 1.260 | 1.49700 | 81.54 | 0.53748 |
| 12 | 24.25512 | 5.408 | 1.84661 | 23.88 | 0.62072 |
| 13 | 94.37171 | 2.799 | | | |
| 14 | −28.39083 | 1.250 | 1.91082 | 35.25 | 0.58224 |
| 15 | 193.35819 | DD[15] | | | |
| 16 | −2763.02905 | 2.950 | 1.80100 | 34.97 | 0.58642 |
| 17 | −42.42344 | 0.100 | | | |
| 18 | 118.96564 | 4.310 | 1.59282 | 68.62 | 0.54414 |
| 19 | −37.94715 | 1.150 | 1.84666 | 23.78 | 0.62054 |
| 20 | −229.69252 | 7.412 | | | |
| 21 | 389.16162 | 2.200 | 1.68893 | 31.07 | 0.60041 |
| 22 | −215.34129 | DD[22] | | | |
| 23 (stop) | ∞ | 1.300 | | | |
| 24 | 27.53581 | 7.001 | 1.49700 | 81.54 | 0.53748 |
| 25 | −57.95147 | 0.150 | | | |
| 26 | 36.50795 | 2.550 | 1.65412 | 39.68 | 0.57378 |
| 27 | 105.69164 | 1.610 | | | |
| 28 | −54.28866 | 1.210 | 1.90366 | 31.31 | 0.59481 |
| 29 | 22.84035 | 6.968 | 1.49700 | 81.54 | 0.53748 |
| 30 | −80.66013 | 2.500 | | | |
| 31 | 381.31349 | 3.771 | 1.80518 | 25.42 | 0.61616 |
| 32 | −25.25989 | 0.950 | 1.58913 | 61.13 | 0.54067 |
| 33 | 39.74943 | 3.501 | | | |
| 34 | −39.07424 | 1.050 | 1.80100 | 34.97 | 0.58642 |
| 35 | 67.59646 | 4.073 | | | |
| 36 | 53.40416 | 5.837 | 1.80000 | 29.84 | 0.60178 |
| 37 | −38.04851 | 4.001 | | | |
| 38 | 47.49724 | 6.893 | 1.48749 | 70.24 | 0.53007 |
| 39 | −27.13146 | 1.310 | 1.80518 | 25.42 | 0.61616 |
| 40 | −85.37597 | 3.001 | | | |
| 41 | −29.19153 | 1.310 | 1.91082 | 35.25 | 0.58224 |
| 42 | −47.66122 | 25.665 | | | |
| 43 | ∞ | 2.850 | 1.51633 | 64.14 | 0.53531 |
| 44 | ∞ | | | | |

TABLE 32

Example 11 - Specification (d-line)

| | Wide-Angle End | Middle | Telephoto End |
|---|---|---|---|
| Zoom Magnification | 1.0 | 1.8 | 2.6 |
| f | 51.511 | 92.212 | 135.951 |
| Bf | 29.545 | 29.545 | 29.545 |
| FNo. | 2.88 | 2.89 | 2.88 |
| 2ω[°] | 30.6 | 17.0 | 11.6 |

TABLE 33

Example 11 - Distances Relating to Zoom

| | Wide-Angle End | Middle | Telephoto End |
|---|---|---|---|
| DD[7] | 1.697 | 21.960 | 30.401 |
| DD[15] | 10.593 | 6.211 | 1.452 |
| DD[22] | 21.360 | 5.480 | 1.796 |

Table 34 shows values corresponding to the condition expressions (1) to (5) of the zoom lenses of Examples 1 to 11. In all the examples, the d-line is used as a reference wavelength, and the values shown in Table 34 below are with respect to the reference wavelength.

TABLE 34

| No. | Condition Expression | Example 1 | Example 2 | Example 3 | Example 4 | Example 5 | Example 6 |
|---|---|---|---|---|---|---|---|
| (1) | \|fGr2\|/ft | 0.200 | 0.177 | 0.154 | 0.129 | 0.229 | 0.229 |
| (2) | fGr/ft | 0.492 | 0.444 | 0.428 | 0.457 | 0.511 | 0.513 |
| (3) | $(1 - \beta Gr2) \cdot \beta Gr3$ | −1.604 | −1.740 | −1.626 | −1.918 | −1.525 | −1.463 |
| (4) | vdGr3p | 29.84 | 29.84 | 29.84 | 25.42 | 29.84 | 29.84 |
| (5) | vdGr1p | 81.54 | 74.70 | 81.54 | 81.54 | 81.54 | 81.54 |

| No. | Condition Expression | Example 7 | Example 8 | Example 9 | Example 10 | Example 11 |
|---|---|---|---|---|---|---|
| (1) | \|fGr2\|/ft | 0.194 | 0.200 | 0.182 | 0.194 | 0.201 |
| (2) | fGr/ft | 0.479 | 0.472 | 0.480 | 0.437 | 0.490 |
| (3) | $(1 - \beta Gr2) \cdot \beta Gr3$ | −1.671 | −1.608 | −1.780 | −1.583 | −1.576 |
| (4) | vdGr3p | 29.84 | 29.84 | 37.16 | 29.84 | 29.84 |
| (5) | vdGr1p | 81.54 | 81.54 | 81.54 | 81.54 | 81.54 |

As can be seen from the above-described data, each of the zoom lenses of Examples 1 to 11 satisfies the condition expressions (1) to (5), and is a compact and light-weight telephoto zoom lens having an angle of view of about 10 to 13 degrees at the telephoto end, a zoom ratio of about 2.4 to 3.1, and a large aperture with a maximum aperture of about F2.8 across the entire zoom range, and having high optical performance with suppressed variation of aberrations during image stabilization.

Figure 45:
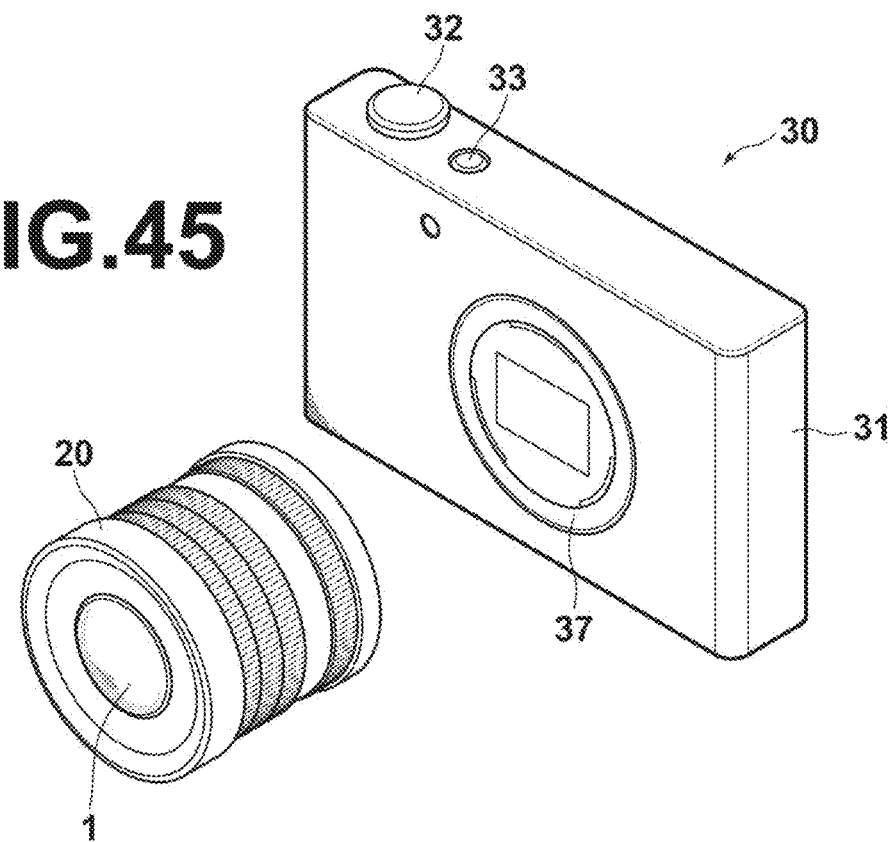
FIG. 45 is a perspective view showing the front side of an imaging apparatus according to one embodiment of the invention.
Figure 46:
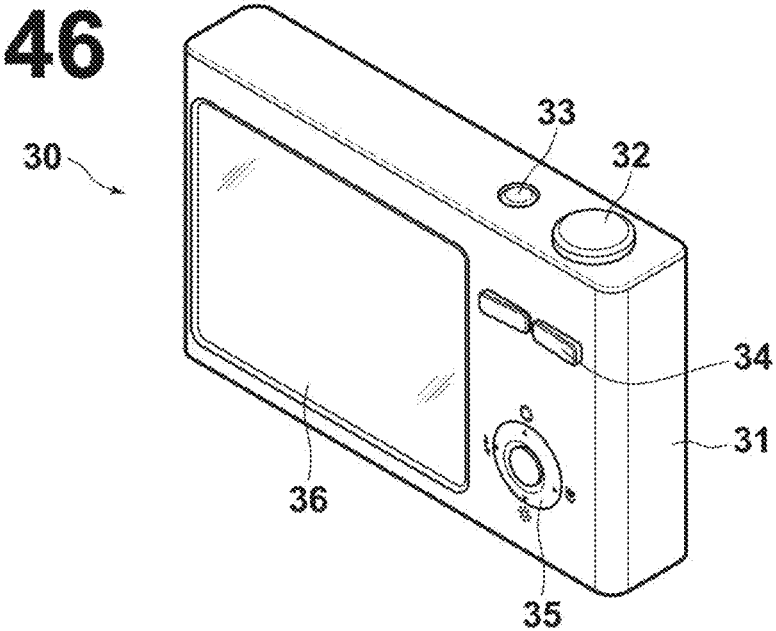
FIG. 46 is a perspective view showing the rear side of the imaging apparatus shown in FIG. 45.

Next, one embodiment of an imaging apparatus according to the invention is described with reference to FIGS. 45 and 46. FIGS. 45 and 46 are perspective views showing the front side and the rear side, respectively, of a camera 30. The camera 30 is a non-reflex digital camera, to which a replaceable lens 20 formed by a zoom lens 1 according to the embodiment of the invention housed in a lens barrel is removably mounted.

The camera 30 includes a camera body 31, and a shutter button 32 and a power button 33 are disposed on the top side of the camera body 31. On the rear side of the camera body 31, operation sections 34 and 35, and a display section 36 are disposed. The display section 36 displays a taken image, and an image within the angle of view before an imaging operation is performed.

At the center of the front side of the camera body 31, an imaging aperture, through which light from the subject enters, is formed, and a mount 37 is disposed at the position corresponding to the imaging aperture. The replaceable lens 20 is mounted on the camera body 31 via the mount 37.

In the camera body 31, an image sensor (not shown), such as a CCD, for receiving an image of the subject formed by the replaceable lens 20 and outputting an image signal according to the image of the subject, a signal processing circuit for processing the image signal outputted from the image sensor to generate an image, a recording medium for recording the generated image, etc., are disposed. With this camera 30, a still image or a moving image can be taken when the shutter button 32 is pressed, and the image data obtained by the imaging operation is recorded in the recording medium.

The camera 30 of this embodiment, which is provided with the zoom lens 1 of the invention, is compact and light weight, can achieve a high image stabilization effect, and allows obtaining high quality images.

The present invention has been described with reference to the embodiments and the examples. However, the invention is not limited to the above-described embodiments and examples, and various modifications may be made to the invention. For example, the values of the radius of curvature, the surface distance, the refractive index, the Abbe number, the aspheric coefficients, etc., of each lens are not limited to the values shown in the above-described examples and may take different values.

While the embodiment of the imaging apparatus is described and shown in the drawings as a non-reflex (so-called mirrorless) digital camera as an example, this is not intended to limit the imaging apparatus of the invention. For example, the invention is also applicable to imaging apparatuses, such as video cameras, digital cameras, motion picture cameras, and broadcasting cameras.

What is claimed is:

1. A zoom lens consisting of:
    four lens groups as a whole, which consist of, in order from an object side,
        a first lens group having a positive refractive power,
        a second lens group having a negative refractive power,
        one middle lens group including a middle positive (mp) lens group having a positive refractive power, and
        a rearmost lens group disposed at a most image-side position of the zoom lens and having a positive refractive power,
    wherein magnification change is effected by changing all distances between adjacent lens groups,
    the rearmost lens group consists of, in order from the object side,
        a front sub-group having a positive refractive power,
        a middle sub-group having a negative refractive power, and
        a rear sub-group having a positive refractive power,
    air spaces between the front sub-group and the middle sub-group, and between the middle sub-group and the rear sub-group are constant during magnification change and during focusing,
    the front sub-group comprises two positive lenses and one negative lens, image stabilization is effected by shifting only the middle sub-group in directions perpendicular to an optical axis,
the rear sub-group comprises one positive lens and two negative lenses, and
the conditional expression (1) below is satisfied:

$$0.11 < |fGr2|/ft < 0.25 \qquad (1),$$

where fGr2 is a focal length of the middle sub-group, and ft is a focal length of the zoom lens when the zoom lens is focused on an object at infinity at a telephoto end.

2. The zoom lens as claimed in claim 1, wherein the first lens group is fixed relative to an image plane during magnification change.

3. The zoom lens as claimed in claim 1, wherein the rearmost lens group is fixed relative to an image plane during magnification change.

4. The zoom lens as claimed in claim 1, wherein the middle sub-group consists of two negative lenses and one positive lens.

5. The zoom lens as claimed in claim 1, wherein the conditional expression (2) below is satisfied:

$$0.35 < fGr/ft < 0.56 \qquad (2),$$

where fGr is a focal length of the rearmost lens group, and ft is the focal length of the zoom lens when the zoom lens is focused on the object at infinity at the telephoto end.

6. The zoom lens as claimed in claim 1, wherein the front sub-group consists of, in order from the object side,
a positive lens,
a positive lens, and
a cemented lens formed by a negative lens and a positive lens which are cemented together in this order from the object side.

7. The zoom lens as claimed in claim 1, wherein the rear sub-group comprises one cemented lens.

8. The zoom lens as claimed in claim 1, wherein the rear sub-group comprises, at the most image-side position thereof, a single lens having a negative meniscus shape with a concave surface toward the object side.

9. The zoom lens as claimed in claim 1, wherein the rear sub-group consists of, in order from the object side,
a positive lens,
a cemented lens formed by a positive lens and a negative lens which are cemented together in this order from the object side, and
a negative lens.

10. The zoom lens as claimed in claim 1, wherein
the rearmost lens group is fixed relative to an image plane during magnification change, and
the conditional expression (3) below is satisfied:

$$-2.20 < (1-\beta Gr2)\cdot\beta Gr3 < -1.40 \qquad (3),$$

where βGr2 is a lateral magnification of the middle sub-group, and βGr3 is a lateral magnification of the rear sub-group.

11. The zoom lens as claimed in claim 1, wherein the rear sub-group comprises at least one positive lens that satisfies the conditional expression (4) below:

$$20 < vdGr3p < 41 \qquad (4),$$

where vdGr3p is an Abbe number of the positive lens in the rear sub-group.

12. The zoom lens as claimed in claim 1, wherein the conditional expression (5) below is satisfied:

$$71 < vdGr1p \qquad (5),$$

where vdGr1p is an average Abbe number of two positive lenses having the two highest Abbe numbers among the positive lenses in the front sub-group.

13. The zoom lens as claimed in claim 1, consisting of four lens groups which consist of, in order from the object side,
the first lens group,
the second lens group,
the mp lens group, and
the rearmost lens group.

14. The zoom lens as claimed in claim 1, wherein the first lens group consists of, in order from the object side,
a negative lens,
a positive lens,
a positive lens, and
a positive lens.

15. The zoom lens as claimed in claim 1, comprising a stop disposed at a most object-side position of the rearmost lens group.

16. An imaging apparatus comprising the zoom lens as claimed in claim 1.

17. The zoom lens as claimed in claim 1, wherein the conditional expression (2a) below is satisfied:

$$0.35 < fGr/ft < 0.492 \qquad (2a),$$

where fGr is a focal length of the rearmost lens group, and ft is the focal length of the zoom lens when the zoom lens is focused on the object at infinity at the telephoto end.

18. A zoom lens consisting of:
four lens groups as a whole, which consist of, in order from an object side,
a first lens group having a positive refractive power,
a second lens group having a negative refractive power,
one middle lens group including a middle positive (mp) lens group having a positive refractive power, and
a rearmost lens group disposed at a most image-side position of the zoom lens and having a positive refractive power,
wherein magnification change is effected by changing all distances between adjacent lens groups,
the rearmost lens group consists of, in order from an object side,
a front sub-group having a positive refractive power,
a middle sub-group having a negative refractive power, and
a rear sub-group having a positive refractive power,
air spaces between the front sub-group and the middle sub-group, and between the middle sub-group and the rear sub-group are constant during magnification change and during focusing,
the front sub-group consists of three positive lenses and one negative lens,
the middle sub-group comprises one positive lens and one negative lens,
image stabilization is effected by shifting only the middle sub-group in directions perpendicular to an optical axis, and
the rear sub-group consists of two positive lenses and two negative lenses.

19. An imaging apparatus comprising the zoom lens as claimed in claim 18.

20. The zoom lens as claimed in claim 18, wherein the conditional expression (2a) below is satisfied:

$$0.35 < fGr/ft < 0.492 \qquad (2a),$$

where fGr is a focal length of the rearmost lens group, and ft is a focal length of the zoom lens when the zoom lens is focused on an object at infinity at a telephoto end.

21. A zoom lens consisting of:
five lens groups as a whole, which consist of, in order from an object side,
a first lens group having a positive refractive power,
a second lens group having a negative refractive power,
two middle lens groups including a middle positive (mp) lens group having a positive refractive power, and
a rearmost lens group disposed at a most image-side position of the zoom lens and having a positive refractive power,
wherein magnification change is effected by changing all distances between adjacent lens groups,
the rearmost lens group consists of, in order from the object side,
a front sub-group having a positive refractive power,
a middle sub-group having a negative refractive power, and
a rear sub-group having a positive refractive power,
air spaces between the front sub-group and the middle sub-group, and between the middle sub-group and the rear sub-group are constant during magnification change and during focusing,
the front sub-group comprises two positive lenses and one negative lens,
image stabilization is effected by shifting only the middle sub-group in directions perpendicular to an optical axis,
the rear sub-group comprises one positive lens and two negative lenses, and
the conditional expression (1) below is satisfied:

$$0.11 < |fGr2|/ft < 0.25 \qquad (1),$$

where fGr2 is a focal length of the middle sub-group, and ft is a focal length of the zoom lens when the zoom lens is focused on an object at infinity at a telephoto end.

22. A zoom lens consisting of:
five lens groups as a whole, which consist of, in order from an object side,
a first lens group having a positive refractive power,
a second lens group having a negative refractive power,
two middle lens groups including a middle positive (mp) lens group having a positive refractive power, and
a rearmost lens group disposed at a most image-side position of the zoom lens and having a positive refractive power,
wherein magnification change is effected by changing all distances between adjacent lens groups,
the rearmost lens group consists of, in order from an object side,
a front sub-group having a positive refractive power,
a middle sub-group having a negative refractive power, and
a rear sub-group having a positive refractive power,
air spaces between the front sub-group and the middle sub-group, and between the middle sub-group and the rear sub-group are constant during magnification change and during focusing,
the front sub-group consists of three positive lenses and one negative lens,
the middle sub-group comprises one positive lens and one negative lens,
image stabilization is effected by shifting only the middle sub-group in directions perpendicular to an optical axis, and
the rear sub-group consists of two positive lenses and two negative lenses.

* * * * *